United States Patent
Yoneyama et al.

(10) Patent No.: US 7,960,018 B2
(45) Date of Patent: Jun. 14, 2011

(54) OPTICAL FILM, POLARIZING PLATE, IMAGE DISPLAY, AND MANUFACTURING METHOD OF OPTICAL FILM

(75) Inventors: Hiroyuki Yoneyama, Minami-Ashigara (JP); Jun Watanabe, Minami-Ashigara (JP); Takato Suzuki, Minami-Ashigara (JP)

(73) Assignee: FujiFilm Corporation, Minato-Ku, Tokyo (JP)

( * ) Notice: Subject to any disclaimer, the term of this patent is extended or adjusted under 35 U.S.C. 154(b) by 1025 days.

(21) Appl. No.: 11/727,922

(22) Filed: Mar. 29, 2007

(65) Prior Publication Data

US 2007/0231566 A1    Oct. 4, 2007

(30) Foreign Application Priority Data

Mar. 29, 2006   (JP) ................ 2006-092156

(51) Int. Cl.
B32B 5/16      (2006.01)
(52) U.S. Cl. ........................ 428/323; 428/420
(58) Field of Classification Search .......... 428/323, 428/420
See application file for complete search history.

(56) References Cited

U.S. PATENT DOCUMENTS

| 2005/0136273 A1* | 6/2005 | Hashimoto et al. ........ 428/510 |
| 2005/0208230 A1* | 9/2005 | Ikeda ........................ 428/1.1 |
| 2005/0233069 A1 | 10/2005 | Mikami et al. |
| 2007/0053055 A1 | 3/2007 | Mikami et al. |

FOREIGN PATENT DOCUMENTS

| JP | 2002-200623 A | 7/2002 |
| JP | 2002-235018 A | 8/2002 |
| JP | 2003-227932 A | 8/2003 |
| JP | 2004-050535 A | 2/2004 |
| JP | 2004050535 A * | 2/2004 |
| JP | 2004-302113 A | 10/2004 |
| JP | 2005-181996 A | 7/2005 |
| WO | WO 2005/033752 A1 | 4/2005 |

OTHER PUBLICATIONS

James et al., Hyperbranched Polymers for Hardcoat with Superior Performance, Feb. 8, 2006, PCI Magazine dowloaded from http://www.pcimag.com/Articles/Feature_Article/3f87df2575c49010VgnVCM100000f932a8c0 on Apr. 12, 2010.*
Office Action issued in corresponding Japanese application No. 2007-079857 on Mar. 29, 2011, and English translation thereof.

* cited by examiner

Primary Examiner — Callie E Shosho
Assistant Examiner — Elizabeth Robinson
(74) Attorney, Agent, or Firm — Buchanan, Ingersoll & Rooney, PC

(57) ABSTRACT

An optical film is provided and includes: a support; a hard coat layer formed by hardening a hard coat layer-coating composition; and a overcoat layer formed by hardening an overcoat layer-coating composition, in this order. Each of the hard coat layer-coating composition and the overcoat layer-coating composition contains a compound having a plurality of polymerizable functional groups in one molecule, and the compound in the overcoat layer-coating composition contains a compound having at least three polymerizable functional groups.

21 Claims, 2 Drawing Sheets

OPTICAL FILM, POLARIZING PLATE, IMAGE DISPLAY, AND MANUFACTURING METHOD OF OPTICAL FILM

BACKGROUND OF THE INVENTION

1. Field of the Invention

The present invention relates to an optical film, a polarizing plate, an image display, and a manufacturing method of the optical film.

2. Description of Related Art

In recent years, toughness is required of displays on handling by general users in homes. For example, in various image displays such as a liquid crystal display (LCD), a plasma display panel (PDP), electroluminescence display (ELD), cathode ray tube display (CRT), SED (Surface-Conduction Electron-Emitter Display), the optical films used on the surfaces thereon are required to have high physical strength (scratch resistance and the like), transparency, chemical resistance, and weather resistance (moisture and heat resistance, light fastness and the like). For preventing the reduction of contrast by the reflection of outer light and mirroring of images, antiglare and antireflection properties are also required of optical films. An antifouling property and a dust preventing property of the surface that dirt and dust are difficultly adhered by daily handling are also required.

As materials showing a high hard coat property, photosensitive resin compositions for a hard coat agent containing a reaction product of a mixture of dipentaerythritol, tripentaerythritol and tetrapentaerythritol, with (meth)-acrylic acid are disclosed in JP-A-2002-235018. Although these materials have a certain effect, further increase in hardness and reduction of curling are required.

A layered product improved in alkali resistance by providing a clear hardening resin layer on an antiglare layer is disclosed in JP-A-2004-50535. The layered product is also improved in light fastness and moisture and heat resistance by forming an optical thin film on the laminate by vacuum deposition. The layered product shows certain scratch resistance, but further improvement is desired supposing the use on the surface of displays.

SUMMARY OF THE INVENTION

One aspect of an illustrative, non-limiting embodiment of the invention is to provide an optical film having high hardness, excellent in scratch resistance, and accompanied by little curing. Another aspect is to provide an optical film excellent in an antifouling property, low in reflection and having an antiglare property. A further aspect is to provide a polarizing plate and display using such an optical film.

As a result of intensive investigations by the present inventors to solve the above issues, aspects of invention have been achieved by the following constitutions. That is, aspects of the invention are as follows.

(1) An optical film comprising: a support; a hard coat layer formed by hardening a hard coat layer-coating composition; and a overcoat layer formed by hardening an overcoat layer-coating composition, in this order, wherein each of the hard coat layer-coating composition and the overcoat layer-coating composition comprises a compound having a plurality of polymerizable functional groups in one molecule, and wherein the compound in the overcoat layer-coating composition comprises a compound having at least three polymerizable functional groups.

(2) The optical film as described in (1) above, wherein a ratio MOC/MHC is from 1.0 to 100, wherein MOC is a weight average molecular weight of the compound having the plurality of polymerizable functional groups in one molecule in the overcoat layer-coating composition, and MHC is a weight average molecular weight of the compound having the plurality of polymerizable functional groups in one molecule in the hard coat layer-coating composition.

(3) The optical film as described in (1) or (2) above, wherein the over coat layer has a thickness of 0.15 to 10 μm.

(4) The optical film as described in any one of (1) to (3) above, wherein the compound having the plurality of polymerizable functional groups in one molecule comprises a monomer having a hydrogen bonding group.

(5) The optical film as described in any one of (1) to (4) above, wherein the compound having the plurality of polymerizable functional groups in one molecule comprises ethoxy isocyanurate-modified diacrylate.

(6) The optical film as described in any one of (1) to (5) above, wherein the compound having the plurality of polymerizable functional groups in one molecule comprises a hardening polybranched polymer RHB comprising a polybranched polymer HB as a core and at least one of a photocurable group and a thermosetting reactive group, bonded to a terminal of a branch of the polybranched polymer.

(7) The optical film as described in any one of (1) to (7) above, wherein at least one of the hard coat layer-coating composition and the overcoat layer-coating composition comprises inorganic fine particles.

(8) The optical film as described in (7) above, wherein the overcoat layer comprises inorganic fine particles, the inorganic fine particles comprising silica as a main component thereof, the silica having an average particle size of 1 nm to 1 μm as the main component.

(9) The optical film as described in (7) or (8) above, wherein the inorganic fine particles have holes at least one of on surfaces of the inorganic fine particles and inside the inorganic fine particles.

(10) The optical film as described in any one of (7) to (9) above, wherein the inorganic fine particles are electrically conductive particles.

(11) The optical film as described in any one of (1) to (10) above, wherein one of the hard coat layer-coating composition and the overcoat layer-coating composition comprises at least one of an organosilane compound, a hydrolyzed product thereof and a condensed product thereof.

(12) The optical film as described in any one of (1) to (11) above, wherein the overcoat layer-coating composition comprises at least one of a reactive silicone compound and a reactive fluorine compound.

(13) The optical film as described in any one of (1) to (12) above, wherein the overcoat layer has a surface free energy of 30 mN/m or less.

(14) The optical film as described in any one of (1) to (13) above, wherein compositions of at least one of the polymerizable compound and inorganic fine particles forming the overcoat layer and the hard coat layer gradually vary at an interface between the overcoat layer and the hard coat layer.

(15) The optical film as described in any one of (1) to (14) above, further comprising an interfacial mixing layer at an interface between the overcoat layer and the hard coat layer.

(16) The optical film as described in any one of (1) to (15) above, wherein the overcoat layer has a refractive index of 1.25 to 1.49.

(17) The optical film as described in any one of (1) to (16) above, wherein an average refractive index from a surface to a depth of 100 nm of the overcoat layer is from 1.25 to 1.49.

(18) The optical film as described in any one of (1) to (17) above, wherein the hard coat layer comprises light diffusible particles.

(19) The optical film as described in any one of (1) to (18) above, having an antiglare property.

(20) The optical film as described in any one of (1) to (19) above, wherein the support has a thickness of 15 to 60 µm.

(21) The optical film as described in any one of (1) to (20) above, further comprising a low refractive index layer over the overcoat layer.

(22) A polarizing plate comprising: a polarizer; and protective films, the polarizer being between the protective films, wherein at least one of the protective films is an optical film described in any one of (1) to (21) above.

(23) An image display comprising an optical film described in any one of (1) to (21) above or a polarizing plate described in (22) above.

(24) A method for manufacturing an optical film, comprising:

coating a hard coat layer-coating composition over a support, the hard coat layer-coating composition comprising a compound having a plurality of polymerizable functional groups in one molecule;

hardening the hard coat layer-coating composition so that a reactivity of the compound is 0 to 50%;

coating an overcoat-layer coating composition comprising a compound having at least three polymerizable functional groups in one molecule; and hardening the overcoat-layer coating composition.

(25) The method as described in (24) above, wherein the coating of the overcoat-layer coating composition is performed after the coating of the hard coat layer-coating composition, without winding the coated support.

(26) A method for manufacturing an optical film comprising a support and at least two layers formed by coating compositions, comprising:

coating simultaneously a hard coat layer coating composition comprising a compound having a plurality of polymerizable functional groups in one molecule; and an overcoat-layer coating composition comprising a compound having at least three polymerizable functional groups in one molecule.

DETAILED DESCRIPTION OF THE EXEMPLARY EMBODIMENTS

Figure 1:
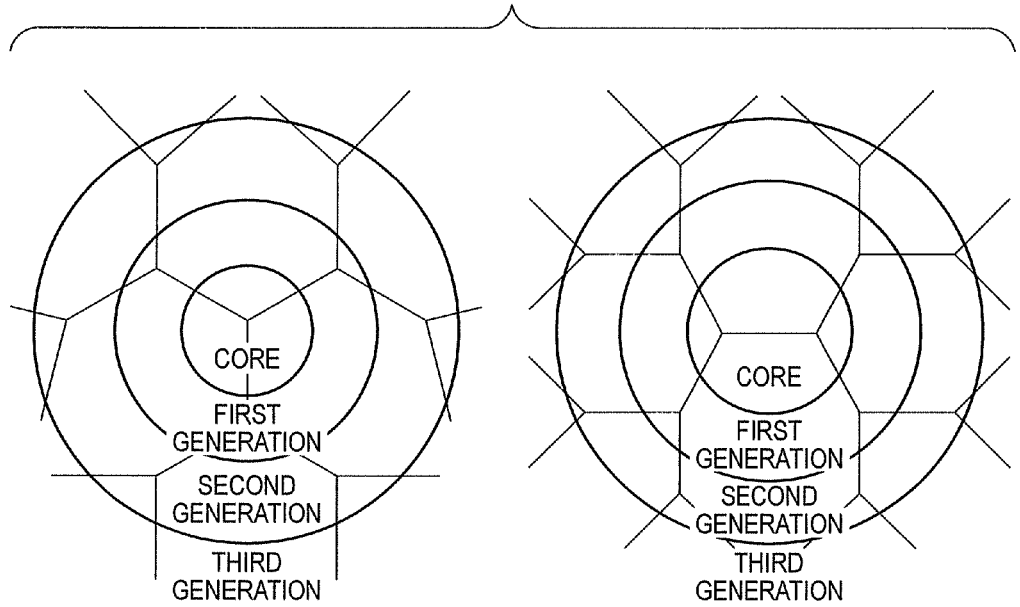
FIG. 1 is an example of a compound that can be used in an exemplary embodiment of the invention in which branches are extending three dimensionally and radially from the core part, and parts having branches extending from the terminals are further contained.

Although the invention will be described below with reference to the exemplary embodiments thereof, the following exemplary embodiments and modifications do not restrict the invention.

According to an exemplary embodiment of the invention, an optical film having high hardness, excellent in scratch resistance and low in curling can be provided. According to another exemplary embodiment, an optical film excellent in an antifouling property and low in reflection can be provided.

A polarizing plate and an image display using the optical film are excellent in optical characteristics such that mirroring of outer light and background is little and visibility is high.

Exemplary embodiments will be described in detail below. Incidentally in the specification, when numerical values represent physical values and characteristic values, the description "from (numerical value 1) to (numerical value 2)" or "(numerical value 1) to (numerical value 2)" means "(numerical value 1) or more and (numerical value 2) or less". Further, "(meth)acrylate" means "at least either acrylate or methacrylate", and this also applies to "(meth)acrylic acid".

An optical film according to an exemplary embodiment of the invention includes: a support; a hard coat layer formed by hardening a hard coat layer-coating composition; and a overcoat layer formed by hardening an overcoat layer-coating composition, in this order. Each of the hard coat layer-coating composition and the overcoat layer-coating composition contains a compound having a plurality of polymerizable functional groups in one molecule, and at least the overcoat layer-coating composition contains a compound having at least three polymerizable functional groups in one molecule At least one compound of polymerizable compounds in the composition for the overcoat layer coating solution contains three or more polymerizable functional groups in one molecule. The at least one compound contains preferably 4 or more and 250 or less polymerizable functional groups in one molecule, and more preferably 6 or more and 64 or less polymerizable functional groups in one molecule.

It is preferred that at least one of polymerizable compounds in the hard coat layer contain 2 or more and 32 or less polymerizable functional groups in one molecule, and more preferably 2 or more and 6 or less polymerizable functional groups in one molecule, by which respective layers in the hard coat layer and the overcoat layer by themselves and the interface are capable of forming strong chemical bonding, so that an optical film having high hardness can be obtained.

1. Materials for Use in Hard Coat Layer and Overcoat Layer in the Invention 1-1. Compound Having a Plurality of Polymerizable Functional Groups in One Molecule A hard coat layer and an overcoat layer in the invention can be formed by coating and hardening respective coating compositions containing a compound having a plurality of polymerizable functional groups in one molecule. The polymerizable functional groups are not especially restricted, but a radical polymerizable group or a cationic polymerizable group is preferred, and a radical polymerizable group is especially preferred. It is also possible to contain a radical polymerizable group and a cationic polymerizable group in one molecule. The number of polymerizable groups in one molecule is at least 2, and more preferably 2 or more and 6 or less.

As combinations of a compound having a hydroxyl group and a compound reacting with a hydroxyl group, it is preferred to use various amino compounds as the hardening agents to an oligomer or polymer containing a hydroxyl group.

1-1-1. Radical Polymerizable Monomer ($M_{A1}$)

As the radical polymerizable groups, ethylenic unsaturated groups, e.g., a (meth)acryloyl group, a vinyloxy group, a styryl group, and an allyl group are exemplified. A (meth)acryloyl group is preferred above all. It is preferred that the radical polymerizable groups contain a polyfunctional monomer containing 2 or more and 6 or less radical polymerizable group in the molecule. Polyfunctional monomers having radical polymerizable groups may be used in combination of two or more kinds. The molecular weight of the radical polymerizable monomer is preferably from 290 to 800 when used in the hard coat layer, more preferably from 290 to 600, and preferably from 350 to 1,000 when used in the overcoat layer, and more preferably from 400 to 800.

It is preferred that the radical polymerizable polyfunctional monomers are selected from compounds having at least two terminal ethylenic unsaturated bonds, and compounds having from two to six terminal ethylenic unsaturated bonds are more preferred. These compounds are widely known in the field of polymer materials, and they can be used in the invention with no restriction.

As the examples of radical polymerizable monomers ($M_{41}$), unsaturated carboxylic acids (e.g., (meth)acrylic acid, itaconic acid, crotonic acid, isocrotonic acid, maleic acid, etc.), and esters and amides of these unsaturated carboxylic acids are exemplified, preferably esters of unsaturated carboxylic acids with aliphatic polyhydric alcohol compounds and amides of unsaturated carboxylic acids with aliphatic polyhydric amine compounds are exemplified. Further, addition reactants of unsaturated carboxylic esters and amides having a nucleophilic substituent such as a hydroxyl group, an amino group or a mercapto group with monofunctional or polyfunctional isocyanates or epoxies, and dehydration condensation reactants with polyfunctional carboxylic acids are also preferably used. Further, reactants of unsaturated carboxylic esters or amides having an electrophilic substituent such as an isocyanate group or an epoxy group with monofunctional or polyfunctional alcohols, amines or thiols are also preferably used. As another example, it is also possible to use compounds of substituting these unsaturated carboxylic acids with unsaturated phosphonic acids or styrene.

As the aliphatic polyhydric alcohol compounds, alkanediol, alkanetriol, cyclohexanediol, cyclohexanetriol, inositol, cyclohexanedimethanol, pentaerythritol, sorbitol, dipentaerythritol, tripentaerythritol, glycerol and diglycerol are exemplified. As the examples of polymerizable ester compounds of these aliphatic polyhydric alcohol compounds with unsaturated carboxylic acids (monoesters and polyesters), the compounds disclosed in JP-A-2001-139663, paragraphs 0026 to 0027 are exemplified.

As the examples of other polymerizable esters, e.g., vinyl (meth)acrylate, allyl (meth)acrylate, allyl acrylate, aliphatic alcohol esters disclosed in JP-B-46-27926, JP-B-51-47334 and JP-A-57-196231, esters having an aromatic skeleton as disclosed in JP-A-2-226149, and esters having an amino group disclosed in JP-A-1-165613 are also preferably used.

As the specific examples of polymerizable amide formed of aliphatic polyhydric amine compounds and unsaturated carboxylic acids, methylenebis(meth)acrylamide, 1,6-hexamethylenebis(meth)acrylamide, diethylenetriaminetris(meth)acrylamide, xylylenebis(meth)acrylamide, and compounds having a cyclohexylene structure as disclosed in JP-B-54-21726 are exemplified.

Vinyl urethane compounds containing two or more polymerizable vinyl groups in one molecule (JP-B-48-41708), urethane acrylates (JP-B-2-16765, exemplified compounds PETA-IPDI-PETA, PETA-TDI-PETA, HEA-IPDI-HEA, and U-15HA disclosed in JP-A-2005-272702), urethane compounds having an ethylene oxide skeleton (JP-B-62-39418), polyester acrylates (JP-B-52-30490), and photo-curable monomers and oligomers described in *Nippon Setchaku Kyokaishi* (*Bulletin of Japan Adhesion Association*), Vol. 20, No. 7, pp. 300 to 308 (1984) can also be used.

As the examples of monomers having an especially high refractive index, bis(4-methacryloylthiophenyl) sulfide, vinylnaphthalene, vinylphenyl sulfide, and 4-methacryloxyphenyl-4-methoxyphenyl thioether can be used.

For reducing curling, the following shown ethoxy isocyanurate-modified diacrylate (disclosed in JP-A-2005-103973) is also preferred.

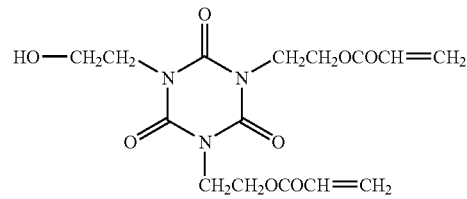

By using trifunctional or more acrylate in combination, the above compound can form a film that is low in curling and excellent in scratch resistance. As is disclosed in JP-A-2002-235018, it is also preferred to use mixture (I) of dipentaerythritol (a), tripentaerythritol (b), tetrapenta-erythritol (c), and pentaerythritol (d) as arbitrary ingredient, and (meth)acrylic ester mixture of the reactant of (meth)acrylic acid (the compounds in Synthesis Examples 1 and 2).

Monomers having a hydrogen bonding group have a tendency to be effective in the reduction of curling even with the same hardness, so that preferred. As the examples of hydrogen bonding functional groups, an amido group, an amino group, a urethane group, an acyl group, an acylamino group, an acyloxy group, a sulfamoyl group, a hydroxyl group, and a silanol group are exemplified. Compounds having a urethane bonding group are especially preferred.

1-1-2. Cationic Polymerizable Monomer ($M_{42}$)

Compounds containing a cationic polymerizable group (cationic polymerizable monomers) ($M_{42}$) are described below.

Cationic polymerizable monomers ($M_{42}$) for use in the invention may be any compound that causes polymerization reaction and/or crosslinking reaction when irradiated with actinic energy rays in the presence of an actinic energy ray-sensitive cationic polymerization initiator, and an epoxy compound, a cyclic thioether compound, a cyclic ether compound, a spiro-ortho ester compound, and a vinyl ether compound can be exemplified as representative examples. One or two or more of the above cationic polymerizable organic compounds can be used in the invention.

As cationic polymerizable monomer ($M_{42}$), the number of cationic polymerizable groups in one molecule is preferably from 2 to 10, and especially preferably from 2 to 5. The molecular weight of the monomer is preferably 3,000 or less, more preferably from 200 to 2,000, and especially preferably from 400 to 1,500. When the number of polymerizable groups and the molecular weight are in these ranges, volatilization during film formation does not become a problem, and there arises no problem in the compatibility with the hardening composition, so that preferred.

As the epoxy compound that is one of cationic polymerizable monomers ($M_{42}$), an aliphatic epoxy compound and an aromatic epoxy compound are exemplified.

As the aliphatic epoxy compound, homopolymers and copolymers such as polyglycidyl ether of aliphatic polyhydric alcohol or an alkylene oxide adduct thereof, polyglycidyl ester of aliphatic long chain polybasic acid, and glycidyl (meth)acrylate are exemplified. Besides the above epoxy compounds, e.g., monoglycidyl ether of aliphatic higher alcohol, glycidyl ester of higher fatty acid, epoxidized soybean oil, butyl epoxystearate, octyl epoxystearate, epoxidized linseed oil, and epoxidized polybutadiene are exemplified. As alicyclic epoxy compounds, polyglycidyl ether of polyhydric alcohol having at least one alicyclic ring, and compounds containing cyclohexene oxide or cyclopentene oxide obtained by epoxidizing compounds containing an unsaturated alicyclic ring (e.g., cyclohexene, cyclopentene, dicyclooctene, or tricyclodecene) with a proper oxidizing agent such as hydrogen peroxide, peracid, etc., can be exemplified.

As the aromatic epoxy compound, e.g., mono- or polyglycidyl ether of monohydric or polyhydric phenol having at least one aromatic nucleus or an alkylene oxide adduct thereof can be exemplified. As these epoxy compounds, the compounds disclosed, e.g., in JP-A-11-242101, paragraphs 0084 to 0086, and the compounds disclosed in JP-A-10-158385, paragraphs 0044 to 0046 are exemplified.

Of these epoxy compounds, considering a rapid hardening property, aromatic epoxide and alicyclic epoxide are preferred, and alicyclic epoxide is especially preferred. These epoxy compounds may be used alone, or arbitrarily two or more compounds may be used in combination.

The cyclic thioether compounds are such compounds that the epoxy ring in the epoxy compounds is substituted with a thioepoxy ring.

As the cyclic ether compounds having an oxetanyl group, specifically the compounds disclosed in JP-A-2000-239309, paragraphs 0024 to 0025 are exemplified. It is preferred that these compounds are used in combination with epoxy group-containing compounds.

As the spiro-ortho ester compounds, the compounds disclosed in JP-T-2000-506908 (the term "JP-T" as used herein refers to a "published Japanese translation of a PCT patent application") can be exemplified.

As the vinyl hydrocarbon compounds, styrene compounds, vinyl group-substituted alicyclic hydrocarbon compounds (e.g., vinylcyclohexane, vinylbicycloheptene, etc.), vinyloxy compounds (the same compounds as described in the above radical polymerizable compound), propenyl compounds (e.g., those described in J. Polymer Science: Part A: Polymer Chemistry, Vol. 32, p. 2895 (1994), etc.), alkoxyallene compounds (e.g., those described in J. Polymer Science: Part A: Polymer Chemistry, Vol. 33, p. 2493 (1995), etc.), vinyl compounds (e.g., those described in J. Polymer Science: Part A: Polymer Chemistry, Vol. 34, p. 1015 (1996), etc.), and isopropenyl compounds (e.g., those described in J. Polymer Science: Part A: Polymer Chemistry, Vol. 34, p. 2051 (1996), etc.), etc., can be exemplified.

These compounds may be used arbitrarily in combination of two or more.

As the combinations of a compound having a hydroxyl group and a compound reacting with a hydroxyl group, various kinds of amino compounds are preferably used as hardening agents to hydroxyl group-containing oligomers and polymers. Amino compounds that are used as crosslinking compounds are compounds containing either one or both in total of two or more of a hydroxyalkylamino group and an alkoxyalkylamino group, specifically, e.g., melamine compounds, urea compounds, benzoguanamine compounds, and glycolurea compounds are exemplified. For hardening these compounds, organic acids or the salts thereof are preferably used.

1-1-3. Hardening Polybranched Polymer (RHB)

It is preferred for the hardening composition for the hard coat layer and/or overcoat layer in the invention to contain a hardening polybranched polymer (RHB) comprising a polybranched polymer (HB) as the core and having photo-curable and/or thermosetting reactive groups bonded to the terminals of branches. Further, it is preferred that the photo-curable and/or thermosetting reactive groups contained in the hardening polybranched polymer (RHB) are hardening reactive groups (hereinafter sometimes also referred to as merely "hardening group") selected from a radical polymerizable group, a cationic polymerizable group, and a silyl group substituted with a hydrolyzable group.

Polybranched Polymer (HB) as the Core:

The photo-curable and/or thermosetting polybranched polymer (RHB) in the invention is a highly "branched" giant molecule comprising a polybranched polymer (HB) as the core and having photo-curable and/or thermosetting reactive groups bonded to the terminals of branches. For example, these are the compounds shown in FIGS. 1 and 2 below.

Figure 2:
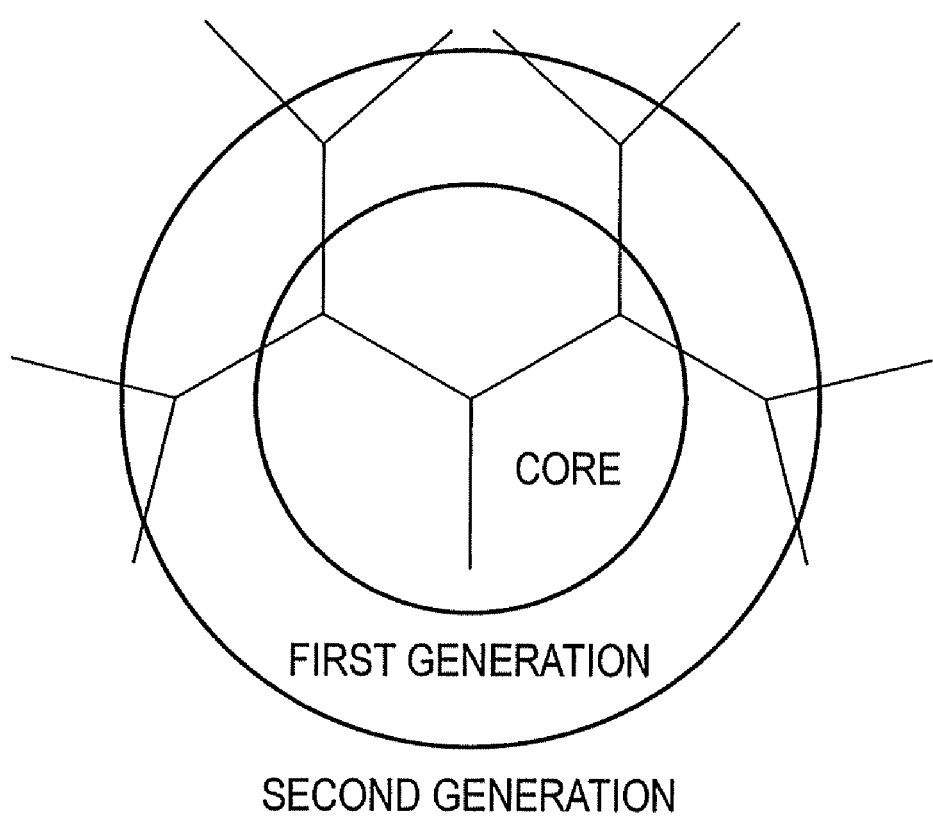
FIG. 2 is an example of a dendritic compound that can be used in an exemplary embodiment of the invention in which the branches are not uniformly growing in all the directions but branching parts are radially extending.

As shown in FIG. 1 below, hardening polybranched polymer (RHB) is a compound in which branches are extending three dimensionally and radially from the central part, and branches are further extending from the terminals of the above branches. As shown in FIG. 2, even if the branches are not uniformly growing in all the directions, that dendritic compound can be used in the invention so long as branching parts are radially extending. Specifically, it is preferred for polybranched polymer (HB) as the core to be composed of at least one or more polymers selected from the group consisting of a dendrimer, a hyper branched polymer, and a star burst polymer.

Polybranched polymer (HB) as the core is a compound having a polyvalent group core as the center and bonding to a branched chain extending unit comprising two or more regular dendritic branches. The polyvalent group core is a compound having at least two or more reactive groups (a) forming a linking group, and polybranched polymer (HB) is preferably a highly branched polymer having a structure extended by repeating chemical reaction with a compound having one reactive group (b) forming a linking group by chemical bonding with the reactive groups (a) of the compound as the group core, and at least two or more reactive groups (a) (a branched chain extending compound).

As polybranched polymers (HB), polybranched polyurea, polybranched polyurethane, polybranched polyamideamine, polybranched polyamide, polybranched polyester, polybranched polycarbonate, polybranched polycarbosilane, polybranched polycarbosiloxane, polybranched polycarbosilazene, polybranched polyether, polybranched poly(ether ketone), polybranched poly(propyleneimine), polybranched polyalkylamine, and copolymers of these polymers are specifically exemplified.

As such polybranched polymers, the polymers described in, e.g., compiled by Masahiko Okada, *Dendrimer no Kagaku to Kino (Science and Function of Dendrimers)*, pp. 29 to 31, IPC Publishing Co. (2000), ibid., Chapter 2, compiled by Koji Ishizu, *Bunki Polymer no Nanotechnology (Nanotechnology of Branched Polymers)*, Chapter 6, IPC Publishing Co. (2000), and *Comprehensive Supermolecule,* 10, Chapter 26, Pergamon Press, New York (1995) can be exemplified. Preferably, polybranched polyamideamine, polybranched polyamide, polybranched polyester, polybranched polycarbosilane, polybranched polycarbosiloxane, polybranched polyether, polybranched poly(ether ketone), and polybranched polyalkylamine are exemplified.

The polyvalent group cores of polybranched polymer (HB) as the core are not especially restricted so long as they are polyfunctional compounds containing as the core an organic residue, a nitrogen atom, a silicon atom, or a phosphorus atom. As the organic residue, a carbon atom, an aromatic hydrocarbon ring (a benzene ring, a naphthalene ring, a biphenyl ring, a phenanthrene ring, a triphenylene ring, etc.), a heterocyclic ring having a monocyclic or polycyclic structure containing at least one hetero atom selected from oxygen, nitrogen and sulfur (e.g., a pyrazine ring, a hydropyrazine ring, a piperazine ring, a triazine ring, a hydrotriazine ring, a phenazine ring, a xanthene ring, a thioxanthene ring, etc.), a calix arene structure, an azacryptant structure, a crown ether structure, a porphyrin structure, etc., are exemplified, but these structures are not also especially restricted.

Polybranched polymer (HB) as the core in the invention is preferably a molecule prepared by a polycondensation cycle. Each cycle includes the reaction of all reactive functional groups of a group core and 1 equivalent weight of a branched chain extending compound. By the number (n) of cycles, the polymer is called a polybranched molecule of "the $n^{th}$ generation". In the invention, polybranched molecules of the $1^{st}$ to $6^{th}$ generations are preferred, and especially preferably from the $2^{nd}$ to $4^{th}$ generations.

In polybranched polymer (HB) as the core in the invention, it is preferred to contain a cyclic structure in a branched chain extending unit. It is especially preferred to contain a cyclic structure and an alkylene chain structure.

The cyclic structure is selected from an alicyclic structure and an aromatic cyclic structure. As the alicyclic structure, monocyclic, polycyclic, and crosslinking alicyclic hydrocarbons having from 5 to 22 carbon atoms are exemplified. As the specific examples of hydrocarbons having a cyclic structure, cyclopentane, cyclopentene, cyclopentadiene, cyclohexane, cyclohexene, cyclohexadiene, cycloheptane, cycloheptene, cycloheptadiene, cyclooctane, cyclooctene, cyclooctadiene, cyclooctatriene, cyclononane, cyclononene, cyclodecane, cyclodecene, cyclodecanediene, cyclodecatriene, cycloundecane, cyclododecane, bicycloheptane, bicyclohexane, bicyclohexene, tricyclohexene, norcarane, norpinane, norbornane, norbornene, tricycloheptane, tricycloheptene, decalin, adamantane, etc., are exemplified.

As the examples of aromatic rings, an aryl ring (e.g., benzene, naphthalene, dihydronaphthalene, indene, fluorene, acenaphthylene, acenaphthene, biphenylene, etc.), and a heterocyclic group having a monocyclic or polycyclic structure containing at least any one of an oxygen atom, a sulfur atom and a nitrogen atom (as the heterocyclic group, e.g., a furanyl group, a tetrahydrofuranyl group, a pyranyl group, a pyrroyl group, a chromenyl group, a phenoxathiinyl group, an indazoyl group, a pyrazoyl group, a pyridyl group, a pyrazinyl group, a pyrimidinyl group, an indoyl group, an isoindoyl group, a quinonyl group, a pyrrolidinyl group, a pyrrolinyl group, an imidazolinyl group, a pyrazolidinyl group, a piperidinyl group, a piperazinyl group, a morpholinyl group, a thienyl group, a benzothienyl group, etc.) are exemplified. The aryl ring is preferably an aryl ring having from 6 to 18 carbon atoms.

The alkylene chain contained in a branched chain extending unit is preferably an alkylene group having from 1 to 22 carbon atoms, and more preferably alkylene group having from 1 to 12 carbon atoms. The cyclic structure and the alkylene chain may be directly bonded, or may be bonded via other divalent linking group. As the divalent linking group, —O—, —S—, —COO—, —OCO—, —NHCOO—, —NHCONH—, —SO$_2$—, —CO—, —CON(Q$^1$)-, —SO$_2$N(Q$^1$)-, etc., are exemplified (wherein Q$^1$ represents a hydrogen atom, an aliphatic group having from 1 to 6 carbon atoms that may be substituted, e.g., a methyl group, an ethyl group, a propyl group, a butyl group, a pentyl group, a hexyl group, a 2-chloroethyl group, a 2-bromoethyl group, a 2-cyanoethyl group, a 2-methoxyethyl group, etc.).

The branched chain extending unit of polybranched polymer (HB) as the core formed by the reaction with a branched chain extending compound is preferably selected from a polyester structure, a polyamide structure and a polyamineamide structure. The film strength of the hardened films formed of hardening polybranched polymers comprising the branched chain extending units is preferably improved more. Further, these polybranched polymers (HB) can be easily synthesized according to successive polymerization reaction, so that they are preferably supplied as inexpensive materials.

As described above, branches of polybranched polymer (HB) as the core have terminal structures of reactive groups (a) having reactivity with a branch extending compound. As reactive groups (a) at the terminals of branches, a carboxyl group, a hydroxyl group, an amino group, an epoxy group, etc., are exemplified. Polybranched polymer as the core in the invention having the number of from 6 to 128 of reactive groups (a) at the terminals of branches are preferred, and from 8 to 64 are more preferred.

The mass average molecular weight (weight average molecular weight) of polybranched polymer (HB) as the core is generally from about 1,000 to about 50,000, and preferably from about 1,500 to about 20,000. When the mass average molecular weight is in this range, hardening reaction sufficiently progresses and the film strength of the obtained hardened film can be retained.

The average degree of branching (DB) of polybranched polymer (HB) is defined in literatures as the number average factor of branching groups per a molecule, i.e., the proportion of "terminal groups+branching groups" to "the total number of terminal groups, branching groups and linear groups". In regard to an ideal dendron and dendrimer, the degree of branching is 1. In connection with an ideal linear polymer, the degree of branching approximates 0. The degree of branching (DB) is expressed by the following expression as defined in Hawker C. J., Lee, R., Frechet, J. M. J., *J. Am. Chem. Soc.*, Vol. 113, p. 4583 (1991) (in the expression, Nt represents the number of terminal groups, Nb represents the number of branching groups, and Nl represents the number of linear groups).

$$DB = \frac{Nt + Nb}{Nt + Nb + Nl}$$

The degree of branching (DB) of the polybranched molecule used in the invention is of a range of from dendrimer (having the degree of branching of 1 in the ideal case) to 0.25. More typically, polybranched polymers having the degree of branching of from 0.25 to 0.80 can be easily manufactured, and relatively inexpensive as compared with dendrimers. In short, it is preferred for a polybranched molecule to have the form extending radially. The more preferred degree of branching is from 0.3 to 0.8.

Crosslinking Group in Hardening Polybranched Polymer (RHB):

Hardening polybranched polymer (RHB) in the invention has a hardening group capable of crosslinking reaction by light and/or heat at least a part of the terminals of branches of polybranched polymer (HB).

It is preferred for 5% or more branches of all the branches of polybranched polymer (HB) as the core (hereinafter sometimes referred to as merely "a core molecule") to contain hardening groups, by which sufficient film strength can be revealed. The number of the branches having hardening groups is more preferably from 10 to 90%.

The hardening groups capable of crosslinking reaction may be the same or different. The hardening groups capable of crosslinking reaction are not especially restricted and, e.g., a group having an active hydrogen atom (e.g., a hydroxyl group, a carboxyl group, an amino group, a carbamoyl group, a mercapto group, a β-keto ester group, a hydrosilyl group, a silanol group, etc.), a group having a radical polymerizable unsaturated double bond, a cationic polymerizable group, a group containing acid anhydride, a hydrolyzable silyl group (e.g., an alkoxysilyl group, an acyloxysilyl group, etc.), a group capable of being substituted with a nucleophilic agent (an active halogen atom, a sulfonic ester, etc.), and an isocyanate group (which may be a block isocyanate group that is protected and generates an isocyanate group by heating) are exemplified. The hardening group capable of crosslinking reaction is preferably a group selected from a radical polymerizable group, a cationic polymerizable group, and a hydrolyzable silyl group. These groups are described below.

Radical Polymerizable Group:

As the radical polymerizable group, a hardening group represented by the following formula (1) is exemplified.

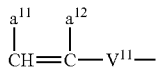

Formula (1)

In formula (1), $V^{11}$ represents —COO—, —OCO—, —CH$_2$OCO—, —CH$_2$COO—, —O—, —CONHCOO—, —CONHCO—, —SO$_2$—, —CO—, —CON(Q$^{11}$)-, —SO$_2$N (Q$^{11}$)-, or a phenylene group (hereinafter sometimes a phenylene group is represented by Ph, provided that Ph includes 1,2-, 1,3- and 1,4-phenylene groups). $Q^{11}$ represents a hydrogen atom, an aliphatic group having from 1 to 8 carbon atoms that may be substituted (e.g., a methyl group, an ethyl group, a propyl group, a butyl group, a 2-chloroethyl group, a 2-bromoethyl group, a 2-cyanoethyl group, a 2-methoxyethyl group, a benzyl group, a fluorobenzyl group, a methylbenzyl group, a cyclohexylmethyl group, a 2-ethoxyethyl group, a 3-methoxypropyl group, etc.). $V^{11}$ preferably represents —COO—, —OCO—, —CONH—, —CH$_2$OCO—, —CH$_2$COO—, —O—, or a phenylene group, $a^{11}$ and $a^{12}$, which may be the same or different, each represents a hydrogen atom, a halogen atom (a fluorine atom, a chlorine atom, a bromine atom, etc.), a cyano group, an alkyl group (e.g., a methyl group, an ethyl group, a propyl group, a butyl group, etc.), or a CH$_2$COOR$^{11}$ group (where R$^{11}$ represents an alkyl group, e.g., a methyl group, an ethyl group, a propyl group, a butyl group, a hexyl group, etc.).

These polymerizable groups may be directly bonded to an organic residue that underwent chemical bonding reaction (described later) with reactive group (a) at the terminal of the branch of a core molecule, or may be bonded via a linking group. The linking group here is a linking group having atom number of from 1 to 22 in all (the atom number in all here is the number exclusive of hydrogen atoms bonding to a carbon atom, a nitrogen atom, or a silicon atom). The linking group is constituted of arbitrary combination of atomic groups consisting of a carbon atom-carbon atom bond (a single bond or a double bond), a carbon atom-hetero atom bond (the hetero atoms are, e.g., an oxygen atom, a sulfur atom, a nitrogen atom, a silicon atom, etc.), and a hetero atom-hetero atom bond. For example, the following are exemplified as atomic groups. A direct bond or a linking group having atom number of from 1 to 22 in all is preferred.

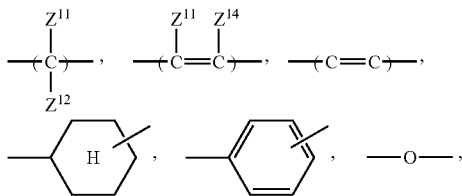

-continued

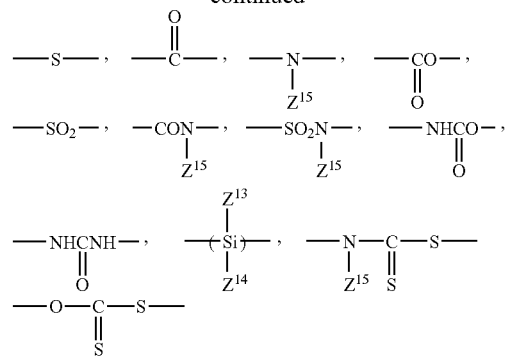

In the above formulae, $Z^{11}$ and $Z^{12}$ each represents a hydrogen atom, a halogen atom, (e.g., a fluorine atom, a chlorine atom, a bromine atom, etc.), a cyano group, a hydroxyl group, or an alkyl group (e.g., a methyl group, an ethyl group, a propyl group, etc.); $Z^{13}$ and $Z^{14}$ each represents a hydrogen atom, or a hydrocarbon group having from 1 to 8 carbon atoms (e.g., a methyl group, an ethyl group, a propyl group, a butyl group, a pentyl group, a hexyl group, a cyclohexyl group, a benzyl group, a phenethyl group, a phenyl group, a tolyl group, etc.); and $Z^{15}$ represents a hydrogen atom, or a hydrocarbon group having from 1 to 8 carbon atoms (e.g., the same groups as in $Z^{13}$ above).

Cationic Polymerizable Group:

As the cationic polymerizable group in the invention, a functional group containing a polymerizable group capable of causing polymerization reaction and/or crosslinking reaction when irradiated with actinic energy ray in the presence of an actinic energy ray-sensitive cationic polymerization initiator is exemplified. Specifically, an epoxy group, a cyclic ether group, a cyclic acetal group, a cyclic lactone group, a cyclic thioether group, a sporoortho ester compound, a vinyloxo group, etc., are exemplified. More specifically, those having chemical structures exemplified in the cationic polymerizable monomer (M$_{A2}$) described later can be exemplified. These photo-cationic polymerizable groups may be directly bonded to the branches of a core molecule, or may be bonded via a linking group.

Hydrolyzable Silyl Group:

As the hydrolyzable group-substituted silyl group having a property as a hardening reactive group, a group having a structure represented by the following formula (2) can be exemplified. Such a hydrolyzable group-substituted silyl group may be directly bonded to the branches of a core molecule, or may be bonded via a linking group.

$(R^{21}O)_{3-a}(R^{22})_a Si—$ Formula (2)

In formula (2), an (R$^{21}$O) group represents an alkoxyl group (in the case where R$^{21}$ represents an aliphatic group), or an acyloxy group (in the case where R$^{21}$ represents —COR$^{20}$), which group becomes a silanol group by hydrolysis [typically, (HO)$_{3-a}$—Si(R$^{22}$)$_a$—], and polycondensation reaction progresses. When R$^{21}$ represents an aliphatic group, a straight chain or branched aliphatic group having from 1 to 8 carbon atoms that may be substituted (e.g., a methyl group, an ethyl group, a propyl group, a butyl group, a pentyl group, group, a hexyl group, a trifluoroethyl group, a methoxymethyl group, a benzyl group, a phenethyl group, a cyclohexyl group, a cyclohexyl-methyl group, etc.) can be exemplified as the aliphatic group. When R$^{21}$ is —COR$^{20}$, R$^{20}$ represents a hydrocarbon group, preferably a straight chain or branched aliphatic group having from 1 to 6 carbon atoms that may be substituted (specifically having the same meaning as above $R^{21}$, and specific examples are also the same), a phenyl group that may be substituted (e.g., a phenyl group, a methoxyphenyl group, a fluorophenyl group, a tolyl group, a xylyl group, etc.) are exemplified. As the preferred ($R^{21}O$) group of these, an alkoxyl group having from 1 to 4 carbon atoms or an acyloxy group having from 1 to 3 carbon atoms is exemplified from the points of hydrolysis reactivity of the ($R^{21}O$) group, and a drying property of alcohols or carboxylic acids by-produced by desorption in a drying process of a coated film. $R^{22}$ represents a hydrocarbon group, preferably an aliphatic group having from 1 to 12 carbon atoms, or an aryl group having from 6 to 12 carbon atoms. These hydrocarbon groups may be substituted. Specifically, the same groups as the substituent $R^{01}$ of a non-polymerizable bonding group described later are exemplified.

Hardening polybranched polymer (RHB) in the invention may have a structure in which a non-polymerizable hydrocarbon group is added to a part of all the branches, that is, a structure chemically modified with other non-polymerizable bonding group. As such terminal bonding groups, $-OR^{01}$, $-OCOR^{01}$, $-COOR^{01}$, $-CONHR^{01}$, $-NHCOR^{01}$, $-NHSO_2R^{01}$, $-N(R^{01})(R^{02})$, $-OOCNHR^{01}$, $-NHCONHR^{01}$, etc., are exemplified.

$R^{01}$ and $R^{02}$ each represents a hydrocarbon group having from 1 to 32 carbon atoms. The hydrocarbon group is an aliphatic group, an aryl group or a heterocyclic group. As the aliphatic group, a straight chain or branched alkyl group having from 1 to 32 carbon atoms (e.g., a methyl group, an ethyl group, a propyl group, a butyl group, a pentyl group, a hexyl group, a heptyl group, an octyl group, a nonyl group, a decyl group, an undecyl group, a dodecyl group, a tridecyl group, a tetradecyl group, a pentadecyl group, a hexadecyl group, a heptadecyl group, an octadecyl group, a nonadecyl group, an eicosanyl group, a heneicosanyl group, a docosanyl group, etc.), a straight chain or branched alkenyl group having from 2 to 32 carbon atoms (e.g., a vinyl group, a propenyl group, a butenyl group, a pentenyl group, a hexenyl group, an octenyl group, a dodecenyl group, a tridecenyl group, a tetradecenyl group, a hexadecenyl group, an octadecenyl group, an eicosenyl group, a docosenyl group, a butadienyl group, a pentadienyl group, a hexadienyl group, an octadienyl group, etc.), a straight chain or branched alkynyl group having from 2 to 22 carbon atoms (e.g., an ethynyl group, a propynyl group, a butynyl group, a hexynyl group, an octanyl group, a decanyl group, a dodecanyl group, etc.), and an alicyclic hydrocarbon group having from 5 to 22 carbon atoms (as the alicyclic hydrocarbon group, monocyclic, polycyclic, and crosslinking alicyclic hydrocarbon groups are exemplified, and as the specific examples thereof, cyclic hydrocarbons, e.g., cyclopentane, cyclopentene, cyclopentadiene, cyclohexane, cyclohexene, cyclohexadiene, cycloheptane, cycloheptene, cycloheptadiene, cyclooctane, cyclooctene, cyclooctadiene, cyclooctatriene, cyclosonane, cyclosonene, cyclodecane, cyclodecene, cyclodecanediene, cyclodecatriene, cycloundecane, cyclododecane, bicycloheptane, bicyclohexane, bicyclohexene, tricyclohexene, norcarane, norpinane, norbornane, norbornene, norbornadiene, tricycloheptane, tricycloheptene, decalin, adamantane, etc., are exemplified) are exemplified.

Of these aliphatic groups, a straight chain aliphatic group having from 1 to 18 carbon atoms, a branched aliphatic group having from 3 to 18 carbon atoms, and a cyclic aliphatic group having from 5 to 16 carbon atoms are more preferred.

These aliphatic groups may have a substituent, and as the introducible substituents, monovalent nonmetallic atomic groups exclusive of a hydrogen atom are used. As the specific examples of the nonmetallic atomic groups, a halogen atom (a fluorine atom, a chlorine atom, a bromine atom, an iodine atom), a cyano group, a nitro group, an $-OH$ group, $-OR^{011}$, $-SR^{011}$, $-COR^{011}$, $-COOR^{011}$, $-OCOR^{011}$, $-SO_2R^{011}$, $-NHCONHR^{011}$, $-N(R^{012})COR^{011}$, $-N(R^{012})SO_2R^{011}$, $-N(R^{013})(R^{014})$, $-CON(R^{013})(R^{014})$, $-SO_2N(R^{013})(R^{014})$, $-P(=O)(R^{015})(R^{016})$, $-OP(=O)(R^{015})(R^{016})$, $-Si(R^{017})(R^{018})(R^{019})$, an alkyl group having from 1 to 18 carbon atoms, an alkenyl group having from 2 to 18 carbon atoms, an alkynyl group having from 2 to 18 carbon atoms, an alicyclic hydrocarbon group having from 5 to 10 carbon atoms, an aryl group having from 6 to 18 carbon atoms (as the aryl ring, e.g., benzene, naphthalene, dihydronaphthalene, indene, fluorene, acenaphthylene, biphenylene, etc.), and a heterocyclic group having a monocyclic or polycyclic structure containing at least any one of an oxygen atom, a sulfur atom and a nitrogen atom (as the heterocyclic group, e.g., a furanyl group, a tetrahydrofuranyl group, a pyranyl group, a pyrroyl group, a chromenyl group, a phenoxathiinyl group, an indazoyl group, a pyrazoyl group, a pyridyl group, a pyrazinyl group, a pyrimidinyl group, an indoyl group, an isoindoyl group, a quinonyl group, a pyrrolidinyl group, a pyrrolinyl group, an imidazolinyl group, a pyrazolidinyl group, a piperidinyl group, a piperazinyl group, a morpholinyl group, a thienyl group, a benzothienyl group, etc.), etc., are exemplified.

These alkenyl group, alkynyl group, alicyclic hydrocarbon group, aryl group, and heterocyclic group may further have a substituent, and as the substituents, the same groups shown above as the groups introducible to the aliphatic group are exemplified.

The above $R^{011}$ represents an aliphatic group having from 6 to 18 carbon atoms, an aryl group having from 6 to 18 carbon atoms, or a heterocyclic group. The aliphatic group represented by $R^{011}$ has the same definition as the aliphatic group represented by $R^{01}$. As the aryl group represented by $R^{011}$, the same aryl groups shown above as the substituents introducible to the aliphatic group represented by $R^{01}$ are exemplified. These aryl groups may further have a substituent, and as the substituents, the same groups shown above in $R^{01}$ as the groups introducible to the aliphatic group are exemplified. $R^{012}$ represents a hydrogen atom or the same group as represented by $R^{011}$.

$R^{013}$ and $R^{014}$ each represents a hydrogen atom, or the same group as represented by $R^{011}$, and $R^{013}$ and $R^{014}$ may be bonded to each other to form a 5- or 6-membered nitrogen atom-containing ring.

$R^{015}$ and $R^{016}$ each represents an aliphatic group having from 1 to 22 carbon atoms, an aryl group having from 6 to 14 carbon atoms, or $-OR^{011}$. The aliphatic group represented by $R^{015}$ and $R^{016}$ has the same meaning as the aliphatic group represented by $R^{01}$. As the aryl group represented by $R^{015}$ and $R^{016}$, the same aryl groups shown above as the substituents introducible to the aliphatic group represented by $R^{01}$ are exemplified. These aryl groups may further have a substituent, and as the substituents, the same groups shown above in $R^{01}$ as the groups introducible to the aliphatic group are exemplified.

$R^{017}$, $R^{018}$ and $R^{019}$ each represents a hydrocarbon group having from 1 to 22 carbon atoms or $-OR^{020}$, and at least one of these substituents represents a hydrocarbon group. The hydrocarbon group is the same as the aliphatic group and aryl group represented by $R^{01}$, and $-OR^{020}$ is the same as $-OR^{011}$ above.

As the aryl group represented by $R^{01}$ and $R^{02}$ in the polar group, the same aryl group exemplified as the substituents introducible into the aliphatic group in $R^{01}$ can be exemplified. Further, the aryl group may further have a substituent, and as the introducible substituents, the same groups described above as the substituents introducible into the aliphatic group in $R^{01}$ can be exemplified.

As the heterocyclic group represented by $R^{01}$ and $R^{02}$ in the polar group, the same heterocyclic group exemplified as the substituents introducible into the aliphatic group in $R^{01}$ can be exemplified. Further, the heterocyclic group may further have a substituent, and as the introducible substituents, the same groups described above as the substituents introducible into the aliphatic group in $R^{01}$ can be exemplified.

$R^{02}$ in terminal bonding group ($-N(R^{01})(R^{02})$) represents a hydrogen atom or the same meaning as $R^{01}$ above.

When hardening polybranched polymer (RHB) in the invention is used as the matrix of the low refractive index layer of an antireflection film, it is preferred to select a fluorine-containing hydrocarbon group as the non-polymerizable chemical modifier so as not to increase the refractive index of the matrix. As the fluorine-containing hydrocarbon group, a fluorine-containing alkyl group having from 1 to 20 carbon atoms, and especially preferably from 2 to 12 carbon atoms. Specifically, the same groups as the fluoroalkyl group in a fluorine compound for a low refractive index layer described later is exemplified.

The proportion of branches comprising non-polymerizable terminal bonding groups in a molecule is preferably from 0 to 95% in all the branches, more preferably from 5 to 80%, and especially preferably from 10 to 50%. When the proportion is in this range, hardened film strength and humidity stability are bettered.

Hardening polybranched polymer (RHB) in the invention can be obtained by synthesizing a polybranched polymer as the core, and modifying the polar groups at terminal of branches with a specific substituent according to known synthesizing method, e.g., divergent method, or a synthesizing method such as polycondensation reaction of an ABx type compound.

As polybranched polymers (HB) as the core, the polymers described in D. A. Tomallia, et al., *Angew. Chem. Int. Ed. Engl.*, Vol. 29, p. 138 (1990), Roovers, J., *Advances in Polymer Science*, Vol. 143, p. 1, Springer, New York (1999), J. C. Salamone, Ed., *Polymeric Materials Encyclopedia*, Vol. 5, p. 3049, CRC Press, New York (1996), Masaaki Kakimoto, *Kobunshi (Polymer)*, Vol. 47, p. 804 (1998), and the literatures quoted in these books are exemplified.

As the specific examples of polybranched polymers (HB) as the core, for example, as polyamino series polybranched polymers, reaction of butylenediamine and acrylonitrile to reduce the terminal nitrile group to amine is taken as one step, and propyleneimine series polybranched polymers obtained by repeating the above reaction (WO 93/14147, U.S. Pat. No. 5,530,092, JP-B-7-330631); amine series polybranched polymers obtained by ring opening polymerization reaction with amine as the nucleophilic ingredient and using a palladium catalyst (M. Suzuki, et al., *Macromolecules*, Vol. 31, p. 1716 (1998)); reaction comprising adding methyl acrylate to ammonia and ethylenediamine by Michael addition, and further introducing secondary amino group to the terminals by ester amide exchange reaction is taken as one step, and amideamine series polybranched polymers obtained by repeating the above reaction according to necessity (WO 84/02705, JP-B-6-70132); polyamide series polybranched polymers (S. C. E. Backson, et al., *Macromol. Symp.*, Vol. 77, p. 1 (1994), JP-A-2000-86758, JP-A-2000-256459); polyphenylene ester series polybranched polymers (K. L. Wooley, et al., *Polymer Journal*, Vol. 26, p. 187 (1994)); polyether ketone series polybranched polymers (C. J. Hawker, *Macromolecules*, Vol. 29, p. 4370 (1996)); polyurethane or polyurea series polybranched polymers (R. Spindler, *Macromolecules, Vol.* 26, p. 4809 (1993), A. Kumar, *Chem. Commun.*, p. 1629 (1998), etc.); polyether series polybranched polymers (V. Percec et al., *Macromolecules*, Vol. 27, p. 4441 (1994), C. J. Hawker, et al., *J. Am. Chem. Soc.*, Vol. 112, p. 7638 (1990), JP-A-2001-206886, JP-A-2002-37823); polyester series polybranched polymers terminating by a hydroxyl group (U.S. Pat. No. 5,418,301, WO 96/12754, JP-T-2003-522266); polyester series polybranched polymers terminating by a carboxyl group (S. R. Turner, et al., *Macromolecules*, Vol. 27, p. 1611 (1994), JP-A-11-60540); and polyester series polybranched polymers terminating by a group containing an epoxy group (U.S. Pat. No. 5,663,247, WO 96/1358) are exemplified, but the invention is not restricted thereto.

As polybranched polymer (HB) as the core, commercially available-products, e.g., aliphatic polyester series polybranched polymer BOLTORN (a trade name, manufactured by Perstorp), polypropylamino series polybranched polymers (manufactured by DSM), poly(amideamine) polybranched polymers STARBURST (manufactured by PAMAN), and Dendrimer (trade name, manufactured by Aldrich) can be used.

Compounds having a hardening group as hardening polybranched polymer (RHB) can be easily synthesized by the polymer reaction of a reactive group capable of covalent bonding by reaction with the polar group at the branch terminal of polybranched polymer (HB) as the core (—OH, —NH₂, —COOH, an epoxy group, etc.)—that is, as described above, unreacted reactive group (a) at the terminal that is the branched chain extending unit extended by chemical bonding for generations from the central group core of polybranched polymer (HB) with the residue of reactive group (b) being in the direction of the group core and the residues of a plurality of reactive groups (a) being outside— and a compound having a hardening group. Conventionally known combinations can be exemplified as the combinations of reactions and combinations are not especially restricted. Specifically, in the combinations of reactive groups shown in the following table, modification is applied to a specific polar group.

TABLE 1

| Reactive Group (a) at the Terminals of Branches | Reactive compound for chemical modification |
|---|---|
| —OH | Halide (chloride, bromide, iodide) |
| —COOH | Alcohol, amine |
| —NH₂ | Acid halide, acid anhydride, carboxylic acid, isocyanate, epoxy compound, thioepoxy compound |
| Epoxy group | Alcohol, carboxylic acid, carboxylic anhydride, amine |
| —NH₂ | Compounds containing an acryloyloxy group and a hardening group other than an acryloyloxy group (Michael addition) |

Hardening polybranched polymer (RHB) can be synthesized according to the methods described in detail in, e.g., compiled by Nippon Kagaku-kai, *Shin Jikken Kagaku Koza* 14 (*Lectures on New Experimental Chemistry* 14), "Yuki Kagobutsu no Gosei to Hanno [II] [III] (Synthesis and Reaction of Organic Compounds [II] [III])", Maruzen Co., Ltd. (1977).

As specific compounds, ethylenic unsaturated group-containing polyester type dendrimer compound that is the reaction product of polyester polyol dendrimer compound (a) and ethylenic unsaturated group-containing monocarboxylic acid (b) disclosed in JP-A-2005-76005 (Synthesis Example 1) can be used. A method of introducing a non-polymerizable terminal bonding group into the terminal of a branch can also be used.

The addition amount of polymerizable compound $M_A$ is preferably from 1 to 500 mass parts (weight parts) or so per 100 mass parts of hardening polybranched polymer (RHB), and the addition amount of from 5 to 100 mass parts or so per 100 mass parts of hardening polybranched polymer (RHB) is especially preferred.

It is preferred to contain the radical polymerizable compound and the cationic polymerizable compound in proportion of radical polymerizable compound/cationic polymerizable compound in mass ratio (weight ratio) of from 90/10 to 20/80, and more preferably in proportion of from 80/20 to 30/70.

As the compounds usable in the invention, Compounds (RHB-1) to (RHB-16) described in Synthesis Examples 1 to 16 in JP-A-2006-10829 can be exemplified.

1-1-4. Hardening Fluorine-Containing Polymer

For lowering the refractive index of an overcoat layer, fluorine-containing polymerizable polymer can be added to the overcoat layer-coating composition. As the specific compounds, a polymer containing a crosslinking or polymerizable functional group usable in a low refractive index layer described later in 2-4-1. (1) can be exemplified. Even when a low refractive index material is used in an overcoat layer, the overcoat layer is not used in an embodiment having a layer thickness of reducing the refractive index by utilizing optical interference of $n\lambda/4$ (n is the refractive index of the overcoat layer, $\lambda$ is observation wavelength, typically 550 nm) at the interface with the hard coat layer.

1-1-5. Using Method of a Polymerizable Compound in a Hard Coat Layer and an Overcoat Layer In the invention, it is preferred that the weight average molecular weight (MOC) of the polymerizable compound contained in an overcoat layer-coating composition is higher than the weight average molecular weight (MHC) of the polymerizable compound contained in a hard coat layer-coating composition from the viewpoints of curling prevention, scratch resistance improvement and fixation of an antifouling agent. The ratio of MOC/MHC is preferably 1.0 or more and 100 or less, more preferably 1.0 or more and 15.0 or less, and still more preferably 1.1 or more and 6.0 or less. When the ratio of MOC/HHC is set in this range, curling prevention and/or scratch resistance can be ensured. In the case where the ratio of MOC/MHC is less than 1.0, when curling prevention is satisfied on one hand, scratch resistance and an antifouling property are insufficient on the other hand, while if scratch resistance is satisfied, curling prevention deteriorates.

As the effect of increase in molecular weight of a polymerizable compound on the improvements of curling prevention and scratch resistance, molecular weight increase to 1,000 to 10,000 or so is most effective, and when it is higher than the above range, the effect is liable to be saturated. The increase in molecular weight to higher than 100,000 results in the reduction of the rate of reaction of a polymerizable functional group and the complication of processes in synthesis of the compound, so that practicability lowers.

The values of MOC and MHC are not especially limited so long as the ratio of MOC/MHC satisfies the range of 1.0 or higher and 100 or lower, but the combination of MHC of from 290 to 1,000 and MOC of from 290 to 100,000 is preferred, the combination of MHC of from 290 to 600 and MOC of from 290 to 50,000 is more preferred, and the combination of MHC of from 300 to 600 and MOC of from 300 to 9,000 is most preferred. The combination of MHC of from 300 to 600 and MOC of from 300 to 3,600 is especially preferred.

Incidentally, when a compound having a plurality of polymerizable functional groups in one molecule contained in a layer comprises compounds having a plurality of structures, the weight average molecular weight of that layer is a molecular weight obtained by weight averaging the mass proportions (weight proportions) of these constituents.

The compound having a plurality of polymerizable functional groups in one molecule that is contained in the composition of the overcoat layer coating solution may be used alone or two or more in combination. When a plural of the polymerizable compounds are present, the weight average molecular weight of the polymerizable compounds is defined by mass (weight) weighted mean of these polymerizable compounds. The molecular weight of a polymerizable compound can be computed as polystyrene equivalent with a GPC analyzer using columns of TSKgel GMHxL, TSKgel G4000HxL, and TSKgel G2000HxL (trade names, manufactured by TOSO CORPORATION), a solvent (DMF), and a differential refractometer.

1-2. Inorganic Fine Particles

A hard coat layer and an overcoat layer in the invention can contain inorganic fine particles. In the invention, it is not necessarily essential to contain inorganic fine particles in both layers, and the kinds and contents of inorganic fine particles in both layers can be adjusted according to purposes.

From the viewpoints of pencil hardness and the prevention of curling, it is preferred that the content of inorganic fine particles in a hard coat layer is higher than that of an overcoat layer, and it is also possible not to contain inorganic fine particles in an overcoat layer. In view of the improvement of scratch resistance, it is preferred for an overcoat layer to contain inorganic fine particles.

As the inorganic particles, oxides of at least one metal selected from silicon, zirconium, titanium, aluminum, indium, zinc, tin and antimony are exemplified. As specific examples, $SiO_2$, $ZrO_2$, $TiO_2$, $Al_2O_3$, $In_2O_3$, $ZnO$, $SnO_2$, $Sb_2O_3$, ITO, etc., are exemplified. Besides these, $BaSO_4$, $CaCO_3$, talc and kaolin are included. Further, composites of these particles can also be used.

The particle size of inorganic particles for use in the invention is preferably as fine as possible in a dispersion medium. The average particle size is preferably from 1 to 1,000 nm, more preferably from 5 to 150 nm, and most preferably from 10 to 100 nm. By fining inorganic particles to 100 nm or smaller, a film not impaired in transparency can be formed. The particle size of an inorganic particle can be measured by a light scattering method and from electron microphotographs. The specific surface area of an inorganic particle is preferably from 10 to 400 $m^2/g$, more preferably from 20 to 200 $m^2/g$, and most preferably from 30 to 150 $m^2/g$.

In the invention, the content of inorganic particles is from 1 to 70% in view of curling improvement, preferably from 2 to 50%, and still more preferably from 5 to 40%.

In a preferred embodiment in the invention, low refractive index particles, electrically conductive particles, or high refractive index particles can be used as inorganic fine particles. Each of these inorganic fine particles is described below.

1-2-1. Low Refractive Index Inorganic Fine Particles

It is preferred to use inorganic particles having a low refractive index in an overcoat layer to reduce the reflectance of surface. As low refractive index inorganic particles, fine particles of magnesium fluoride and silica are exemplified. From the points of refractive index, dispersion stability and costs, silica fine particles are especially preferred.

Silica fine particles may be either crystalline or amorphous, and may be monodispersed particles or may be agglomerated particles so long as the prescribed particle size is satisfied. The shape is most preferably spherical, but amorphous particles may be used with no problem.

Inorganic Fine Particles Having Holes on the Surfaces of Particles or Inside the Particles (Silica Particles):

It is preferred to use inorganic fine particles having holes on the surface or inside of particles (preferably silica particles) for the purpose of reducing the refractive index more. The refractive index of silica particles having holes is preferably from 1.10 to 1.40, more preferably from 1.15 to 1.35, and most preferably from 1.17 to 1.30. The refractive index here means the refractive index of particles as a whole. The void ratio of silica particles having holes is preferably from 10 to 75%, more preferably from 25 to 70%, and most preferably from 35 to 65%. When the void ratio is in this range, the dispersibility of particles themselves, the strength of particles themselves, and the strength of a coated film are secured.

The manufacturing methods of silica particles having holes are disclosed, e.g., in JP-A-2001-233611 and JP-A-2002-79616. Particles having cavities inside the shell and particles whose pores of the shell are choked are especially preferred. The refractive index of silica particles can be computed according to the method disclosed in JP-A-2002-79616. In the invention, the specific surface area of pore-containing silica is preferably from 20 to 300 $m^2/g$, more preferably from 30 to 120 $m^2/g$, and most preferably from 40 to 90 $m^2/g$. The surface area can be found according to BET method using nitrogen.

The average particle size of low refractive index fine particles is preferably from 1 to 1,000 nm, more preferably from 5 to 150 nm, and most preferably from 10 to 100 nm. It is also preferred to use particles different in average particle size in combination, and using particles having average particle size of from 10 to 40 nm and particles of from 40 to 100 in combination is preferred in the point of scratch resistance. The coating amount of low refractive index particles is preferably from 1 to 500 $mg/m^2$, more preferably from 5 to 200 $mg/m^2$, and still more preferably from 10 to 100 $mg/m^2$. When the coating amount is in this range, scratch resistance, curling prevention and an antifouling property are well balanced.

In the invention, the specific surface area of hollow silica is preferably from 20 to 300 $m^2/g$, more preferably from 30 to 120 $m^2/g$, and most preferably from 40 to 90 $m^2/g$. The surface area can be found according to BET method using nitrogen.

1-2-2. Electrically Conductive Particles

A film in the invention can use various electrically conductive particles for giving conductivity.

The conductive particles are preferably formed of metallic oxide or metallic nitride. As the examples of metallic oxides and metallic nitrides, tin oxide, indium oxide, zinc oxide and titanium nitride are included. Tin oxide and indium oxide are especially preferred. The conductive inorganic particles comprise the metallic oxide or metallic nitride as the main component and may further contain other elements. The main component means a component that is the highest in content (mass % (weight %)) in the components constituting particles. As the examples of other elements, Ti, Zr, Sn, Sb, Cu, Fe, Mn, Pb, Cd, As, Cr, Hg, Zn, Al, Mg, Si, P, S, B, Nb, In, V and a halogen atom are included. For heightening the conductivity of tin oxide and indium oxide, it is preferred to add Sb, P, B, Nb, In, V and a halogen atom. Tin oxide containing Sb (ATO) and indium oxide containing Sn (ITO) are especially preferred. The proportion of Sb in ATO is preferably from 3 to 20 mass %. The proportion of Sn in ITO is preferably from 5 to 20 mass %.

The average particle size of primary particles of conductive inorganic particles is preferably from 1 to 150 nm, more preferably from 5 to 100 nm, and most preferably from 5 to 7 nm. The average particle size of conductive inorganic particles in an antistatic layer to be formed is from 1 to 200 nm, preferably from 5 to 150 nm, more preferably from 10 to 100 nm, and most preferably from 10 to 80 nm. The average particle size of conductive inorganic particles is an average size with the mass of particles as weight, and the average size can be measured by a light scattering method and from electron microphotographs.

The specific surface area of conductive inorganic particles is preferably from 10 to 400 $m^2/g$, more preferably from 20 to 200 $m^2/g$, and still more preferably from 30 to 150 $m^2/g$.

Porous or Hollow Electrically Conductive Particles:

Of the conductive particles usable in the invention, conductive particles having porosities or hollows on the inside by the introduction of voids for the purpose of reducing the refractive index are described below. The conductive fine particles in the invention may have any composition and structure so long as the inside of the particles are porous or hollow and they have electrical conductivity. As preferred conductive fine particles in the invention, core/shell type composite fine particles comprising a fine particle having a high porosity (a high void ratio) as the core and having provided a shell layer of an electrically conductive material on the outside, and inside vacancy type hollow fine particles comprising an acid-, alkali- or organic solvent-soluble fine particle as the core, and having provided a shell layer of an electrically conductive material on the outside to form composite fine particle, and then the core particle is removed by treatment with acid, alkali or organic solvent to form vacancy inside are exemplified.

In both particles, core particles may be electrically conductive or nonconductive.

In the former case, i.e., core/shell type composite fine particles, the kinds of core particles are not restricted so long as they are high porosity fine particles and shell can be formed outside, but silica gel, synthetic or natural zeolite, carbon black, Fullerene, and porous titanium oxide can be exemplified as preferred core particles. Silica gel is especially preferred.

In the latter case, i.e., inside vacuous type hollow fine particles, the kinds of core particles used in manufacturing process are not restricted so long as they can be dissolved and washed away through shell layers by treatment with acid, alkali or organic solvent. Those preferred are metallic oxide fine particles of the metals selected from Group 2A, 2B, 3A and 5B elements of the Periodic Table, and fine particles of ZnO, $Y_2O_3$ and $Sb_2O_3$ are especially preferred.

In the case of the core/shell type composite fine particles, as the methods of application of shells, a sol/gel conversion method using metal alkoxide, an addition method of metallic super fine particles via a coupling agent or the hydrolyzed product of the agent, and a doping method of an electrically conductive material can be exemplified.

For example, the inorganic fine particles may be directly formed on the surfaces of $SiO_2$ particles manufactured by the methods disclosed in JP-A-7-133105 and JP-A-2001-233611 by the sol/gel conversion method using metal alkoxide and the like.

Further, in the case of inside vacuous type hollow fine particles, a method of covering the surfaces of fine particles of ZnO, $Y_2O_3$ or $Sb_2O_5$ as the core with super fine particles of ATO, ITO or $SnO_2$ or the thin film of these particles as the shell material, and dissolving inside fine particles with an acid or alkali aqueous solution to form hollow electrically conductive inorganic fine particles can be used. Particles comprising silica particles the surfaces of which are covered with antimony oxide are disclosed in JP-A-2005-119909.

On the other hand, although metals such as Au, Ag, Cu, Sn, Al, Ni, Fe and Rh and alloys such as Al—Cu and Cu—Ni are colored, it is known that they have a relatively low refractive index such as 1.7 or less, and show high electrical conductivity. Accordingly, by using a small amount of super fine particles of these metals (alloys) as the shells of conductive fine particles, conductive fine particles having substantially high transparency and low refractive index can also be formed.

Core/shell type composite fine particles obtained by shell formation with a coupling agent that are preferably used in the invention are described below.

Conductive particles are composite fine particles comprising semiconductor fine particles or insulating fine particles having an average particle size of from 2 to 100 nm as the core particles and having bonded metallic super fine particle filler having an average particle size of from 1 to 20 nm to the surfaces of core particles via at least a coupling agent or the hydrolyzed product thereof. In the invention, the core particles of the semiconductor fine particles or insulating fine particles is preferably a transparent compound having a refractive index of 1.70 or less. $Al_2O_3$ and $SiO_2$ are exemplified as such a compound. The coupling agent has 2 or more reactive groups in the molecule, and at least one of the reactive groups is bonded to the semiconductor or insulating fine particle and at least one of the remainder is bonded to the metallic super fine particle to thereby bridge the semiconductor or insulating fine particle and the metallic super fine particle. The hydrolyzed product of the coupling agent may bridge the semiconductor or insulating fine particle and the metallic super fine particle.

Preferred coupling agent is a compound represented by the following formula (I): $M-(R)_n$.

In formula (I), M represents Si or Al; n represents an integer corresponding to the valence of M; and R represents an organic group, and n R's may be the same or different, but at least two of n R's are groups having reactivity with semiconductor fine particles, insulating fine particles or metallic super fine particles.

Of the organic groups represented by R, as the groups having reactivity with the semiconductor fine particles, insulating fine particles or metallic super fine particles, e.g., (1) reactive groups such as a vinyl group, an allyloxy group, an acryloxy group, a methacryloxy group, an isocyanate group, a formyl group, an epoxy group, a styryl group, a ureido group, halogen, and alkyl groups having any of these groups at terminals, (2) an alkyl group having at terminals an adsorptive group such as —SH, —CN, —$NH_2$, —$SO_2OH$, —SOOH, —$OPO(OH)_2$, or —COOH, (3) alkoxyl groups such as a methoxy group, an ethoxy group, an isopropoxy group, an n-propoxy group, a t-butoxy group, and an n-butoxy group, and (4) a phenoxy group are exemplified. These alkyl group, alkoxyl group and phenoxy group preferably have 8 or less carbon atoms. Further, these alkyl group, alkoxyl group and phenoxy group may have a substituent. The remainders of organic groups represented by R may be arbitrary groups, but preferably groups having 8 or less carbon atoms.

The specific examples of the coupling agents are shown below, but the invention is not restricted thereto.

N-(2-Aminoethyl)-3-aminopropylmethyldimethoxysilane, N-(2-aminoethyl)-3-aminopropyltrimethoxysilane, 3-aminophenoxydimethylvinylsilane, aminophenyltrimethoxy-silane, 3-aminopropyltriethoxysilane, bis(trimethoxysilyl-propyl)amine, (p-chloromethyl)phenyltrimethoxysilane, 3-(glycidoxypropyl)trimethoxysilane, 3-mercaptopropyl-trimethoxysilane, (3-glycidoxypropyl)-3-mercaptopropyl-dimethoxysilane, vinyltrichlorosilane, tetraethoxysilane, aminophenylaluminum dimethoxide, aluminum isopropoxide, etc., are exemplified.

The metallic super fine particles preferably comprise metals or alloys (composite metals) having specific resistance at 20° C. of 20 μΩ·cm or less, preferably 10 μΩ·cm or less, and more preferably 6 μΩ·cm or less. It is known that the physical values of metals or alloys are generally different as bulk and particles, and the above ranges of specific resistance are the ranges of values of metals or alloys as bulk. Accordingly, these physical values are described in literatures, such as *Kagaku Binran* (*Chemical Handbook*), compiled by Nippon Kagaku-Kai, and *Bunseki Kagaku Binran* (*Handbook of Analytical Chemistry*), compiled by Nippon Bunseki Kagaku-Kai.

As metals satisfying the above condition, Au, Ag, Cu, Zn, Cd, Al, In, TI, Sn, Co, Ni, Fe, Pd, Ir, Mo, Pt, Ru, Rh and W are exemplified. Of these metals, Au, Ag, Cu, Pt, Pd, Ni, Ru and Sn are preferred for being small in specific resistance and hardly oxidized. When the metallic ultrafine particles comprise alloys, it is preferred to use alloys containing at least one of Au, Ag, Cu, Pt, Pd, Ni, Ru and Sn. As such alloys, Cu—Zn, Cu—Sn, Al—Cu, Cu—Sn—P, Cu—Ni, Au—Ag—Cu, Au—Zn, Au—Ni, Ag—Cu—Zn, Ag—Cu—Zn—Sn, Sn—Pb, Ag—In, Cu—Ag—Ni, and Ag—Pd are exemplified, but the invention is by no means restricted thereto. The composition of each metal in alloys is not especially restricted, and various compositions can be selected. Metals and alloys may contain impurities, but the amount is preferably less than 1%. As elements of impurities, metals such as Cr, Sb, Bi and Rh, nonmetals such as P, B, C, N and S, alkali metals such as Na and K, and alkaline earth metals such as Mg and Ca are exemplified. One or two or more of these elements of impurities may be contained.

It is preferred that metallic super fine particles are bonded at least 1/10 time mass per mass of the core particle of core/shell type composite fine particles, and preferably 1/5 time mass.

In the invention conductive fine particles have a refractive index of preferably from 1.20 to 2.00, more preferably from 1.30 to 1.80, especially preferably from 1.30 to 1.70, and most preferably from 1.35 to 1.65.

The powder resistance of the conductive fine particles is preferably as low as possible, preferably $1 \times 10^5$ Ω·cm or less, more preferably $1 \times 10^4$ Ω·cm or less, still more preferably $1 \times 10^3$ Ω·cm or less, and most preferably $1 \times 10^2$ Ω·cm or less. The powder resistance can be found, e.g., by pressing a sample powder by pressure of 9.8 MPa (100 kg/$cm^2$) to form a pressed powder, and measuring the direct current resistance of the pressed powder, and this is disclosed, e.g., in JP-A-6-92636.

The average particle size of the primary particles of conductive fine particles is necessary to be lower than visible wavelength region (that is, 400 nm or less), preferably from 1 to 200 nm, more preferably from 1 to 100 nm, and still more preferably from 1 to 80 nm. When the particle is an inside vacuous type particle, the thickness of the shell part constituting the outer shell is preferably from 1 to 100 nm, more preferably from 1 to 50 nm, and most preferably from 1 to 20 nm. The shape of conductive fine particles may be any of ellipsoidal, spherical, cubic, spindle-like, rod-like, amorphous shapes, and mixtures of these shapes. The average particle size used here is the average value of the largest particle size of each fine particle. For example, in the case of spindle-like particles, the average value of the long axis length of each particle is taken as the average particle size. The particle size of conductive fine particles is defined by the average particle size of at least 1,000 particles measured with an electron microscope.

1-2-3. High Refractive Index Particles

For adjusting the refractive indexes and reducing the shrinkage due to hardening of a hard coat layer and an overcoat layer, the hard coat layer and overcoat layer can contain an oxide of at least one metal selected from titanium, zirconium, indium, zinc, tin and antimony. The average particle size of these high refractive index fine particles is preferably from 1 to 150 nm, more preferably from 1 to 100 nm, and most preferably from 2 to 60 nm.

As the specific examples of high refractive index inorganic fillers, $TiO_2$, $ZrO_2$, $Al_2O_3$, $In_2O_3$, ZnO, $SnO_2$, $Sb_2O_3$, and ITO are exemplified. $TiO_2$ and $ZrO_2$ are especially preferred from the point of the enhancement of refractive index.

As the crystal structure of particles comprising $TiO_2$ as the main component, it is preferred that rutile, mixed crystal of rutile/anatase, anatase, or amorphous structure is the main component, and it is especially preferred that rutile structure is the main component.

By adding at least one element selected from Co (cobalt), Al (aluminum) and Zr (zirconium) to particles comprising $TiO_2$ as the main component, photocatalyst activity of $TiO_2$ can be restrained, and the weather resistance of a film in the invention can be bettered.

An especially preferred element is Co (cobalt). It is also preferred to use two or more elements in combination.

Inorganic particles comprising $TiO_2$ as the main component of the invention may have a core/shell structure by surface treatment as disclosed in JP-A-2001-166104.

1-2-4. Surface Treatment of Inorganic Particles

Inorganic particles for use in the invention may be subjected to physical surface treatment such as plasma discharge treatment or corona discharge treatment, or chemical surface treatment with a surfactant or coupling agent for the purpose of dispersion stabilization in a dispersion or in a coating solution, and increasing the affinity and integrity with the binder component.

Surface treatment can be carried out with a surface treating agent of an inorganic compound or organic compound. The examples of inorganic compounds for use in the surface treatment include inorganic compounds containing cobalt ($CoO_2$, $Co_2O_3$, $Co_3O_4$, etc.), inorganic compounds containing aluminum ($Al_2O_3$, $Al(OH)_3$, etc.), inorganic compounds containing zirconium ($ZrO_2$, $Zr(OH)_4$, etc.), inorganic compounds containing silicon ($SiO_2$, etc.), and inorganic compounds containing iron ($Fe_2O_3$, etc.).

Inorganic compounds containing cobalt, inorganic compounds containing aluminum, and inorganic compounds containing zirconium are especially preferred, and inorganic compounds containing cobalt, $Al(OH)_3$ and $Zr(OH)_4$ are most preferred.

The examples of organic compounds for use in the surface treatment include polyol, alkanolamine, stearic acid, a silane coupling agent, and a titanate coupling agent. A silane coupling agent is most preferred. It is preferred for inorganic particles to be surface treated with at least one of silane coupling agents (organosilane compounds), partially hydrolyzed products thereof, and condensation products thereof.

As the titanate coupling agents, e.g., metal alkoxide, such as tetramethoxy titanate, tetraethoxy titanate, tetraisopropoxy titanate, and Plenact (KR-TTS, KR-46B, KR-55, KR-41B, manufactured by AJINOMOTO FINE-TECHNO CO., INC.) are exemplified.

As the examples of the organic compounds for use in surface treatment, polyol, alkanolamine, in addition, organic compounds having an anionic group are preferred, and organic compounds having a carboxyl group, a sulfonic acid group, or phosphoric acid group are especially preferred. Stearic acid, lauric acid, oleic acid, linoleic acid, linolenic acid can be preferably used.

It is preferred that the organic compounds for use in the surface treatment further have a crosslinking or polymerizable functional group. As the crosslinking or polymerizable functional groups, ethylenic unsaturated groups capable of addition reaction and polymerization reaction by radical seeds (e.g., a (meth)acrylic group, an allyl group, a styryl group, a vinyloxy group, etc.), cationic polymerizable groups (e.g., an epoxy group, an oxetanyl group, a vinyloxy group, etc.), and polycondensation reacting groups (e.g., a hydrolyzable silyl group, an N-methylol group, etc.), etc., are exemplified, and a group having an ethylenic unsaturated group is preferred.

These surface treatments can be used in combination of two or more, and it is especially preferred to use an inorganic compound containing aluminum and an inorganic compound containing zirconium in combination.

When the inorganic particles are silica particles, the use of a coupling agent is especially preferred. As the coupling agents, alkoxy metal compounds (e.g., a titanium coupling agent, a silane coupling agent) are especially preferably used, and silane coupling treatment is particularly effective.

These coupling agents are used as inorganic filler surface treating agents of a low refractive index layer for performing surface treatment in advance before preparation of the coating solution of the layer, but it is preferred to add them to the coating solution of the layer as additives at the time of preparation of the coating solution.

It is preferred that silica fine particles are dispersed in a medium in advance before surface treatment for reducing the load by surface treatment.

As the specific compounds of the surface treating agents and catalysts for the surface treatment that can be preferably used in the invention, the organosilane compounds and catalysts disclosed in WO 2004/017105 can be exemplified.

1-3. Organosilane Compound

It is preferred that at least one layer of the layers constituting a film in the invention contain, in a coating solution for forming the layer, at least one kind of component of an organosilane compound and/or a hydrolyzed product thereof and/or a partial condensation product thereof, what is called a sol component (hereinafter sometimes referred to like this), in the point of scratch resistance.

An organosilane compound represented by the following formula 1 is preferably used.

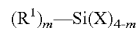   Formula 1

In formula 1, $R^1$ represents a substituted or unsubstituted alkyl group, or a substituted or unsubstituted aryl group. As the alkyl group, preferably an alkyl group having from 1 to 30 carbon atoms, more preferably from 1 to 16 carbon atoms, and especially preferably from 1 to 6 carbon atoms. As the specific examples of the alkyl groups, methyl, ethyl, propyl, isopropyl, hexyl, decyl, hexadecyl, etc., are exemplified. As the aryl group, phenyl and naphthyl are exemplified, and preferably a phenyl group.

X represents a hydroxyl group, or a hydrolyzable group, for example, an alkoxyl group (an alkoxyl group having from 1 to 5 carbon atoms is preferred, e.g., a methoxy group and an ethoxy group are exemplified), a halogen atom (e.g., Cl, Br, I, etc.), and a group represented by $R^2COO$ ($R^2$ preferably represents a hydrogen atom or an alkyl group having from 1 to 6 carbon atoms, e.g., $CH_3COO$, $C_2H_5COO$, etc., are exemplified) are exemplified, preferably an alkoxyl group, and especially preferably a methoxy group or an ethoxy group.

m represents an integer of from 1 to 3, and preferably 1 or 2.

When a plurality of X's are present, the plurality of X's may be the same or different.

The substituent contained in $R^1$ is not especially restricted, and a halogen atom (e.g., a fluorine atom, a chlorine atom, a bromine atom, etc.), a hydroxyl group, a mercapto group, a carboxyl group, an epoxy group, an alkyl group (e.g., methyl, ethyl, i-propyl, propyl, t-butyl, etc.), an aryl group (e.g., phenyl, naphthyl, etc.), an aromatic heterocyclic group (e.g., furyl, pyrazolyl, pyridyl, etc.), an alkoxyl group (e.g., methoxy, ethoxy, i-propoxy, hexyloxy, etc.), an aryloxy group (e.g., phenoxy, etc.), an alkylthio group (e.g., methylthio, ethylthio, etc.), an arylthio group (e.g., phenylthio, etc.), an alkenyl group (e.g., vinyl, 1-propenyl, etc.), an acyloxy group (e.g., acetoxy, acryloyloxy, methacryloyloxy, etc.), an alkoxycarbonyl group (e.g., methoxycarbonyl, ethoxycarbonyl, etc.), an aryloxycarbonyl group (e.g., phenoxycarbonyl, etc.), a carbamoyl group (e.g., carbamoyl, N-methylcarbamoyl, N,N-dimethylcarbamoyl, N-methyl-N-octylcarbamoyl, etc.), and an acylamino group (e.g., acetylamino, benzoylamino, acrylamino, methacrylamino, etc.) are exemplified, and these substituents may further be substituted.

$R^1$ preferably represents a substituted alkyl group or a substituted aryl group, and an organosilane compound having a vinyl polymerizable substituent represented by the following formula 2 is especially preferred.

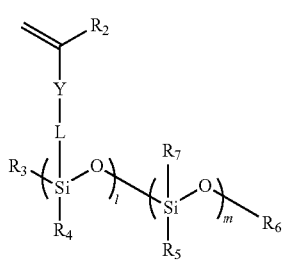

Formula 2

In formula 2, $R_2$ represents a hydrogen atom, a methyl group, a methoxy group, an alkoxycarbonyl group, a cyano group, a fluorine atom, or a chlorine atom. As the alkoxycarbonyl group, a methoxycarbonyl group, an ethoxycarbonyl group, etc., are exemplified. A hydrogen atom, a methyl group, a methoxy group, a methoxycarbonyl group, a cyano group, a fluorine atom, and a chlorine atom are preferred, a hydrogen atom, a methyl group, a methoxycarbonyl group, a fluorine atom, and a chlorine atom are more preferred, and a hydrogen atom and a methyl group are especially preferred.

Y represents a single bond, *—COO—**, *—CONH—** or *—O—**, preferably a single bond, *—COO—**, or *—CONH—**, more preferably a single bond or *—COO—**, and especially preferably *—COO—**. * represents the position to bond to $=C(R_2)-$, and ** represents the position to bond to L.

L represents a divalent linking group, specifically a substituted or unsubstituted alkylene group, a substituted or unsubstituted arylene group, a substituted or unsubstituted alkylene group having a linking group (e.g., ether, ester, amide, etc.) inside, and a substituted or unsubstituted arylene group having a linking group inside are exemplified, preferably a substituted or unsubstituted alkylene group, a substituted or unsubstituted arylene group, and an alkylene group having a linking group inside, more preferably an unsubstituted alkylene group, an unsubstituted arylene group, and an alkylene group having an ether or ester linking group inside, and especially preferably an unsubstituted alkylene group, and an alkylene group having an ether or ester linking group inside. As the substituents, a halogen atom, a hydroxyl group, a mercapto group, a carboxyl group, an epoxy group, an alkyl group, and an aryl group are exemplified, and these substituents may further be substituted.

l represents a number satisfying the expression of l=100−m, and m is a number of from 0 to 50, more preferably from 0 to 40, and especially preferably from 0 to 30.

$R_3$, $R_4$ and $R_5$ each preferably represents a halogen atom, a hydroxyl group, an unsubstituted alkoxyl group, or an unsubstituted alkoxyl group, more preferably a chlorine atom, a hydroxyl group, or an unsubstituted alkoxyl group having from 1 to 6 carbon atoms, still more preferably a hydroxyl group or an alkoxyl group having from 1 to 3 carbon atoms, and especially preferably a hydroxyl group or a methoxy group.

$R_6$ represents a hydrogen atom or an alkyl group, and the alkyl group is preferably a methyl group or an ethyl group. $R_7$ has the same meaning as $R_1$ in the above formula 1, and more preferably represents a hydroxyl group or an unsubstituted alkyl group, still more preferably a hydroxyl group or an alkyl group having from 1 to 3 carbon atoms, and especially preferably a hydroxyl group or a methyl group.

The compound represented by formula 1 may be used in combination of two or more. In particular, the compound represented by formula 2 is synthesized with two kinds of the compound represented by formula 1 as the starting materials. The specific examples of the starting materials of the compound represented by formula 1 and the compound represented by formula 2, but the invention is not restricted thereto.

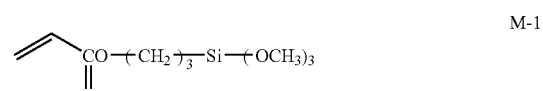

M-1

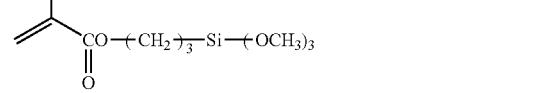

M-2

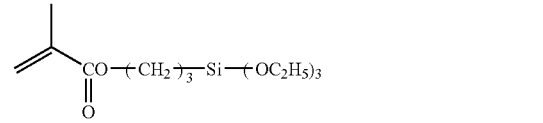

M-3

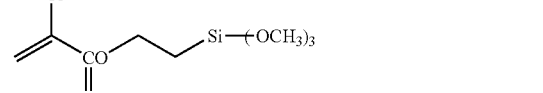

M-4

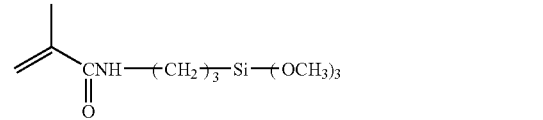

M-5

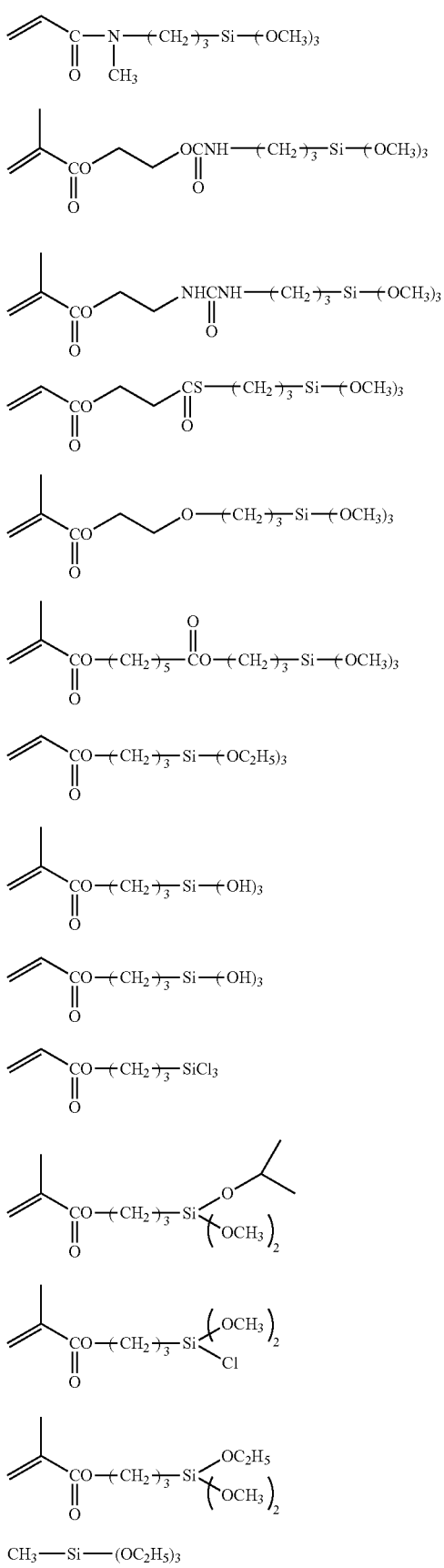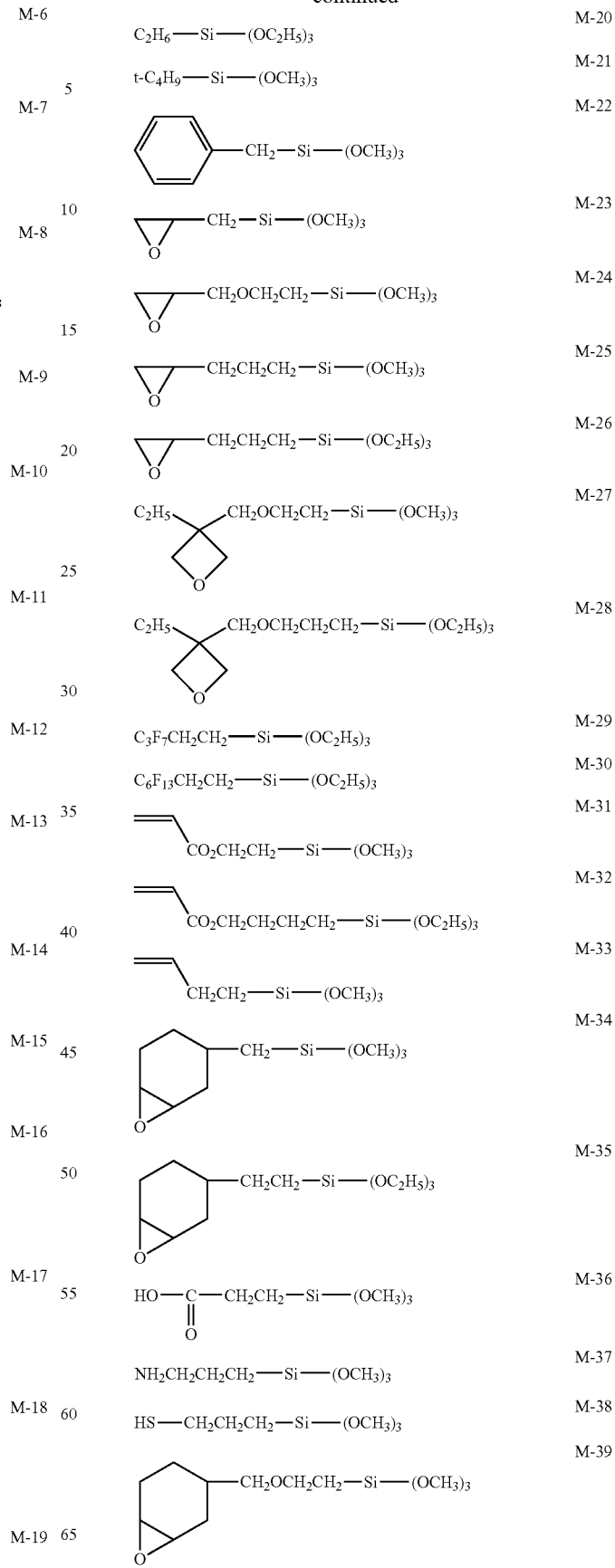

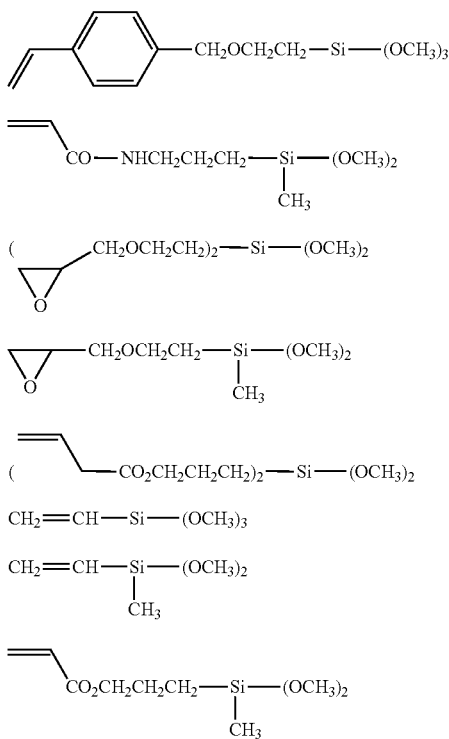

M-48 Methylmethoxysilane

Of the above exemplified compounds, as organosilane compounds containing a polymerizable group, (M-1), (M-2) and (M-25) are especially preferred.

For obtaining the effects of the invention, the content of the organosilane containing the vinyl polymerizable group in the hydrolyzed product of the organosilane and/or the partial condensation product thereof is preferably from 30 to 100 mass %, more preferably from 50 to 100 mass %, and still more preferably from 70 to 95 mass %. When the content of the organosilane containing the vinyl polymerizable group is less than 30 mass %, various troubles occur, such that solid content is generated, the solution becomes turbid, the pot life is deteriorated, the control of the molecular weight becomes difficult (increase in molecular weight), and the improvement of performance (e.g., scratch resistance of an antireflection film) by polymerization treatment is difficult to obtain due to the scarce content of the polymerizable groups. In the synthesis of the compound represented by formula 2, it is preferred to use each one kind in combination in the above amount from respective compounds of (M-1) and (M-2) as the organosilane containing a vinyl polymerizable group, and (M-19) to (M-21) and (M-48) as the organosilane not containing a vinyl polymerizable group.

A sol component for use in the invention is prepared by hydrolysis and/or partial condensation of the organosilane.

Hydrolysis and condensation reaction are performed by adding from 0.05 to 2.0 mol of water, preferably from 0.1 to 1.0 mol, to mol of hydrolyzable group X, and stirring at 25 to 100° C. in the presence of a catalyst in the invention.

In at least either the hydrolyzed product of organosilane or the partial condensation product thereof of the invention, the weight average molecular weight of either the hydrolyzed product of organosilane having a vinyl polymerizable group or the partial condensation product thereof, exclusive of the components having a molecular weight of less than 300, is preferably from 450 to 20,000, more preferably from 500 to 10,000, still more preferably from 550 to 5,000, and yet more preferably from 600 to 3,000.

Of the components having a molecular weight of 300 or more in the hydrolyzed product of organosilane and/or the partial condensation product thereof, the components having a molecular weight of 20,000 or more preferably account for 10 mass % or less, more preferably 5 mass % or less, and still more preferably 3 mass % or less. When the content is 10 mass % or more, a hardened film obtained by hardening a hardening composition containing the hydrolyzed product of organosilane and/or the partial condensation product thereof is sometimes inferior in transparency and adhesion with the substrate.

The weight average molecular weight and molecular weight here are molecular weights detected and analyzed with a differential refractometer and a GPC analyzer using columns of TSKgel GMHxL, TSKgel G4000HxL, and TSKgel G2000HxL (trade names, manufactured by TOSO CORPORATION), a solvent (THF), and expressed as polystyrene equivalent. The content is the area by % of the peak of the molecular weight range with the peak area of the components having the molecular weight of 300 or more being 100%.

The degree of dispersion (weight average molecular weight/number average molecular weight) is preferably from 3.0 to 1.1, more preferably from 2.5 to 1.1, still more preferably from 2.0 to 1.1, and especially preferably from 1.5 to 1.1.

By $^{29}$Si-NMR analysis of the hydrolyzed product of organosilane and the partial condensation product thereof of the invention, the state of X in formula 1 condensed in the form of —OSi can be confirmed. At this time, taking the case where three bonds of Si are condensed in the form of —OSi as (T3), the case where two bonds of Si are condensed in the form of —OSi as (T2), the case where one bond of Si is condensed in the form of —OSi as (T1), and the case where Si is not condensed at all as (T0), the condensation ratio α is expressed by the following expression:

$$\alpha=(T3\times3+T2\times2+T1\times1)/3/(T3+T2+T1+T0)$$

The condensation ratio is preferably from 0.2 to 0.95, more preferably from 0.3 to 0.93, and especially preferably from 0.4 to 0.9. When the condensation ratio is less than 0.1, hydrolysis and condensation do not progress sufficiently and monomer components increase, so that hardness is not sufficient, while when it is greater than 0.95, hydrolysis and condensation progress too much and the hydrolyzable groups are consumed, so that the interaction among the binder polymer, resin substrate, inorganic fine particles and the like lowers, so that the effects of the invention are difficult to obtain with such a compound.

The hydrolyzed product of organosilane and the partial condensation product thereof for use in the invention are described in detail below.

The hydrolysis reaction of organosilane and subsequent condensation reaction are generally performed in the presence of a catalyst. As the catalysts, inorganic acids, e.g., hydrochloric acid, sulfuric acid, nitric acid, etc.; organic acids, e.g., oxalic acid, acetic acid, butyric acid, maleic acid, citric acid, formic acid, methanesulfonic acid, toluenesulfonic acid, etc.; inorganic bases, e.g., sodium hydroxide, potassium hydroxide, ammonia, etc.; organic bases, e.g., triethylamine, pyridine, etc.; metal alkoxides, e.g., triisopropoxyaluminum, tetrabutoxyzirconium, tetrabutyl titanate, dibutyltin dilaurate, etc.; metal chelate compounds having a metal such as Zr, Ti or Al as the central metal; and F-containing compounds, e.g., KF, NH$_4$F, etc., are exemplified. These catalysts may be used alone or two or more kinds may be used in combination.

It is preferred that the content of the hydrolyzed product of organosilane and the partial condensation product thereof is small in the case of a relatively thin antireflection layer, and great in the case of a thick hard coat layer and antiglare layer. Considering revelation of the effects, refractive index, and the shape and surface state of the film, the content is preferably from 0.1 to 50 mass % of the total solids content in the containing layer (the addition layer), more preferably from 0.5 to 30 mass %, and most preferably from 1 to 15 mass %.

1-4. Antifouling Improver
1-4-2. Reactive Silicone or Fluorine Compound

Known silicone or fluorine antifouling agents, sliding agents, etc., can be arbitrarily added to an overcoat layer in the invention for the purpose of giving characteristics such as antifouling property, water resistance, chemical resistance, sliding property and the like.

When these additives are added, they are preferably added in the range of from 0.01 to 20 mass % of all the solids content of the overcoat layer, more preferably in the range of from 0.05 to 10 mass %, and especially preferably from 0.1 to 5 mass %.

1-4-1. Silicone Compound

Silicone compounds are described below.

Compounds having a polysiloxane structure can be used in the invention for the purpose of the improvement of scratch resistance by giving sliding property and for the impartation of antifouling property. The structures of the compounds are not especially restricted, e.g., compounds containing a plurality of dimethylsilyloxy units as the repeating units and having substituents at the terminals of chain and/or side chains of the compounds are preferred. Further, the chain of the compounds containing dimethylsilyloxy as the repeating units may contain structural units other than dimethylsilyloxy. These compounds are hereinafter referred to as silicone compounds.

The substituents may be the same or different, and it is preferred that a plurality of substituents are present. As preferred examples of substituents, an acryloyl group, a methacryloyl group, a vinyl group, an aryl group, a cinnamoyl group, an oxetanyl group, a fluoroalkyl group, a polyoxyalkylene group, a carboxyl group, an amino group, an epoxy group, etc., are exemplified. From the viewpoint of the improvement of fixation of silicone compounds in a film and the improvement of antifouling property, compounds containing two or more (meth)acryloyl groups or epoxy groups in the molecule are preferred, and more preferably compounds containing four or more. The molecular weight of silicone compounds is not especially restricted, but preferably 100,000 or less, more preferably 50,000 or less, especially preferably from 3,000 to 30,000, and most preferably from 5,000 to 20,000. The content of silicon atoms of silicone compounds is not especially restricted, but 18.0 mass % or less is preferred, especially preferably from 25.0 to 37.0 mass %, and most preferably from 30.0 to 37.0 mass %.

As the examples of preferred silicone compounds, the following compounds are exemplified, but silicone compounds are not restricted to these compounds: X-22-160AS, X-22-162C, X-22-163C, X-22-164B, X-22-164C, X-22-170DX, X-22-173DX, X-22-174DX, X-22-176D, X-22-176DX, X-22-176F, X-22-1821, X-22-2426, KF-105, KF-6001, KF-6002, and KF-6003 (trade names, manufactured by Shin-Etsu Chemical Co., Ltd.), FM-0411, FM-0421, FM-0425, FM-0725, FM-1121, FM-4411, FM-4421, FM-4425, FM-5511, FM-5521, FM-5525, FM-6611, FM-6621, FM-6625, FM-7725, FM-DA11, FM-DA21, and FM-DA25 (trade names, manufactured by Chisso Corporation), CMS-626, CMS-222, DMS-U22, RMS-033, RMS-083, UMS-182, DMS-H21, DMS-H31, HMS-301, FMS121, FMS123, FMS131, FMS141, and FMS221 (trade names, manufactured by Gelest).

When these additives are added, they are preferably added in the range of from 0.01 to 20 mass % of all the solids content of the overcoat layer, more preferably in the range of from 0.05 to 10 mass %, and especially preferably from 0.1 to 5 mass %.

1-4-2. Fluorine-Containing Compound

Fluorine compounds that are used as the antifouling agents are preferably compounds having a fluoroalkyl group. The fluoroalkyl group preferably has from 1 to 20 carbon atoms, more preferably from 1 to 10, and may be straight chain (e.g., —CF$_2$CF$_3$, —CH$_2$(CF$_2$)$_4$H, —CH$_2$(CF$_2$)$_8$CF$_3$, —CH$_2$CH$_2$(CF$_2$)$_4$H, etc.), a branched structure (e.g., CH(CF$_3$)$_2$, CH$_2$CF(CF$_3$)$_2$, CH(CH$_3$)CF$_2$CF$_3$, CH(CH$_3$)(CF$_2$)$_5$CF$_2$H, etc.), or may be an alicyclic structure (preferably a 5- or 6-membered ring, e.g., a perfluoro-cyclohexyl group, a perfluorocyclopentyl group, or an alkyl group represented with these groups), and may have an ether bond (e.g., CH$_2$OCH$_2$CF$_2$CF$_3$, CH$_2$CH$_2$OCH$_2$C$_4$F$_8$H, CH$_2$CH$_2$OCH$_2$CH$_2$C$_8$F$_{17}$, CH$_2$CH$_2$OCF$_2$CF$_2$OCF$_2$CF$_2$H, etc.). A plurality of the fluoroalkyl groups may be contained in the same molecule.

It is preferred that fluorine compounds further contain substituents contributable to formation of bonding to or affinity with an overcoat layer film. The substituents may be the same or different, and it is preferred that a plurality of substituents are present. As preferred examples of substituents, an acryloyl group, a methacryloyl group, a vinyl group, an aryl group, a cinnamoyl group, an epoxy group, an oxetanyl group, a hydroxyl group, a polyoxyalkylene group, a carboxyl group, and an amino group are exemplified. Fluorine compounds may be polymers or oligomers with a compound not containing a fluorine atom, and molecular weight is not especially restricted. The content of fluorine atoms of fluorine compounds is not particularly limited, but it is preferably 20 mass % or more, especially preferably from 30 to 70 mass %, and most preferably from 40 to 70 mass %. As the examples of preferred fluorine compounds, R-2020, M-2020, R-3833, and M-3833 (trade names, manufactured by Daikin Industries Ltd.), Megafac F-171, F-172, F-179A, DEFENSA MCF-300 (trade names, manufactured by Dainippon Ink and Chemicals Inc.) are exemplified, but the invention is not restricted to these compounds.

Fluorine-containing compounds having a (meth)acrylate group are especially preferred from the viewpoints of the improvement of antifouling property of an overcoat layer and the enhancement of scratch resistance of a film. Preferred structures of the compounds are described below.

Telomer Type Acrylate Containing Fluorine Atom:

Telomer type acrylate containing a fluorine atom is a mixture of fluorine-containing (meth)acrylic esters having the degree of polymerization n of k or more represented by the following formula (T-1) (hereinafter referred to as "telomer type acrylate containing a fluorine atom" or merely "telomer"). This mixture is a mixture of telomers whose degrees of polymerization n are k, k+1, k+2, . . . , respectively. However, there is a case where the mixture inevitably contains telomers having n of smaller than k according to the conditions of telomerization and conditions of separation of the reaction mixture and the like.

The specific examples of the above hardening resin as the antifouling agent are mixtures containing a plurality of fluorine-containing (meth)acrylic esters whose degrees of polymerization n of group $Rf(CF_2CF_2)_nR^2CH_2CH_2O$— of the following formula (T-1) are k, k+1, k+2, . . . , respectively.

$$Rf(CF_2CF_2)_nCH_2CH_2R^2OCOCR^1=CH_2 \qquad \text{Formula (T-1)}$$

In formula (T-1), Rf represents any fluoroalkyl group having from 1 to 10 carbon atoms, $R^1$ represents a hydrogen atom or a methyl group, $R^2$ represents a single bond or an alkylene group, and n represents an integer showing the degree of polymerization, and the degree of polymerization n is k (k represents any of integer of 3 or more) or more. As the telomer type acrylates containing a fluorine atom in formula (T-1), partially or completely fluorinated alkyl ester derivatives of (meth)acrylic acid are exemplified.

The specific examples of the telomer type acrylates containing a fluorine atom for use in the invention are shown below, but the invention is not restricted thereto.

a-1
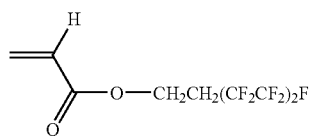

a-2
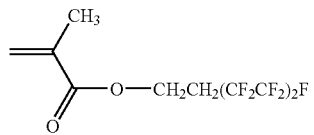

a-3
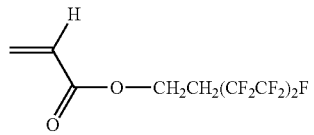

a-4
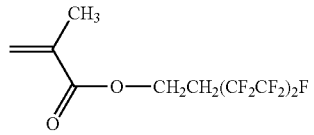

a-5
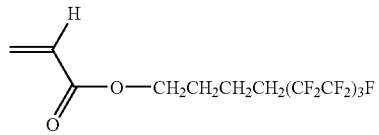

a-6
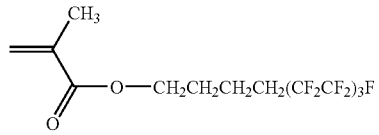

a-7
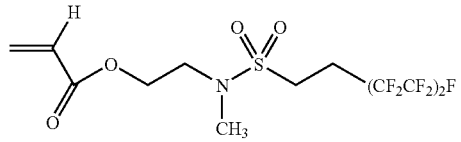

a-8
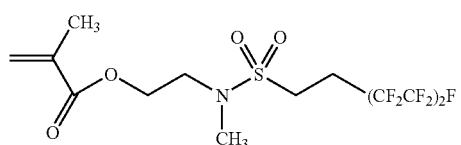

a-9
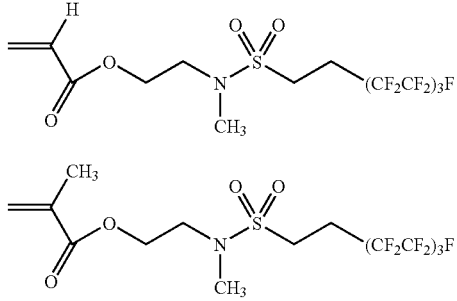

a-10

Acrylate Having a Fluoroalkyl Group Having 10 Carbon Atoms:

As a preferred fluorine-containing antifouling agent for use in the invention, a compound represented by the following formula (T-2) is exemplified.

Formula (T-2)

In formula (T-2), X and Y each represents a (meth)-acryloyloxy group or a hydroxyl group, and at least either represents a (meth)acryloyloxy group.

The fluorine-containing (meth)acrylic ester represented by formula (T-2) has a fluoroalkyl group having 10 carbon atoms and a trifluoromethyl group ($CF_3$—) at the terminal, and the trifluoromethyl group of the fluorine-containing (meth) acrylic ester is effectively oriented on the surface even with a small amount. When the number of carbon atoms of the fluoroalkyl group is insufficient, orientation on the surface of the overcoat layer tends to lower. Fluorine-containing (meth) acrylic esters having a fluoroalkyl group of 11 or more carbon atoms are difficult to manufacture and also hardly available.

As the specific examples of the fluorine-containing (meth) acrylic esters represented by formula (T-2), 1-(meth)acryloyloxy-2-hydroxy-4,4,5,5,6,6,7,7,8,8,9,9,10,10,11,11,12,12, 13,13,13-heneicosafluorotridecane, 2-(meth)acryloyloxy-1-hydroxy-4,4,5,5,6,6,7,7,8,8,9,9,10,10,11,11,12,12,13,13,13-heneicosafluorotridecane, and 1,2-bis(meth)acryloyloxy-4, 4,5,5,6,6,7,7,8,8,9,9,10,10,11,11,12,12,13,13,13-heneicosafluorotridecane are exemplified.

Acrylate Having a Perfluoropolyether Group:

In the invention, as particularly useful materials for the improvement of surface sliding property in addition to antifouling property, perfluoropolyether group-containing acrylate compounds can be exemplified. Acrylates containing a heptafluoropropylene oxide group are especially preferred. The examples of the compounds are shown below, but the invention is not limited thereto.

(FC-1): HFPO—C(O)N(H)CH$_2$CH$_2$OC(O)CH=CH$_2$
(FC-2): HFPO—C(O)N(H)CH$_2$CH$_2$OCH$_2$CH$_2$OC(O)CH=CH$_2$
(FC-3): Equimolar Michael addition product of HFPO—C(O)N(H)CH$_2$CH$_2$CH$_2$N(H)CH$_3$ and TMPTA
(FC-4): HFPO—C(O)N(H)C(CH$_2$OC(O)CH=CH$_2$)$_2$CH$_2$CH$_3$
(FC-5): HFPO—C(O)N(H)C(CH$_2$OC(O)CH=CH$_2$)$_2$H Here, HFPO— represents $F(CF(CF_3)CF_2O)_aCF(CF_3)$—, and the average value of a is from 6 to 7 (e.g., 6.3). TMPTA represents trimethylolpropane triacrylate.

The synthesizing methods of these compounds are disclosed in WO 2005/113690. When these additives are added, they are preferably added in the range of from 0.01 to 20 mass % of all the solids content of the overcoat layer, more preferably in the range of from 0.05 to 15 mass %, and especially preferably from 0.1 to 10 mass %.

1-5. Light Transmitting Particles

In the embodiments of the invention, it is preferred that at least one layer of an overcoat layer and a hard coat layer is a light diffusing layer. Either layer of both layers may be a light diffusing layer, but it is especially preferred that a hard coat layer be a light diffusing layer. As one preferred embodiment of light diffusing methods, a light diffusing layer can be formed of light transmitting particles and light transmitting resin. Scattered light profile and haze value are adjusted by light transmitting particles and light transmitting resin. In the invention, in addition to one kind of particles, it is preferred to use light transmitting fine particles of two or more kinds of particle sizes and materials.

The difference in refractive index between light transmitting fine particles and the light transmitting resin constituting a light diffusing layer at large (when inorganic fine particles etc. are added to light transmitting resin for adjusting the refractive index of the layer, the optical average refractive index) is preferably from 0.03 to 0.30. When the difference in refractive index is less than 0.03, the difference in refractive indexes of the both is too small and light diffusing effect is difficult to obtain, while when the difference is greater than 0.30, light diffusibility is too great and the film as a whole is whitened. The difference in refractive index is preferably from 0.06 to 0.25, and most preferably from 0.09 to 0.20.

The particle size of light transmitting fine particles (the first light transmitting fine particles) for mainly imparting diffusing effect (increasing grade of display (improvement of visual angle characteristics)) is from 0.5 to 3.5 μm, and more preferably from 0.5 to 2.0 μm. The angle distribution of light scattering can be obtained by the adjustment of particle size.

It is especially preferred in the point of reconciliation of visual angle characteristics and whitening (halation) that a light diffusing layer suitable in the invention is adjusted by selecting proper combination of the difference in refractive index between the light transmitting fine particles and the light transmitting resin constituting a light diffusing layer at large, and the particle size of the light transmitting fine particles.

The greater the light diffusing effect, the more is improved the visual angle characteristics. However, for maintaining front surface brightness in the point of the grade of display, it is also necessary to heighten transmittance as far as possible. When the particle size of the first light transmitting fine particles is made 0.5 μm or less, the effect of light scattering is great and visual angle characteristics are improved, but rear scattering becomes great and the reduction of brightness is conspicuous. On the other hand, when the particle size is made 2.0 μm or more, light scattering effect becomes small and the improvement of visual angle characteristics becomes smaller. Accordingly, the particle size of the first light transmitting fine particles is preferably from 0.6 to 1.8 μm, and most preferably from 0.7 to 1.6 μm.

It is also preferred to further add light transmitting particles not intending to give light diffusing effect (the second light transmitting fine particles). Irregularity is provided on the surface of a light diffusing film to function as a mirroring preventive. The particle size of the second light transmitting fine particles is larger than the particle size of the first light transmitting particles, and more preferably from 2.5 to 10.0 μm. Preferred surface scattering and an antiglare property can be provided by such constitution. For achieving excellent grade of display, it is also necessary to prevent mirroring of outer light. The smaller the surface haze value, the smaller is the whitish impression due to outer light, and clear display can be obtained, but mirroring becomes great when the surface haze value is too low, so that it becomes necessary to provide, as the outermost layer, a low refractive index layer having a refractive index lower than that of the light diffusing layer to whereby reduce the reflectance. For controlling the surface haze value, it is preferred to provide appropriate irregularity on the surface of the resin layer by using the second light transmitting fine particles, but the controlling method is not restricted thereto. When the particle size of the second light transmitting fine particles is made 2.5 μm or less, thinning of layer thickness cannot be helped in providing desired surface irregularity, so that it is not preferred in hardness, while when the particle size is 10 μm or more, the weight of each particle increases, so that it is not necessarily preferred in the point of precipitation stability of the particles in a coating solution. Accordingly, the particle size of the second light transmitting fine particles is preferably from 2.7 to 9 μm, and most preferably from 3 to 8 μm.

For providing irregularity on the surface, the first and/or second particles can be agglomerated. As compared with the case where each fine particle is uniformly dispersed, by taking the form of agglomerate it becomes possible to form various surface structures. The number of particles of agglomerate is preferably from 2 to 100, and more preferably from 5 to 50. These particles may be present in one and the same plane parallel to the support in an optical film but to take three dimensional stereostructure is effective for irregularity formation. The agglomerates of these particles can be present in a film at constant intervals or randomly.

It is preferred that the difference in refractive index between the second light transmitting fine particles and the light transmitting resin constituting a light diffusing layer at large is smaller than that between the light transmitting resin and the first light transmitting fine particles. The difference in the refractive index between the refractive index of the second light transmitting particles and the refractive index of the light transmitting resin constituting the light diffusing layer is preferably from 0.00 to 0.20, and more preferably from 0.00 to 0.09.

As surface irregularity, surface roughness Ra is preferably 0.5 μm or less, more preferably 0.3 μm or less, and most preferably 0.2 μm or less. The measurement of surface roughness Ra (central line average roughness) can be done according to JIS-B0601.

The haze value of a light diffusing layer, in particular inner scattering haze (inner haze) largely contributing to scattering of transmitted light strongly correlates with visual angle improving effect. Visual angle characteristics are improved by diffusing outgoing light from the back light by a light diffusing layer provided on the surface of a polarizing plate on the viewer side. However, excessive diffusion results in the decrease of front surface brightness, so that inner haze of the light diffusing layer is preferably from 45% to 80%, more preferably from 45% to 70%, and especially preferably from 45% to 60%. For raising inner scattering haze, methods of increasing the particle concentration of light transmitting fine particles, increasing a coating thickness, and increasing the difference in refractive index between the particles and resin are known.

For increasing grade of display (improvement of visual angle characteristics) in the invention, it is particularly preferred to bring the intensity of scattered light of 30° to light intensity of outgoing angle 0° of the scattered light profile of goniophotometer into a specific range. The intensity of scattered light of 30° to light intensity of outgoing angle 0° of the scattered light profile of goniophotometer is preferably 0.05% or more from the point of visual characteristics, and preferably 0.3% or less from the point not to lower front surface brightness so much. Therefore, the intensity of scattered light of 30° to light intensity of outgoing angle 0° of the scattered light profile of goniophotometer of a light diffusing layer in the invention is preferably from 0.05 to 0.3%, more preferably from 0.05 to 0.2%, and especially preferably from 0.05 to 0.15%. It is more preferred that this value be satisfied simultaneously with the preferred range of the inner haze value.

The haze attributable to light scattering of the surface of a polarizing plate of the invention (surface haze) is preferably from 0.1 to 30%, more preferably 10% or less from the viewpoint of both of the reduction of mirroring and the reduction of whitish impression, and especially preferably 5% or less. When the reduction of whitish impression due to outer light is taken into much account, 4% or less is preferred and 2% or less is more preferred. Mirroring enlarges by the reduction of surface haze, so that it is preferred to provide a low refractive index layer and make the average value of integrated reflectance at incidence of 5° in the wavelength region of from 450 to 650 nm to 3.0% or less, more preferably 2.0% or less, and most preferably 1.0% or less. In connection with the increment of the grade of display (improvement of visual angle characteristics) in the invention, the adjustment of the inner light scattering is necessary, and, at the same time, by bringing surface haze and/or reflectance to proper ranges, the contrast in a bright room is improved and most preferred effect can be revealed.

The light transmitting fine particles may be monodisperse organic fine particles or inorganic fine particles. The less the particle size dispersion, the less is the dispersion in the light scattering characteristics, and the design of haze value is easy. As the light transmitting fine particles, plastic beads are preferred, and those having high transparency and the difference in refractive index with the light transmitting resin of the above value are especially preferred. The examples of organic fine particles include polymethyl methacrylate beads (refractive index: 1.49), acryl-styrene copolymer beads (refractive index: 1.54), melamine beads (refractive index: 1.57), polycarbonate beads (refractive index: 1.57), styrene beads (refractive index: 1.60), crosslinked polystyrene beads (refractive index: 1.61), polyvinyl chloride beads (refractive index: 1.60), and benzoguanamine-melamine-formaldehyde beads (refractive index: 1.68). As inorganic fine particles, silica beads (refractive index: 1.44 to 1.46), and alumina beads (refractive index: 1.63) are used. The light transmitting fine particles are preferably used in an amount of from 5 to 30 mass parts per 100 mass parts of the light transmitting resin.

In the case of the light transmitting fine particles as above, since light transmitting fine particles are liable to be precipitated in a resin composition (the light transmitting resin), inorganic fillers such as silica and the like may be added for precipitation prevention. Incidentally, the more the addition amount, the more effectual is the inorganic filler for the precipitation prevention of the light transmitting fine particles, but the film transparency is adversely affected. Accordingly, it is preferred that inorganic fillers having a particle size of 0.5 µm or less are added so as not to impair the transparency of the film, less than 0.1 mass % or so.

As the light transmitting resins, three kinds of resins curable by irradiation with ultraviolet rays, electron beams, i.e., ionizing radiation curable resins, ionizing radiation curable resins mixed with thermoplastic resin and s solvent, and thermosetting resins. To give a hard coat property, resins comprising ionizing radiation curable resin as the main component are preferred. The thickness of the light diffusing layer is generally from 1.5 to 30 µm, and preferably from 3 to 20 µm. A light diffusing layer generally doubles as the function of a hard coat layer, but when the thickness of the light diffusing layer is thinner than 1.5 µm, a hard coat property is insufficient, while the thickness of thicker than 30 µm is not preferred in the points of curling and brittleness. When a low refractive index layer is provided, the refractive index of the light transmitting resin is preferably from 1.46 to 2.00, more preferably from 1.48 to 1.90, and still more preferably from 1.50 to 1.80. The refractive index of the light transmitting resin is the average value of the light diffusing layer measured without containing light transmitting resin. When the refractive index of the light diffusing layer is too small, antireflection property lowers. While when the refractive index is too large, the tint of reflected light increases and not preferred. From these aspects, the above range is preferred. The refractive index of the light diffusing layer is set at a desired value in view of antireflection property and the tint of reflected light.

1-6. Polymerization Initiator

Photo-Initiator:

As photo-radical polymerization initiators, acetophenones, benzoins, benzophenones, phosphine oxides, ketals, anthraquinones, thioxanthones, azo compounds, peroxides (e.g., JP-A-2001-139663), 2,3-dialkyldione compounds, disulfide compounds, fluoroamine compounds, aromatic sulfoniums, lophine dimers, onium salts, borates, active esters, active halogens, inorganic complexes, and coumarins are exemplified.

The examples of acetophenones include 2,2-dimethoxyacetophenone, 2,2-diethoxyacetophenone, p-dimethyl-acetophenone, 1-hydroxydimethyl phenyl ketone, 1-hydroxydimethyl-p-isopropyl phenyl ketone, 1-hydroxycyclohexyl phenyl ketone, 2-methyl-4-methylthio-2-morpholinopropiophenone, 2-benzyl-2-dimethylamino-1-(4-morpholinophenyl)-butanone, 4-phenoxydicycloacetophenone, and 4-t-butyl-dichloroacetophenone.

As the specific examples of the active halogens, the compounds described, e.g., in Wakabayashi et al., *Bull. Chem. Soc. Japan*, Vol. 42, p. 2924 (1969), U.S. Pat. No. 3,905,815, JP-A-5-27830, M. P. Hutt, *Journal of Heterocyclic Chemistry*, Vol. 1, No. 3 (1970) are exemplified, and in particular, oxazole compounds substituted with a trihalomethyl group, i.e., S-triazine compounds, are exemplified. More preferably, s-triazine derivatives in which at least one mono-, di- or trihalogen-substituted methyl group is bonded to the s-triazine ring are exemplified. As the specific examples, s-triazine and oxathiazole compounds are known, and 2-(p-methoxyphenyl)-4,6-bis(trichloromethyl)-s-triazine, 2-(p-styrylphenyl)-4,6-bis(trichloromethyl)-s-triazine, 2-[3-Br-4-di(ethyl acetate)amino]phenyl]-4,6-bis(trichloromethyl)-s-triazine, and 2-trihalomethyl-5-(p-methoxyphenyl)-1,3,4-oxadiazole are included. Specifically, JP-A-58-15503, pp. 14 to 30; JP-A-55-77742, pp. 6 to 10; Compound Nos. 1 to 8 disclosed in JP-B-60-27673, p. 287; Compound Nos. 1 to 17 disclosed in JP-A-60-239736, pp. 443 to 444; and Compound Nos. 1 to 19 disclosed in U.S. Pat. No. 4,701,399 are especially preferred.

The specific examples of the above active halogens are shown below.

1  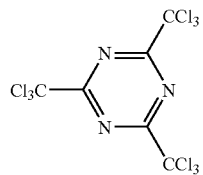
2  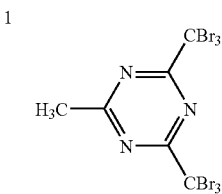
3  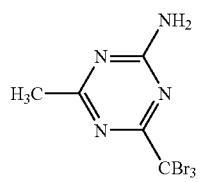
4  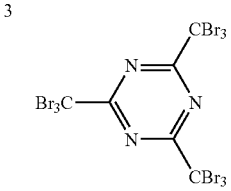
5  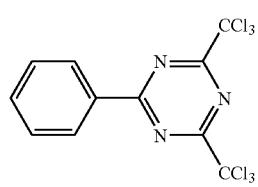
6  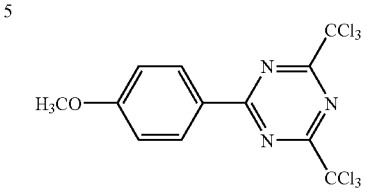
7  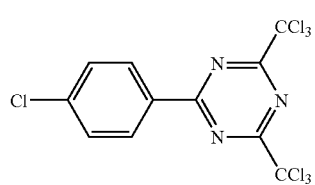
8  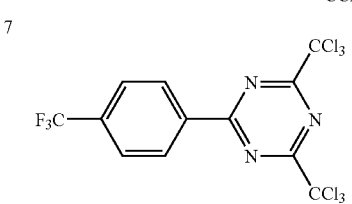
9  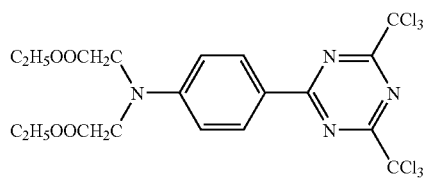
10 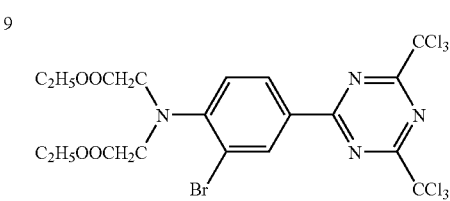
11 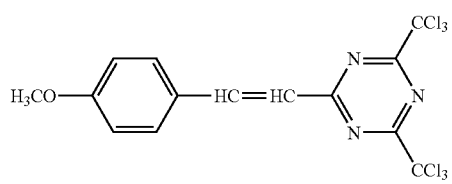
12 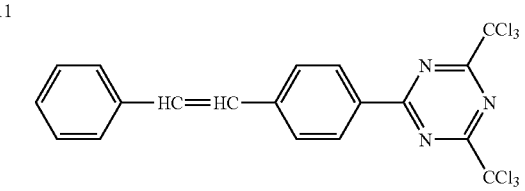
13 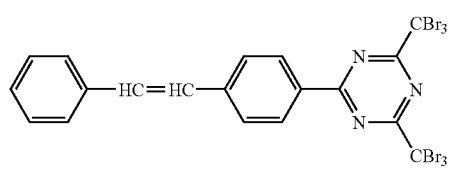
14 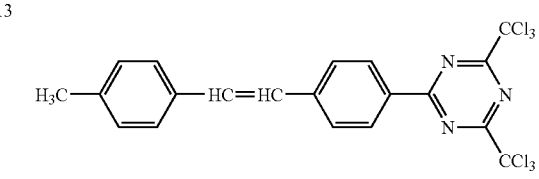
15 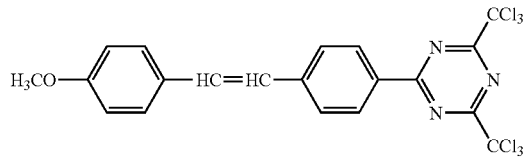
16 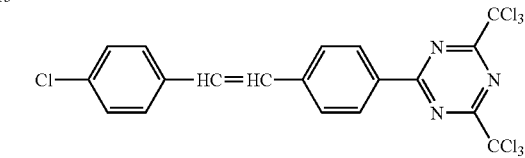
17 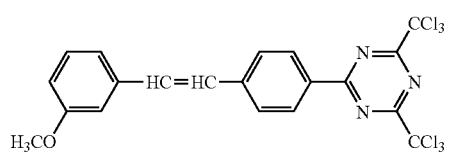
18 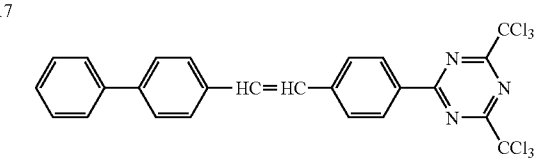

-continued
19
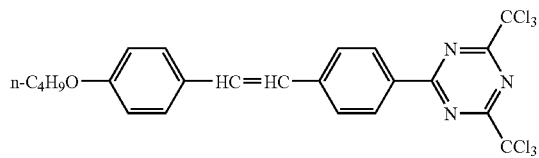
20
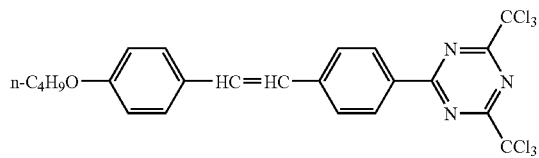
21
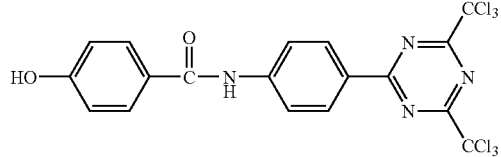
22
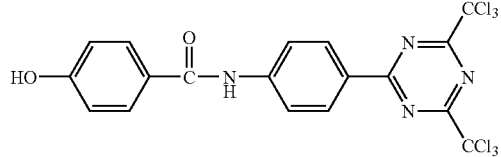
23
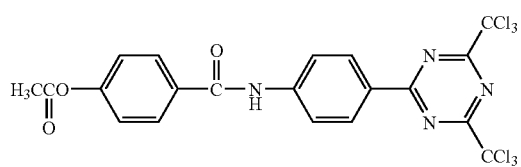
24
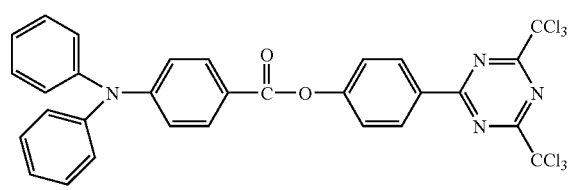
24-1
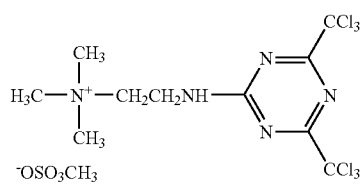
24-2
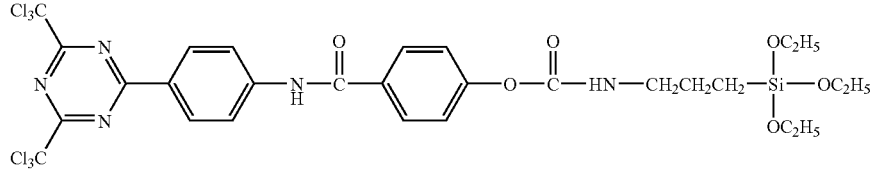
24-3
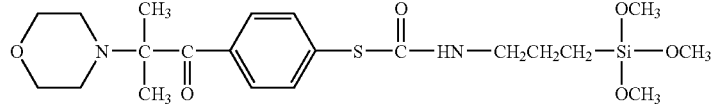
25
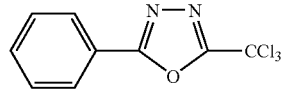
26
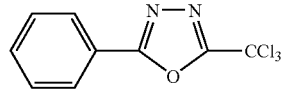
27
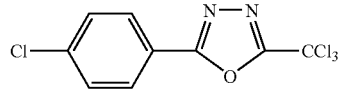
28
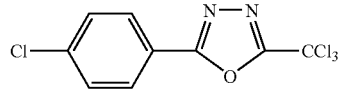
29
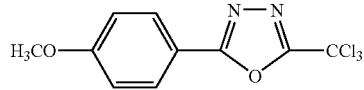
30
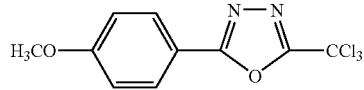
31
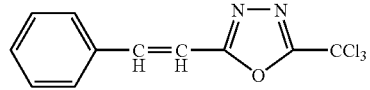
32
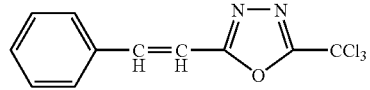
33
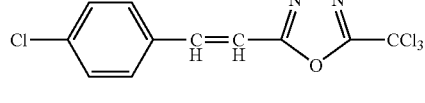
34
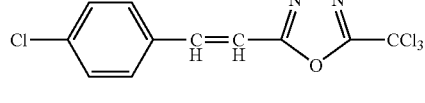

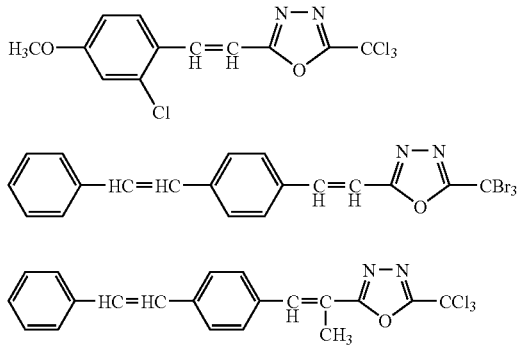
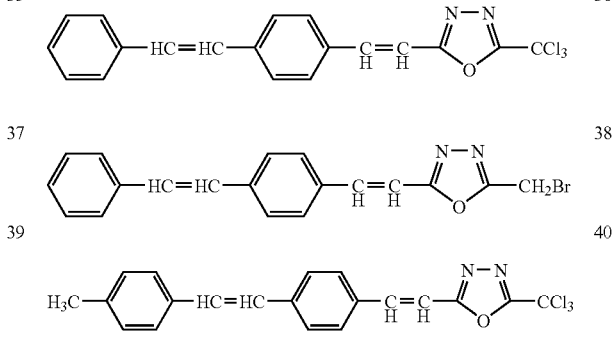

These initiators may be used alone or as mixture.

Various examples are also described in the following literatures and they are useful in the invention: *Saishin UV Koka Gijutsu* (*The Latest Techniques of UV Curing*), p. 159, published by Gijutsu Joho Kyokai (1991), and Kiyoshi Kato, *Shigaisen Koka System* (*UV Ray Curing System*), pp. 65 to 148, published by Sogo Gijutsu Center (1989).

As commercially available photo-radical polymerization initiators, KAYACURE (DETX-S, BP-100, BDMK, CTX, BMS, 2-EAQ, ABQ, CPTX, EPD, ITX, QTX, BTC, MCA, etc., manufactured by Nippon Kayaku Co., Ltd.), Irgacure (651, 184, 500, 819, 907, 369, 1173, 1870, 2959, 4265, 4263, etc., manufactured by Ciba Specialty Chemicals Inc.), and Esacure (KIP100F, KB1, EB3, BP, X33, KT046, KT37, KIP150, TZT, manufactured by Sartomer Company Inc.), and combinations of these products are preferably exemplified.

Photo-polymerization initiators are preferably used in the range of from 0.1 to 15 mass parts per 100 mass parts of the polyfunctional monomer, and more preferably in the range of from 1 to 10 mass parts.

Photosensitizer:

A photosensitizer may be used in addition to photo-polymerization initiators. As the specific examples of photosensitizer, n-butylamine, triethylamine, tri-n-butyl-phosphine, Michler's ketone and thioxanthone can be exemplified.

Further, assistants such as azide compound, thiourea compound, and mercapto compound may be used in combination of one or more.

As commercially available photosensitizers, KAYACURE (DMBI, EPA, manufactured by Nippon Kayaku Co., Ltd.) are exemplified.

Thermal Polymerization Initiator:

As thermal radical polymerization initiators, organic or inorganic peroxides, organic azo and diazo compounds can be used.

Specifically, the examples of organic peroxides include benzoyl peroxide, halogen benzoyl peroxide, lauroyl peroxide, acetyl peroxide, dibutyl peroxide, cumene hydroperoxide, and butyl hydroperoxide, the examples of inorganic peroxides include hydrogen peroxide, ammonium persulfate, and potassium persulfate, the examples of azo compounds include 2,2'-azo-bis(isobutyronitrile), 2,2'-azobis(propionitrile), and 1,1'-azobis(cyclohexanecarbonitrile), and the examples of diazo compounds include diazoaminobenzene and p-nitrobenzene-diazonium.

In the invention, in addition to the above heat-acid generators, compounds capable of generating acid upon irradiation with light, i.e., photosensitive acid generators may further be added. The photosensitive acid generators are materials giving photosensitivity to the film of the curable resin composition and capable of photo-curing the film upon irradiation with radiations such as rays. As such photosensitive acid generators, e.g., (1) various kinds of onium salts such as an iodonium salt, a sulfonium salt, a phosphonium salt, a diazonium salt, an ammonium salt, a pyridinium salt, etc.; (2) sulfone compounds such as β-keto ester, β-sulfonylsulfone, and α-diazo compounds of them; (3) sulfonates such as alkylsulfonate, haloalkylsulfonate, arylsulfonate, iminosulfonate, etc.; (4) sulfonimide compounds; (5) diazomethane compounds; and others are exemplified, and they can be used arbitrarily.

The photosensitive acid generators can be used alone, or two or more in combination. Further, the photosensitive acid generators can be used in combination with the heat-acid generators. The proportion of use of the photosensitive acid generator is preferably from 0 to 20 mass parts per 100 mass parts of the fluorine-containing polymer in the curable resin composition, and more preferably from 0.1 to 10 mass parts. When the proportion of the photosensitive acid generator is not higher than the value of the above least upper bound, the intensity of the obtained cured film is excellent and good transparency can be secured.

The proportion of use of the photosensitive acid generator is preferably from 0.01 to 10 mass parts per 100 mass parts of the curable resin composition, and more preferably from 0.1 to 5 mass parts.

As other specific compounds and use methods, those disclosed in JP-A-2005-43876 can be used.

1-7. Surfactant

For securing uniform surface flatness, e.g., free of coating unevenness, drying unevenness and point defects, it is preferred for the coating composition for forming a light diffusing layer to contain any of a fluorine surfactant or a silicone surfactant, or both surfactants. In particular, fluorine surfactants can be preferably used for the reason that they have the effect of improving flatness defects such as coating unevenness, drying unevenness and point defects with a smaller addition amount. By using surfactants, productivity can be heightened by high speed coating aptitude while increasing the uniformity of flatness property.

As preferred examples of fluorine surfactants, copolymers containing a fluoro-aliphatic group (sometimes abbreviated to "fluorine polymers") are exemplified, and as the fluorine polymers, copolymers containing a repeating unit corresponding to a monomer represented by the following formula (i), and copolymers of acrylic resin or methacrylic resin containing a repeating unit corresponding to a monomer represented by the following formula (ii), and copolymers of vinyl monomers copolymerizable with these monomers are useful.

(i) A fluoro-aliphatic group-containing monomer represented by the following formula (a):

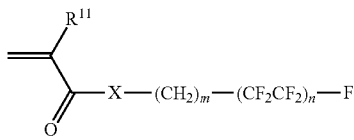

In formula (a), $R^{11}$ represents a hydrogen atom or a methyl group; X represents an oxygen atom, a sulfur atom, or —N($R^{12}$)—; m represents an integer of from 1 to 6; n represents an integer of from 2 to 4; $R^{12}$ represents a hydrogen atom, or an alkyl group having from 1 to 4 carbon atoms, e.g., a methyl group, an ethyl group, a propyl group, or a butyl group, and $R^{12}$ preferably represents a hydrogen atom or a methyl group. X preferably represents an oxygen atom.

(ii) A monomer represented by the following formula (b) copolymerizable with the monomer (i):

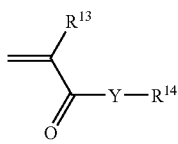

In formula (b), $R^{13}$ represents a hydrogen atom or a methyl group; Y represents an oxygen atom, a sulfur atom, or —N($R^{15}$)—; $R^{15}$ represents a hydrogen atom, or an alkyl group having from 1 to 4 carbon atoms, e.g., a methyl group, an ethyl group, a propyl group, or a butyl group, and $R^{15}$ preferably represents a hydrogen atom or a methyl group. Y preferably represents an oxygen atom, —N(H)—, or —N($CH_3$)—.

$R^{14}$ represents a straight chain, branched or cyclic alkyl group having from 4 to 20 carbon atoms that may have a substituent. As the examples of the substituents of the alkyl group represented by $R^{14}$, a hydroxyl group, an alkylcarbonyl group, an arylcarbonyl group, a carboxyl group, an alkyl ether group, an aryl ether group, a halogen atom, e.g., a fluorine atom, a chlorine atom, or a bromine atom, a nitro group, a cyano group, and an amino group are exemplified, but the invention is not restricted thereto. As the straight chain, branched or cyclic alkyl group having from 4 to 20 carbon atoms, a straight chain or branched butyl group, a pentyl group, a hexyl group, a heptyl group, an octyl group, a nonyl group, a decyl group, an undecyl group, a dodecyl group, a tridecyl group, a tetradecyl group, a pentadecyl group, an octadecyl group, an eicosanyl group, etc., a monocyclic cycloalkyl group, e.g., a cyclohexyl group, a cycloheptyl group, etc., and polycyclic cycloalkyl group, e.g., a bicycloheptyl group, a bicyclodecyl group, a tricycloundecyl group, a tetracyclododecyl group, an adamantyl group, a norbornyl group, a tetracyclodecyl group, etc., are preferably used.

The amount of the fluoro-aliphatic group-containing monomers represented by formula (a) used in the fluorine polymer of the invention is 10 mol % or more based on each monomer in the fluorine polymer, preferably from 15 to 70 mol %, and more preferably from 20 to 60 mol %.

The mass average molecular weight of the fluorine polymer for use in the invention is preferably from 3,000 to 100,000, and more preferably from 5,000 to 80,000.

A preferred addition amount of the fluorine polymer in the invention is from 0.001 to 5 mass % based on the coating solution, preferably the range of from 0.005 to 3 mass %, and more preferably the range of from 0.01 to 1 mass %. When the addition amount of the fluorine polymer is less than 0.001 mass %, sufficient effect cannot be obtained, while when the addition amount is more than 5 mass %, drying of the film cannot be done sufficiently, or the performances as the film (for example, reflectance, scratch resistance) are adversely affected. Further, in the invention both a hard coat layer and an overcoat layer can contain a surfactant, but it is preferred that the absolute content in a hard coat layer is less than the absolute content in an overcoat layer in the point of surface stability when two layers are laminated. Further, as described later, when two layers are coated simultaneously, the amount of the surfactant in a hard coat layer is preferably less than that in an overcoat layer, or may not contain a surfactant.

1-8. Thickener

A film in the invention may use a thickener for the adjustment of the coefficient of viscosity of a coating solution. The thickener here means a compound capable of increasing the coefficient of viscosity of a coating solution by the addition of it, and the magnitude of the coefficient of viscosity of a coating solution that increases by the addition is preferably from 0.05 to 50 cP (0.05 to 50 mPa·s), more preferably from 0.10 to 20 cP (0.1 to 20 mPa·s), and most preferably from 0.10 to 10 cP (0.10 to 10 mPa·s).

The following compounds are exemplified as such thickeners, but the invention is not restricted to these compounds: poly-∈-caprolactone, poly-∈-caprolactonediol, poly-∈-caprolactonetriol, polyvinyl acetate, poly(ethylene adipate), poly(1,4-butylene adipate), poly(1,4-butylene glutarate), poly(1,4-butylene succinate), poly(1,4-butylene terephthalate), poly(ethylene terephthalate), poly(2-methyl-1,3-propylene adipate), poly(2-methyl-1,3-propylene glutarate), poly(neopentyl glycol adipate), poly(neopentyl glycol sebacate), poly(1,3-propylene adipate), poly(1,3-propylene glutarate), polyvinyl butyral, polyvinyl formal, polyvinyl acetal, polyvinyl propanal, polyvinyl hexanal, polyvinyl pyrrolidone, polyacrylic ester, polymethacrylic ester, cellulose acetate, cellulose propionate, and cellulose acetate butyrate.

In addition to the above compounds, known viscosity adjustors and thixotropic property-giving agents, such as smectites, fluorine tetrasilicate mica, bentonite, silica, montmorillonite, and sodium polyacrylate disclosed in JP-A-8-325491, and ethyl cellulose, polyacrylic acid, and organic clays disclosed in JP-A-10-219136 can be used.

1-9. Coating Solvent

In the invention, as the solvents for use in a coating composition for forming each layer, various kinds of solvents can be used, such as those selected from the viewpoints of capable of dissolving or dispersing each component, capable of easily becoming a uniform plane surface in a coating process or a drying process, capable of ensuring preservation stability of a solution, and having appropriate saturated vapor pressure.

Solvents can be used two or more kinds as mixture. From the aspect of drying load, it is preferred to use a solvent having a boiling point of 100° C. or less at atmospheric pressure and room temperature as the main component and contain a solvent having a boiling point of 100° C. or more in a small amount for the adjustment of drying speed.

As the solvents having a boiling point of 100° C. or lower, hydrocarbons, e.g., hexane (boiling point: 68.7° C.), heptane (98.4° C.), cyclohexane (80.7° C.), and benzene (80.1° C.); halogenated hydrocarbons, e.g., dichloromethane (39.8° C.), chloroform (61.2° C.), carbon tetrachloride (76.8° C.), 1,2-dichloroethane (83.5° C.), and trichloroethylene (87.2° C.);

ethers, e.g., diethyl ether (34.6° C.), diisopropyl ether (68.5° C.), dipropyl ether (90.5° C.), and tetrahydrofuran (66° C.); esters, e.g., ethyl formate (54.2° C.), methyl acetate (57.8° C.), ethyl acetate (77.1° C.), and isopropyl acetate (89° C.); ketones, e.g., acetone (56.1° C.), and 2-butanone (equivalent to methyl ethyl ketone, 79.6° C.); alcohols, e.g., methanol (64.5° C.), ethanol (78.3° C.), 2-propanol (82.4° C.), and 1-propanol (97.2° C.); cyano compounds, e.g., acetonitrile (81.6° C.), and propionitrile (97.4° C.); and carbon disulfide (46.2° C.) are known. Of these solvents, ketones and esters are preferred, and ketones are especially preferred. Of ketones, 2-butanone is especially preferred.

As the solvents having a boiling point of 100° C. or higher, octane (125.7° C.), toluene (110.6° C.), xylene (138° C.), tetrachloroethylene (121.2° C.), chlorobenzene (131.7° C.), dioxane (101.3° C.), dibutyl ether (142.4° C.), isobutyl acetate (118° C.), cyclohexanone (155.7° C.), 2-methyl-4-pentanone (equivalent to (MIBK), 115.9° C.), 1-butanol (117.7° C.), N,N-dimethylformamide (153° C.), N,N-dimethylacetamide (166° C.), and dimethyl sulfoxide (189° C.) are known, and cyclohexanone and 2-methyl-4-pentanone are preferred.

1-10. Others

Besides the above components, a resin, a coupling agent, a coloring preventive, a colorant (a pigment, a dye), a defoaming agent, a leveling agent, a flame retardant, a UV absorber, an infrared absorber, an adhesion-giving agent, a polymerization inhibitor, an antioxidant, and a surface modifier can be added to a film in the invention.

1-11. Support

The support of a film in the invention is not especially restricted, and transparent resin films, transparent resin plates, transparent resin sheets and transparent glass can be used. As transparent resin films, cellulose acylate films (e.g., a cellulose triacetate film (refractive index: 1.48), a cellulose diacetate film, a cellulose acetate butyrate film, a cellulose acetate propionate film), polyethylene terephthalate films, polyether sulfone films, polyacrylic resin films, polyurethane resin films, polyester films, polycarbonate films, polysulfone films, polyether films, polymethylpentene films, polyether ketone films, and (meth)acrylonitrile films can be used.

Cellulose Acylate Film:

Of the above films, cellulose acylate films high in transparency, little in birefringence, easily manufactured, and generally used as the protective film of a polarizing plate are preferred, and a cellulose triacetate film is especially preferred. The thickness of a transparent support is generally from 20 to 1,000 μm or so. As the support for display surface, the thickness is preferably from 20 to 500 μm, more preferably from 30 to 150 μm, and most preferably from 15 to 60 μm.

In the invention, it is preferred to use cellulose acetate having the degree of acetylation of from 59.0 to 61.5% for a cellulose acylate film.

The degree of acetylation means the amount of bound acetic acid per unit mass of cellulose. The degree of acetylation is measured and calculated according to measurement and calculation prescribed in ASTM D-817-91 (Testing method of cellulose acetate, etc.).

The viscosity average degree of polymerization (DP) of cellulose acylate is preferably 250 or more, and more preferably 290 or more.

It is also preferred that the value of Mw/Mn (Mw: mass average molecular weight, Mn: number average molecular weight) measured by gel permeation chromatography of cellulose acylate for use in the invention approximates 1.0, in other words, molecular weight distribution is narrow. The specific Mw/Mn value is preferably from 1.0 to 1.7, more preferably from 1.3 to 1.65, and most preferably 1.4 to 1.6.

In general, the hydroxyl groups at 2-, 3- and 6-positions of cellulose acylate do not uniformly share the total degree of substitution each with ⅓, and the substitution degree of 6-position hydroxyl group tends to be smaller. It is preferred in the invention that the substitution degree of 6-position hydroxyl group of cellulose acylate is larger than that of 2- and 3-position hydroxyl groups.

It is preferred that the substitution degree of the 6-position hydroxyl group with acyl groups accounts for 32% or more of the total substitution degree, more preferably 33% or more, and especially preferably 34% or more. Further, the substitution degree of the 6-position acyl group is preferably 0.88 or more. The 6-position hydroxyl group may be substituted with an acyl groups having 3 or more carbon atoms (e.g., a propionyl group, a butyroyl group, a valeroyl group, a benzoyl group, an acryloyl group, etc.) other than acetyl groups. The degree of substitution of each position can be found by measurement by NMR.

Cellulose acetates obtained according to the methods disclosed in JP-A-11-5851, Synthesis Example 1 in Example, paragraphs 0043 to 0044, Synthesis Example 2 in paragraphs 0048 to 0049, and Synthesis Example 3 in paragraphs 0051 to 0052 can be used as cellulose acylate in the invention.

Polyethylene Terephthalate Film:

Polyethylene terephthalate films are also excellent in transparency, mechanical strength, flatness, resistance to chemical and humidity, and further inexpensive, so that they are preferably used in the invention.

For increasing the adhesion strength of a transparent plastic film and a hard coat layer provided on the film, transparent plastic films subjected to easy adhesion treatment are further preferably used.

As commercially available PET films with an optical easy adhesion layer, COSMOSHINE A4100 and A4300 (manufactured by Toyobo Co., Ltd.) are exemplified.

2. Constitution of Optical Film of the Invention

In an optical film comprising a flexible support having provided thereon a hard coat layer, the hardness after hardening of a polymerizable compound forming the hard coat layer and curling of the optical film are contrary to each other greatly as far as the polymerization reaction utilizes reaction accompanied by shrinkage on hardening. It has been tried to solve the problem by the structure of a polymerizable compound, but further betterment of hardness and thinning of support are requested, so that still further improvements are demanded.

There is a limit in the trial to satisfy this requirement with a hard coat layer comprising only one layer formed of spatially uniform composition. It is an object of the invention to solve this problem by changing the distribution of composition of a polymerizable compound in the vertical direction (in the direction of lamination). That is, the object is to solve the above problem by specifying MOC/MHC ratio in a specific range. The hardness of a hardened film and the molecular weight of the polymerizable compound are largely related, and in the molecular weight range of from 300 to 100,000 or so, hardness has a tendency to be high when molecular weight is high.

In connection with the compatibility of high hardness/high scratch resistance and low curling, it is effective to selectively form a film having a high molecular weight and high hardness on the surface side of an optical film as compared with the case of a uniform composition. That is, the hardness represented by pencil hardness is regulated by the hardness of the film as a whole, and scratch resistance represented by steel wool rubbing is greatly regulated by the hardness of the region of from 0.1 to 1.0 µm of the surface layer.

Further, the present inventors have found it is effective for curling prevention that the thickness of a layer great in shrinkage on hardening is thin and that the interface of layers different in shrinkage on hardening is not clear.

In addition to the above, an optical film of the invention is required to have antifouling properties and low reflecting properties as preferred performances as the surface film of a display. Regarding the improvement of antifouling properties, taking the constitution of the invention is advantageous as shown below.

Not by merely adding silicone and a fluorine compound to a hard coat layer of a monolayer structure, but by adding these compounds to the upper overcoat layer alone of the hard coat layer of a two-layer structure, an unnecessary amount of an antifouling agent in the lower hard coat layer can be reduced, so that the hardness of the optical film can be gained. In addition, by hardening with the compound contained in the overcoat layer that is high in molecular weight and high in the number of functional groups per one molecule, the fixing property of the antifouling agent intensifies, as a result an antifouling property and durability are improved.

Regarding low reflecting properties, taking the constitution of the invention is advantageous as shown below. In a conventional method of using optical interference, the control of coating thickness of an interference layer is important, and fluctuations of interference occur when film thickness is uneven, and fluctuations of tint become large. Contrary to this, since the overcoat layer in the invention does not positively use optical interference, an optical film insensitive to the fluctuation in film thickness can be formed. By containing a polymerizable compound having a low refractive index or inorganic fine particles having a low refractive index, the refractive index of the surface of the overcoat layer can be lowered to thereby reduce the reflection on the surface, and preferably by making the interface of the refractive index of the overcoat layer and the hard coat layer unclear, an optical film restrained in generation of unevenness can be obtained. As a means to make the interface of the refractive index unclear, it is possible to coat the overcoat layer on the hard coat layer that is still in an unhardened state, or the overcoat layer and the hard coat layer can be coated at the same time.

2-1. Thicknesses of Hard Coat Layer and Overcoat Layer

In an optical film in the invention, to provide a hard coat layer is essential, and it is necessary that pencil hardness after coating and at a finally hardened state including an overcoat layer is 2H or more. The thickness of a hard coat layer is preferably from 1.5 to 30 µm, and more preferably from 3 to 20 µm. The thickness of an overcoat layer is preferably from 0.15 to 10 µm, and more preferably from 0.25 to 6 µm. When hardening polybranched polymer (RHB) is contained in an overcoat layer, high scratch resistance improving effect is obtained and an overcoat layer can be thinned, preferably from 0.15 to 6 µm, and more preferably from 0.25 to 2 µm. The total thickness of a hard coat layer and an overcoat layer is preferably from 1.6 to 30 µm, and more preferably from 3.0 to 20 µm.

The thickness of the overcoat layer to the hard coat layer after hardening is preferably from 0.5% to 70%, more preferably from 3.0 to 40%, and most preferably from 5.0 to 25%. By bringing the ratio into the above range, it is possible to make hardness, scratch resistance and curling compatible.

Further, as described later, the interface between a hard coat layer and an overcoat layer may be interface not clear. Two or more overcoat layers each having different composition can be provided on a hard coat layer. In particular when it is necessary to gradually change the composition of each layer, multilayer overcoat layers are preferably used. By the fact that the interface of the hard coat layer and the overcoat layer is not clear, sudden fluctuations of shrinkage on hardening and hardness can be restrained, which is effective to the reduction of curling and the improvement of scratch resistance (peeling at interface).

2-2. Physical Properties of Each Layer (Refractive Index)

The refractive index of a hard coat layer in the invention is not especially restricted, but preferably from 1.46 to 2.00, and more preferably from 1.49 to 1.65. When a hard coat layer is provided in contiguous to a support, by making the difference in refractive index between the hard coat layer and the support 0.02 or less, interference unevenness can be preferably reduced. The refractive index of an overcoat layer is also not especially restricted, but preferably from 1.25 to 2.00, and more preferably from 1.25 to 1.90. When an optical film is used as the outermost layer of an optical film for use in the outermost surface of display materials, the refractive index of the overcoat layer is preferably from 1.25 to 1.49, and more preferably from 1.30 to 1.47. Further, when the interface between an overcoat layer and a hard coat layer is not clear as described later, the average refractive index from the surface to the depth of 100 nm of the overcoat layer is preferably from 1.25 to 1.49, and more preferably from 1.30 to 1.47.

In particular, for making the traces of adhesion of fingerprints inconspicuous, by making the refractive index from 1.45 to 1.48, sebum of fingerprints and the refractive index are approximated, so that effective. When an optical film is provided with an antiglare property, fingerprints are more difficultly visible and especially effective.

On the other hand, when a low refractive index layer is further to be provided on the overcoat layer as the optical interfering layer, the refractive index of the overcoat layer is preferably from 1.46 to 2.00, more preferably from 1.49 to 2.00, and most preferably from 1.58 to 1.70. For increasing the refractive index, it is a preferred embodiment to use inorganic fine particles having a high refractive index for the overcoat layer.

Further, when the interface between an overcoat layer and a hard coat layer is not clear as described later, the average refractive index from the surface to the depth of 100 nm of the overcoat layer is preferably from 1.46 to 2.00, and more preferably from 1.49 to 2.00.

(Shrinkage Factor on Hardening)

In view of the improvement of the hardness and scratch resistance of an optical film and the reduction of curling, when generally used polyfunctional (meth)acrylate monomers are used, it is preferred to make the thickness of an overcoat layer 70% or less of the thickness of a hard coat layer, and to make the shrinkage factor on hardening of the binder of the hard coat layer smaller than the shrinkage factor on hardening of the binder of the overcoat layer. On the other hand, when hardening polybranched polymer (RHB) is contained in an overcoat layer, it is not necessary to make the shrinkage factor on hardening of an overcoat layer larger than the shrinkage factor of a hard coat layer, and the reconciliation of the improvement of the hardness and scratch resistance and the reduction of curling is easy. The shrinkage factor on hardening was computed according to the following method.

$$\text{Volume shrinkage factor: } D=(S-S')/S\times 100$$

wherein S: the specific gravity before hardening, S': the specific gravity after hardening, the specific gravities were measured according to the pycnometer method of JIS K-7112, B method.

(Surface Physical Properties)

As one preferred embodiment of an optical film in the invention, an overcoat layer is the outermost layer. In the embodiment, measuring methods of physical properties of the overcoat layer and preferred ranges are described below.

Contact Angle:

The contact angle of the surface of an optical film in the invention against pure water is preferably 94° or more, more preferably 97° or more, and most preferably 101° or more. The contact angle can be measured according to the following method.

By using a contact angle meter ("CA-X" type contact angle meter, manufactured by Kyowa Interface Science Co., Ltd.), under a dry condition (20° C./65% RH), a droplet having a diameter of 1.0 mm is formed on the tip of a needle with pure water as the liquid, and the droplet is brought into contact with the surface of a film to form a droplet on the film. At the point where the film and the liquid come into contact, the angle formed by the tangential line to the liquid surface and the film surface and on the side including the liquid is taken as the contact angle.

Surface Free Energy:

The surface free energy of an optical film in the invention is preferably 30 mN/m or less, and more preferably 20 mN/m or less. The surface free energy of an optical film in the invention ($\gamma s^v$, unit: mN/m) can be found from respective contact angles of pure water and methylene iodide $CH_2I_2$ experimentally found on an antireflection film with reference to D. K. Owens, *J. Appl. Polym. Sci.*, 13, 1741 (1969).

Coefficient of Dynamic Friction:

Coefficient of dynamic friction can be used as the index of surface sliding property. The coefficient of dynamic friction of an optical film in the invention is preferably 0.02 or more and 0.30 or less, more preferably 0.02 or more and 0.25 or less, and most preferably 0.05 or more and 0.20 or less. By bringing the coefficient of dynamic friction into the above range, good antifouling property and scratch resistance can be maintained. The coefficient of dynamic friction measured with HEIDON-14 coefficient of dynamic friction meter, a 5 mmφ stainless steel ball, a load of 100 g and a rate of 60 cm/min after humidity conditioning of the sample at 25° C. 60% RH for 24 hours was used.

2-3. Interface Between Hard Coat Layer and Overcoat Layer

In the invention, the interface between a hard coat layer and an overcoat layer may be clear, but the interface not clear is also preferred from the viewpoint of interfacial adhesion, scratch resistance and the prevention of interference unevenness.

In a preferred first embodiment, the compositions of the overcoat layer and the hard coat layer gradually vary. In the invention, the composition means the constitutional ratio in a hardened film of a polymerizable compound and/or fine particles.

In the embodiment, the thickness of the compositional varying layer is preferably from 0.05 to 5 μm, and more preferably from 0.1 to 2 μm. When the refractive indexes of the overcoat layer component alone and the hard coat layer component alone differ by 0.02 or more, the thickness of the compositional varying layer is preferably from 0.05 to 1 μm. The compositional varying layer is a layer gradually varying from the composition of the overcoat layer of bulk to the composition of the hard coat layer of bulk between the upper end and the lower end.

In a preferred second embodiment, the hard coat layer and the overcoat layer are further forming another interfacial mixing layer at the interface. In the embodiment, the thickness of the interfacial mixing layer is preferably from 0.05 to 1 μm, and more preferably from 0.05 to 0.5 μm.

In a preferred third embodiment, the compositions of the hard coat layer and the overcoat layer are forming a sea island structure of phase separation or a co-continuous phase at the interface. In the embodiment, the equivalent-sphere diameter of the phase separated island structural part is preferably from 0.01 to 1 μm, more preferably from 0.02 to 0.3 μm, and most preferably from 0.02 to 0.15 μm. Of these embodiments of interfaces of not clear, the first embodiment is especially preferred.

It is possible to control these interfacial states by using the component of the overcoat layer easily osmosing into the hard coat layer, by introducing the component capable of easily extracting from the overcoat layer into the hard coat layer, or by the manufacturing method described later.

2-4. Other Optical Functional Layers

In an optical film in the invention, in addition to a hard coat layer and an overcoat layer contiguous thereto, other optical functional layers can further be provided between the support and the hard coat layer or the overcoat layer. For example, an interference unevenness (rainbow unevenness) preventing layer, an antistatic layer (when reducing the surface resistance value and the like is required from the display side, when adhesion of dusts on the surface and the like becomes a problem), a gas barrier layer, a water-absorbing layer (a moisture-proof layer), an adhesion improving layer, an antifouling layer, a middle refractive index layer, a high refractive index layer, a low refractive index layer, etc., are exemplified. An especially preferred embodiment is to provide a low refractive index layer on the overcoat layer.

A middle refractive index layer, a high refractive index layer, and a low refractive index layer are provided in order from the side nearer to the support, and when antireflection layer is formed, the refractive index of the high refractive index layer is preferably from 1.65 to 2.40, and more preferably from 1.70 to 2.20. The refractive index of the middle refractive index layer is adjusted to be the value between the refractive index of the low refractive index layer and the refractive index of the high refractive index layer. The refractive index of the middle refractive index layer is preferably from 1.55 to 1.80.

2-4-1. Low Refractive Index Layer

By coating a layer having a refractive index lower than the refractive index of an overcoat layer on the overcoat layer in an appropriate thickness, an antireflection function is obtained and mirroring of the outer light can be prevented to thereby increase the contrast in a bright room, so that a more preferred image display can be obtained.

The materials for forming a low refractive index layer will be described below. The low refractive index layer in the invention is formed by coating and hardening a hardening composition comprising a fluorine-containing compound as the main component or a hardening composition comprising a monomer having a plurality of bonding groups in the molecule and low refractive index particles, and the refractive index is adjusted to the range of 1.20 to 1.50. The refractive index of the low refractive index layer is preferably from 1.25 to 1.45, and more preferably from 1.30 to 1.40.

As the embodiment of the hardening composition, at least one of the following compositions can be used.

(1) A composition containing a fluorine-containing polymer having a crosslinking or polymerizable functional group, (2) A composition comprising a hydrolyzed and condensed product of a fluorine-containing organosilane material as the main component, and
(3) A composition containing a monomer having two or more ethylenic unsaturated groups and inorganic fine particles having hollow structure.

By using any of the above three compositions, as compared with low refractive index layers using magnesium fluoride or calcium fluoride, an optical film excellent in scratch resistance can be obtained even when the low refractive index layer is used as the outermost layer. The coefficient of dynamic friction of the surface of the hardened low refractive index layer is preferably from 0.03 to 0.15, and the contact angle against water is preferably from 90° to 120°.

(1) A Fluorine-Containing Compound Having a Crosslinking or Polymerizable Functional Group As the fluorine-containing compounds having a crosslinking or polymerizable functional group, copolymers of fluorine-containing monomers and monomers having a crosslinking or polymerizable functional group can be exemplified. The examples of the fluorine-containing monomers include, e.g., fluoroolefins (e.g., fluoroethylene, vinylidene fluoride, tetrafluoroethylene, hexafluoroethylene, hexafluoropropylene, perfluoro-2,2-dimethyl-1,3-dioxonol, etc.), partially or completely fluorinated alkyl ester derivatives of (meth) acrylic acid (e.g., Viscoat 6FM, manufactured by Osaka Organic Chemical Industry Ltd., M-2020, manufactured by Daikin Industries Ltd., etc.), and completely or partially fluorinated vinyl ethers.

As the monomers to impart crosslinking property, as one embodiment, (meth)acrylate monomers having a crosslinking functional group in the molecule in advance such as glycidyl methacrylate can be exemplified. As another embodiment, there is a method of synthesizing fluorine-containing copolymers with monomers having a functional group such as a hydroxyl group, and then introducing a crosslinking or polymerizable functional group by modification of the substituents. As such monomers, (meth)acrylate monomers having a carboxyl group, a hydroxyl group, an amino group, or a sulfonic acid group (e.g., (meth)acrylic acid, methylol (meth)acrylate, hydroxyalkyl (meth)acrylate, allyl acrylate, etc.) are exemplified. The latter embodiment is disclosed in JP-A-10-25388 and JP-A-10-147739.

The fluorine-containing copolymers can arbitrarily contain a copolymerizable component in view of solubility, dispersibility, coating property, antifouling property and antistatic property. In particular, it is preferred to introduce silicone for imparting antifouling property and sliding property, and silicone can be introduced to the main chain and the side chain.

As a method of introducing a polysiloxane partial structure to the main chain, e.g., a method of using polymer type initiators such as the azo group-containing polysiloxane amide (as commercially available products, e.g., VPS-0501, 1001, manufactured by Wako Pure Chemical Industries) as disclosed in JP-A-6-93100 is exemplified. A polysiloxane partial structure can also be introduced to the side chain by the synthesis according to a method of introducing polysiloxane having a reactive group on one terminal (e.g., SILAPLANE series, manufactured by Chisso Corporation) by polymer reaction as described, e.g., in *J. Appl. Polym. Sci.,* 2000, 78, 1955, and JP-A-56-28219, and a method of polymerization of silicon macromer containing polysiloxane, and both methods can be preferably used.

A hardening agent having a polymerizable unsaturated group may be arbitrarily used in combination with the above polymers, as disclosed in JP-A-2000-17028. Also, as disclosed in JP-A-2002-145952, combination with compounds having a fluorine-containing polyfunctional polymerizable unsaturated group is also preferred. As the examples of the compounds having a polyfunctional polymerizable unsaturated group, the monomers having two or more ethylenic unsaturated groups described above can be exemplified. The hydrolyzed condensed products of organosilane as disclosed in JP-A-2004-170901 are also preferred, and in particular the hydrolyzed condensed products of organosilane having a (meth)acryloyl group are preferred. When a compound having a polymerizable unsaturated group is used as the polymer itself, these compounds show great combined use effect to the improvement of scratch resistance, so that preferred.

When a polymer itself does not have sufficient hardening ability by itself, a necessary hardening property can be given by compounding a crosslinkable compound. For example, a polymer itself contains a hydroxyl group, it is preferred to use various kinds of amino compounds as the hardening agents. Amino compounds used as the crosslinkable compounds are compounds containing either one or both of a hydroxyalkylamino group and an alkoxyalkylamino group in total of two or more, and specifically melamine compounds, urea compounds, benzoguanamine compounds, and glycolurea compounds can be exemplified. For hardening these compounds, organic acids or the salts thereof are preferably used.

The specific examples of these fluorine-containing polymers are disclosed in JP-A-2003-222702 and JP-A-2003-183322.

(2) A Hydrolyzed and Condensed Product of a Fluorine-Containing Organosilane Material A composition comprising a hydrolyzed and condensed product of a fluorine-containing organosilane material as the main component is also low in refractive index and high in the hardness of the film surface and preferred. Condensation products of a compound having hydrolyzable silanol on one or both terminals to fluorinated alkyl groups and tetraalkoxysilane are preferred. Specifically, these compounds are disclosed in JP-A-2002-265866 and JP-A-2002-317152.

(3) A Composition Containing a Monomer Having Two or More Ethylenic Unsaturated Groups and Inorganic Fine Particles Having Hollow Structure As further preferred embodiment, a low refractive index layer comprising low refractive index particles and a binder is exemplified. The low refractive index particles may be either organic or inorganic, but particles having holes inside the particles are preferred. The specific examples of the hollow particles are disclosed in the silica particles in JP-2002-79616. The refractive index of the particles is preferably from 1.15 to 1.40, and more preferably from 1.20 to 1.30. As the binders, monomers having two or more ethylenic unsaturated groups described in the hard coat layer and overcoat layer above can be exemplified.

It is preferred for the low refractive index layer in the invention to contain the polymerization initiators described above in item 1-6, polymerization initiators. When a radical polymerizable compound is used, the polymerization initiator can be added in an amount of from 1 to 10 mass parts based on the compound, and preferably from 1 to 5 mass parts.

Inorganic particles can be used in combination in the low refractive index layer of the invention. For giving scratch resistance, fine particles having a particle size of from 15 to 150% of the thickness of the low refractive index layer can be used, preferably from 30 to 100%, and more preferably from 45 to 60%.

For the purpose of giving characteristics such as antifouling property, water resistance, chemical resistance, sliding property and the like, known polysiloxane or fluorine antifouling agents and sliding agents can be arbitrarily added to the low refractive index layer of the invention.

3. Manufacturing Method of Optical Film of the Invention 3-1. Physical Properties of Coating Solution Since the least upper bound of possible coating speed of the coating system in the invention is largely affected by the physical properties of a liquid, the physical properties of a liquid at the moment of coating, in particular the coefficient of viscosity and surface tension are necessary to be controlled. The coefficient of viscosity is preferably 2.0 mPa·sec or less, more preferably 1.5 mPa·sec or less, and most preferably 1.0 mPa·sec or less. Since there are coating solutions whose coefficient of viscosity changes by shearing rate, the above values show the coefficient of viscosities at the shearing rate of the moment of coating. By the addition of a thixotropy agent to a coating solution, the viscosity lowers at the time of coating when high shear is applied to the coating solution and the viscosity rises at the time of drying when shear is hardly applied to the coating solution, so that unevenness at drying time is not liable to be generated and preferred.

Although not the physical property of a liquid, the amount of a coating solution coated on a transparent support also affects the least upper bound of possible coating speed. The amount of a coating solution coated on a transparent support is preferably from 2.0 to 5.0 ml/m$^2$. When the amount of a coating solution coated on a transparent support is increased, the least upper bound of possible coating speed rises and preferred, but too much an amount of a coating solution that is coated on a transparent support results in the increase of drying load. Accordingly, it is preferred to determine the optimal amount of a coating solution coated on a transparent support according to the formulation of a coating solution and processing conditions.

The surface tension of a coating solution is preferably in the range of from 15 to 36 mN/m. To lower the surface tension by the addition of a leveling agent is preferred to suppress unevenness at the time of drying. On the other hand, when the surface tension excessively lowers, the least upper bound of possible coating speed lowers, so that the surface tension is more preferably from 17 to 32 mN/m, and still more preferably from 19 to 26 mN/m. In a layer containing light transmitting particles, in view of the prevention of precipitation of particles, the coefficient of viscosity is preferably adjusted to 4 cp or more, and more preferably 6 cp or more.

3-2. Coating

Each layer of an optical film in the invention can be formed by the following coating methods, but the invention is not restricted to these methods. Known methods such as a dip coating method, an air knife coating method, a curtain coating method, a roller coating method, a wire bar coating method, a gravure coating method, an extrusion coating method (a die coating method, refer to U.S. Pat. No. 2,681,294), a micro gravure coating method can be used, and of these methods, a micro gravure coating method and a die coating method are preferred.

In particular when two or more layers such as an overcoat layer and a low refractive index layer are coated on a hard coat layer, a method of coating two or more layers at the same time with one coating apparatus (e.g., a simultaneous superposition coater; refer to JP-A-2002-86050, JP-A-2003-260400, JP-A-7-108213), and a method of coating two or more layers by one winding process by the arrangement of coating, drying, and hardening apparatus in a multistage (refer to JP-A-2003-205264) are preferred. In particular, as in the invention, in the case where the structures and compositions of the polymerizable compounds of a hard coat layer and an overcoat layer are different, or the particles contained in both layers are different, from the viewpoints of interfacial adhesion, interference unevenness prevention and curling improvement, it is preferred to coat two or more layers simultaneously, or after coating a hard coat layer, an overcoat layer is coated on the hard coat layer while the degree of polymerization is low according to the method described below.

3-3. Hardening 3-3-1. Hardening Conditions

After drying the solvents, an optical film in the invention is passed through a drying zone of hardening each coated layer with ionizing radiation and/or heat in a state of web, whereby each layer can be hardened.

The kinds of ionizing radiations in the invention are not especially restricted, and ionizing radiation can be arbitrarily selected according to the kind of a hardening composition forming a film from ultraviolet rays, electron beams, near ultraviolet rays, visible rays, near infrared rays, infrared rays and X-rays. Ultraviolet rays and electron beams are preferred, and ultraviolet rays are especially preferred for capable of easily handling and easily obtaining high energy.

Electron beams can also be used similarly. As electron beams, electron beams having energy of from 50 to 1,000 keV, preferably from 100 to 300 keV, emitted from various electron beam accelerators of Cockcroft-Walton type, van de Graaff type, resonance transformation type, insulating core transformer type, linear type, dynamitoron type, and high frequency type can be exemplified.

Irradiation conditions are different by each lamp, but quantity of irradiation is preferably 10 mJ/cm$^2$ or more, more preferably from 50 to 10,000 mJ/cm$^2$, and especially preferably from 50 to 2,000 mJ/cm$^2$.

The irradiation time with ionizing radiation is preferably from 0.7 to 60 seconds, and more preferably from 0.7 to 10 seconds. When the irradiation time is 0.5 seconds or less, hardening reaction cannot be completed, so that sufficient hardening cannot be done. Maintaining a low oxygen condition for long requires large equipments and a large amount of inert gas, so that not preferred.

It is preferred to form each layer by crosslinking reaction or polymerization reaction of an ionizing radiation-hardening compound in the atmosphere of oxygen concentration of 6 vol % or less, more preferably oxygen concentration of 4 vol % or less, especially preferably 2 vol % or less, and most preferably oxygen concentration of 1 vol % or less. For reducing oxygen concentration more than necessary, a large amount of inert gas, such as nitrogen, is required, which is not preferred from the manufacturing costs.

For making oxygen concentration 10 vol % or less, it is preferred to replace the atmosphere (nitrogen concentration: about 79 vol %, oxygen concentration: about 21 vol %) with other gas, and especially preferably to replace with nitrogen (nitrogen purge).

In hardening, the film surface is preferably heated at 40 to 170° C. When heating temperature is 40° C. or less, the effect of heating is small, while when the temperature is 170° C. or higher, problems of deformation of the substrate and the like occur. More preferred temperature is from 60 to 100° C. The film surface temperature means the film surface temperature of the layer to be hardened. Time required for the film to reach the above temperature is preferably from 0.1 to 300 seconds from the beginning of UV irradiation, and more preferably 10 seconds or less. When time for maintaining the film surface temperature in the above temperature range is too short, the reaction of the hardening composition to form a film cannot be accelerated, while too long time results in the reduction of optical performances of the film, or the enlargement of manufacturing equipments.

Means of heating is not especially restricted, but a method of bringing a heated roll into contact with a film, a method of blowing hot nitrogen, and irradiation with far infrared rays or infrared rays are preferred. A method of heating by applying a medium such as hot water, steam or oil to a rotary metal roll as disclosed in Japanese Patent No. 2523574 can also be used. As a heating means, a dielectric heating roll may be used.

In the invention, at least one layer laminated on a support can be hardened by ionizing radiation irradiation of several times. In this case, it is preferred that ionizing radiation irradiations of at least two times are performed in a successive reaction chamber of not exceeding 3 vol % of oxygen concentration. By performing ionizing radiation irradiations of a plurality of times in the same reaction chamber of low oxygen concentration, reaction time necessary for hardening can be effectively secured. Especially, when manufacturing rate is increased for high productivity, ionizing radiation irradiations of a plurality of times are required for securing energies of ionizing radiation necessary for hardening reaction. By this procedure, hardening progresses uniformly in a film and flatness defects can be effectively reduced.

UV ray irradiation may be performed every time when each one layer of a plurality of constituent layers is formed, or may be performed after lamination, or these methods may be combined. From the point of productivity, it is preferred to perform UV ray irradiation after multilayers are laminated.

In the invention, it is preferred that an overcoat layer is coated while a hard coat layer is still containing an unreacted polymerizable compound, and then hardening is further progressed. The degree of polymerization of the polymerizable compound of the hard coat layer before coating the overcoat layer is preferably from 0 to 70%, more preferably from 0 to 50%, and most preferably from 10 to 30%. Interfacial mixture can be controlled by the adjustment of the degree of polymerization to the above range, and prevention of unevenness and interfacial adhesion can be achieved. In connection with the degree of polymerization, the method described in *Kobunshi Bunseki Handbook (Handbook of Polymer Analysis)*, compiled by Nippon Analytical Chemistry Association, Polymer Analysis Meeting. Specifically, in the case of polymerization reaction with (meth)acryloyloxy group, infrared absorption peak area A in the vicinity of 810 $cm^{-1}$ ascribable to the carbon-carbon double bond (C=C) of (meth)acryloyloxy group of the binder in the coated hard coat layer, and infrared absorption peak area B in the vicinity of 1,720 $cm^{-1}$ ascribable to the acyl group (C=O) are measured before and after polymerization, and the degree of dissipation of the double bond is computed according to [(A/B after polymerization)/(A/B before polymerization)]×100, and this is taken as the degree of polymerization (%).

3-3-2. Method of Using Polymerization Initiators Different in Photosensitive Wavelength In the invention, as a method of controlling the rate of reaction of the polymerizable compound of a hard coat layer, an embodiment of using two or more polymerization initiators each different in photosensitive wavelength as shown below can be taken. In the manufacturing method of an optical film in the invention, "a coating and forming methods of a hard coat layer comprising two or more polymerization initiators each different in absorption terminal on the long wavelength side in photosensitive wavelength region, wherein the hard coat layer is irradiated and hardened with ionizing radiation of the wavelength to which at least one polymerization initiator (a) of the polymerization initiators is substantially photo-insensitive, and at least one polymerization initiator (b) of the polymerization initiators is photosensitive (Process 1), and then an overcoat layer coating solution containing at least one polymerization initiator (c) is coated on the hard coat layer, and irradiated with ionizing radiation of the wavelength to which polymerization initiators (a) and (c) are photosensitive (Process 2) to thereby harden the hard coat layer and the overcoat layer" is preferred.

"Substantially photo-insensitive" means the ratio of the double bonds that decrease by irradiation with ionizing radiation used in Process 1 and the double bonds that decrease by irradiation with ionizing radiations used in Processes 1 and 2 is 30% or less. The ratio is preferably 10% or less, and more preferably 3% or less. The amount of the double bonds can be measured and computed by the above infrared absorption peak area ratio.

By subjecting the initiator of the hard coat layer also to photosensitization at the time of hardening of the overcoat layer, the hard coat layer is hardly affected by hardening hindrance by oxygen, layer hardening can be done sufficiently, hardness is heightened, and scratch resistance is improved.

As practical preferred embodiment, e.g., the following method comprising two processes of hardening is exemplified, which comprises irradiating with near ultraviolet rays the hard coat layer containing in combination of polymerization initiator (a) having photosensitive region to near ultraviolet rays and polymerization initiator (b) having photosensitive region to ultraviolet rays alone as Process 1, and then coating the overcoat layer containing polymerization initiator (c) having photosensitive region to ultraviolet rays alone, and irradiating the overcoat layer with ultraviolet rays as Process 2.

As another preferred embodiment, the following method comprising two processes is exemplified, which comprises as process 1 using in combination of a polymerization initiator (a) having a photosensitive region in near ultraviolet ray, and a polymerization initiator (b) having a photosensitive region in ultraviolet ray alone, irradiating ultraviolet ray of the quantity by which a part alone of (a) and (b) initiates polymerization, in the next place as process 2 coating an overcoat layer coating solution containing a polymerization initiator (c) having a photosensitive region in ultraviolet ray alone, and irradiating near ultraviolet ray and ultraviolet ray to thereby harden the layers. According to the method, near ultraviolet ray easily reaches to the lower part of the lower hard coat layer, so that the method is advantageous to the improvement of pencil hardness.

By adjusting the absolute amounts of polymerization initiators (a) and (b) of the hard coat layer, the rate of polymerization in Process 1 and the rate of polymerization after finishing Process 2 of the hard coat layer can be easily controlled.

Polymerization initiators different in photosensitive wavelengths are preferably selected from among the following compounds.

As polymerization initiators having photosensitive wavelengths in near ultraviolet region, compounds having absorption terminals to near 400 nm are preferred, such as phosphine oxides, e.g., 2,4,6-trimethylbenzoyldiphenyl-phosphine oxide (DAROCUR TPO, trade name, manufactured by Ciba Specialty Chemicals Inc.), phenylenebis(2,4,6-trimethylbenzoyl)phosphine oxide (IRGACURE 819, trade name, manufactured by Ciba Specialty Chemicals Inc.), and bis(2,6-dimethoxybenzoyl)-2,4,4-trimethylpentylphosphine oxides; thioxanthones, e.g., 2,4-diethylthioxanthone, 2-chlorothioxanthone, and 1-chloro-4-propoxythioxanthone; ketones, e.g., N-methylacridone, bis(dimethylaminophenyl) ketone, and 2-benzyl-2-dimethylamino-1-(4-morpholinophenyl)-butan-1-one (IRGACURE 369, trade name, manufactured by Ciba Specialty Chemicals Inc.); and oximes, e.g., 1,2-octanedione-1-[4-(phenylthio)-2,2-(O-benzoyloxime)] are exemplified. Phosphine oxides are especially preferred for showing little coloration and great decoloration after irradiation of the formed film.

As polymerization initiators that are different in photosensitive wavelength region from the above polymerization initiators and can be used in combination with the above polymerization initiators, as initiators mainly having absorption in ultraviolet region, known initiators such as acetophenones, benzoins, benzophenones, ketals, and anthraquinones, e.g., 2,2-dimethoxy-1,2-diphenylethan-1-one (IRGACURE 651, trade name, manufactured by Ciba Specialty Chemicals Inc.), 1-hydroxycyclohexyl phenyl ketone (IRGACURE 184, trade name, manufactured by Ciba Specialty Chemicals Inc.), 2-hydroxy-2-methyl-1-phenylpropan-1-one, benzophenone, and 2-methyl-1-[4-(methylthio)phenyl]-2-morpholinopropan-1-one (IRGACURE 907, trade name, manufactured by Ciba Specialty Chemicals Inc.) can be exemplified.

The amount of polymerization initiators to the hardening composition is preferably from 1 to 10 mass %. When the amount of polymerization initiators is not lower than the value of the greatest lower bound, the reaction sufficiently progresses and desired hardness can be obtained, while when the amount is not higher than the value of the least upper bound, a hardened layer (hereinafter also referred to as "a film") obtained is not accompanied by inconveniences such as coloration and hardness fluctuation in the depth direction, so that it is preferred to use polymerization initiators in this range.

When the polymerization initiator having absorption in near ultraviolet region and the polymerization initiator having absorption in ultraviolet region are used in combination, the ratio of both use amounts (near ultraviolet/ultraviolet) is not especially restricted so long as the amounts are in the above range. The amount of polymerization initiator (a) contained in the hard coat layer that absorbs ultraviolet ray (ionizing radiation) of the wavelength for hardening the overcoat layer is preferably the higher so long as there arise no problems of coloration and hardness.

The ionizing radiation for use in Process 1 of the hard coat layer hardening can be arbitrarily selected according to the kinds of polymerization initiators and hardening compositions used. For example, when rays in near ultraviolet region are irradiated, radiant rays from lamps primarily emitting the rays in the wavelength region of from 400 to 480 nm (lamps having radiant peak in 400 to 480 nm, e.g., a hot cathode fluorescent lamp provided with a fluorescent substance so as to have radiant peak in 400 to 480 nm, preferably 420 nm±20 nm), and rays obtained by cutting the rays on short wave side (e.g., 380 nm or shorter) of the rays that are broad in distribution of radiant wavelength, such as a metal halide lamp, with a short wave filter can be used. The irradiation dose of near ultraviolet rays is preferably from 30 to 1,000 mJ/cm$^2$, and more preferably from 50 to 700 mJ/cm$^2$.

The ionizing radiation for use in Process 2 for hardening after coating the overcoat layer-forming coating solution containing a hardening composition can be arbitrarily selected according to the kinds of polymerization initiators and hardening compositions used. The ionizing radiations are not especially restricted so long as the ionizing radiations have the wavelength to which polymerization initiators (a) and (c) are photosensitive, but irradiation with UV rays is preferred. For the reasons that polymerization speed is fast, equipment can be miniaturized, selectable kinds of compounds are abundant, and inexpensive, hardening by ultraviolet rays is preferred. In the case of ultraviolet rays, extra-high pressure, high pressure, and low pressure mercury lamps, a carbon arc lamp, a xenon arc lamp, a metal halide lamp, etc., can be used. The irradiation dose of ultraviolet rays is preferably from 30 to 1,000 mJ/cm$^2$, and more preferably from 50 to 700 mJ/cm$^2$.

3-4. Saponification Treatment

In forming a polarizing plate by using a film of the invention as one of two surface protecting films of a polarizer, it is preferred to improve adhesion property of the adhesion surface of the film by hydrophilizing the surface to be stuck with the polarizer. Any of the following methods can be used.
a. A method of immersing the surface in an alkali solution,
b. A method of coating an alkali solution on the surface,
c. A method of saponifying the surface by protecting with a laminate film,
d. A method of immersing the surface in an alkali solution after forming the layers by half, and
e. A method of forming a coating layer on a triacetyl cellulose film having been subjected to saponification.

4. Use Embodiment of the Invention

A film in the invention is used in image displays such as a liquid crystal display (LCD), a plasma display panel (PDP), an electroluminescence display (ELD), and a cathode ray tube display (CRT). An optical film according to the invention can be used on known image displays such as a plasma display panel (PDP) and a cathode ray tube display (CRT).

Liquid Crystal Displays:

A film and a polarizing plate in the invention can be advantageously used in image displays such as a liquid crystal display, and it is preferred to use them as the outermost layer of the display. A liquid crystal display has a liquid crystal cell and two polarizing plates arranged on both sides of the liquid crystal cell, and the liquid crystal cell carries liquid crystal between two electrode substrates. Further, there are cases where one optically anisotropic layer is arranged between the liquid crystal cell and one polarizing plate, or two optically anisotropic layers are arranged between the liquid crystal cell and both polarizing plates.

Liquid crystal cell is preferably TN mode, VA mode, OCB mode, IPS mode or ECB mode.

Touch Panel:

An optical film in the invention can be applied to the touch panels disclosed in JP-A-5-127822 and JP-A-2002-48913.

Organic Electroluminescence Element:

A film in the invention can be used as the substrate (base material film) and the protective film of organic electroluminescence elements.

When a film in the invention is used for organic electroluminescence elements, the descriptions in JP-A-11-335661, JP-A-11-335368, JP-A-2001-192651, JP-A-2001-192652, JP-A-2001-192653, JP-A-2001-335776, JP-A-2001-247859, JP-A-2001-181616, JP-A-2001-181617, JP-A-2002-181816, JP-A-2002-181617, and JP-A-2002-056976 can be applied to the invention. It is also preferred to use descriptions in JP-A-2001-148291, JP-A-2001-221916 and JP-A-2001-231443 in combination.

EXAMPLE

The invention will be described in detail with reference to examples, but the invention is not limited thereto. In the examples "parts" and "%" are based on mass unless otherwise indicated.

Manufacture of Optical Film

Example 1

Hard coat layer coating solutions (HCL-1) to (HCL-7) and overcoat layer coating solutions (OCL-1) to (OCL-12) shown below were prepared.

TABLE 2

|  |  | HCL-1 | HCL-2 | HCL-3 | HCL-4 | HCL-5 | HCL-6 | HCL-7 |
|---|---|---|---|---|---|---|---|---|
| Polymerizable compound | MANDA (%) | 96.0 |  | 48 |  |  |  |  |
|  | PETA (%) |  | 96.0 | 48 |  | 77.0 | 19.0 | 19.0 |
|  | DPHA (%) |  |  |  | 96.0 | 19.0 | 19.0 | 19.0 |
|  | M-215 (%) |  |  |  |  |  | 58.0 |  |
|  | Urethane hexaacrylate (%) |  |  |  |  |  |  | 58.0 |
|  | RHB-10 (%) |  |  |  |  |  |  |  |
|  | RHB-17 (%) |  |  |  |  |  |  |  |
| Polymerization initiator | IRG-184 (%) | 3.0 | 3.0 | 3.0 | 3.0 | 3.0 | 3.0 | 3.0 |
|  | IRG-369 (%) | 1.0 | 1.0 | 1.0 | 1.0 | 1.0 | 1.0 | 1.0 |
| Concentration of solids content (%) |  | 35.0 | 35.0 | 35.0 | 35.0 | 35.0 | 35.0 | 35.0 |
| Composition of solvent (MIBK/IPA/MEK) (%) |  | (90/10/0) | (90/10/0) | (90/10/0) | (90/10/0) | (90/10/0) | (90/10/0) | (90/10/0) |

TABLE 3

|  |  | OCL-1 | OCL-2 | OCL-3 | OCL-4 | OCL-5 | OCL-6 | OCL-7 | OCL-8 | OCL-9 | OCL-10 | OCL-11 | OCL-12 |
|---|---|---|---|---|---|---|---|---|---|---|---|---|---|
| Polymerizable compound | MANDA (%) | 96.0 |  |  |  |  |  |  |  |  |  |  |  |
|  | PETA % |  |  | 48.0 | 19.0 | 7.0 | 7.0 | 15.0 | 15.0 | 15.0 | 15.0 | 15.0 | 15.0 |
|  | DPHA (%) |  | 96.0 | 48.0 | 77.0 | 12.0 | 12.0 | 61.0 | 61.0 | 61.0 | 61.0 | 61.0 | 15.0 |
|  | M-215 (%) |  |  |  |  |  |  |  |  |  |  |  |  |
|  | Urethane hexaacrylate (%) |  |  |  |  |  |  |  |  |  |  |  |  |
|  | RHB-10 (%) |  |  |  |  | 77.0 |  |  |  |  |  |  |  |
|  | RHB-17 (%) |  |  |  |  |  | 77.0 |  |  |  |  |  | 46.0 |
| Polymerization initiator | IRG-184 (%) | 1.0 | 1.0 | 1.0 | 1.0 | 1.0 | 1.0 | 1.0 | 1.0 | 1.0 | 1.0 | 1.0 | 1.0 |
|  | IRG-369 (%) | 3.0 | 3.0 | 3.0 | 3.0 | 3.0 | 3.0 | 3.0 | 3.0 | 3.0 | 3.0 | 3.0 | 3.0 |
| Fine particles | MIBK-ST (%) |  |  |  |  |  |  | 20.0 |  |  |  |  |  |
|  | IPA-ST-L (%) |  |  |  |  |  |  |  | 20.0 |  |  |  | 20.0 |
|  | IPA-ST-ZL (%) |  |  |  |  |  |  |  |  | 45.0 | 20.0 |  |  |
|  | Low refractive index silica (%) |  |  |  |  |  |  |  |  |  |  | 20.0 |  |
| Concentration of solids content (%) |  | 28.0 | 28.0 | 28.0 | 28.0 | 28.0 | 28.0 | 28.0 | 28.0 | 28.0 | 28.0 | 28.0 | 28.0 |
| Composition of solvent (MIBK/IPA/MEK) (%) |  | (85/15/5) | (85/15/5) | (85/15/5) | (85/15/5) | (85/15/5) | (85/15/5) | (85/15/5) | (85/15/5) | (85/15/5) | (85/15/6) | (85/15/7) | (85/15/7) |

The constituents in the tables are shown as solids content in mass %. The details of the compounds shown are shown below.

MANDA:
Bifunctional acrylate, KAYARAD MANDA, manufactured by Nippon Kayaku Co., Ltd., molecular weight: 312

PETA:
A mixture of pentaerythritol triacrylate and pentaerythritol tetraacrylate, manufactured by Nippon Kayaku Co., Ltd., average molecular weight: about 300

DPHA:
A mixture of dipentaerythritol hexaacrylate and dipentaerythritol pentaacrylate, manufactured by Nippon Kayaku Co., Ltd., average molecular weight: about 540

M-215:
Isocyanuric acid EO-modified diacrylate, manufactured by Toagosei Co., Ltd., molecular weight: 369

Urethane Hexaacrylate:
Hexafunctional acrylate having two urethane bonds in the molecule, Compound PETA-IPDI-PETA disclosed in JP-A-2005-272702, molecular weight: 488

RHB-10:
Dendrimer type dodecafunctional acrylate, Exemplified Compound RHB-10 disclosed in JP-A-2006-10829, molecular weight: 3,324

RHB-17:
Dendrimer type tetradecafunctional acrylate, the compound in the synthesis example below, molecular weight: 2,280

IRG-184:
Photopolymerization initiator, Irgacure 184, manufactured by Ciba Geigy Japan Limited IRG-369:
Photopolymerization initiator, Irgacure 369, manufactured by Ciba Geigy Japan Limited MIBK-ST:
Colloidal silica, average particle size: 12 nm, solids content: 30%, manufactured by Nissan Chemical Industries, Ltd.

IPA-ST-L:
Colloidal silica, average particle size: 50 nm, solids content: 30%, manufactured by Nissan Chemical Industries, Ltd.

IPA-ST-ZL:
Colloidal silica, average particle size: 90 nm, solids content: 30%, manufactured by Nissan Chemical Industries, Ltd.

Low Refractive Index Silica:
Silica having a particle size of about 60 nm, having void in the particle, refractive index: 1.25, containing 3% of trimethylmethoxysilane and 7% of acryloyloxypropyl-trimethoxysilane as the surface treating agents, solids content concentration: 33%, MIBK dispersion, prepared according to Example 4 in JP-A-2002-79616 by changing particle size MEK:
Methyl ethyl ketone MIBK:
Methyl isobutyl ketone IPA:
Isopropyl alcohol Synthesis of RHB-17:

According to Japanese Patent No. 2574201, 55.0 g of BOLTORN H20 (OH value: 510 mg KOH/g, manufactured by Perstorp AB) as polybranched polymer (HB-1), 39.6 g (0.55 mol) of acrylic acid, 63.4 g of toluene as the reaction solvent, 0.143 g of hydroquinone as the polymerization inhibitor, and 0.953 g of methanesulfonic acid as the acid catalyst were put in a reaction vessel equipped with a reflux condenser, a stirrer, a thermometer, a temperature controller, and a water separator, and reaction was performed by azeotropic distillation of production water and the solvent at reaction temperature of from 100 to 115° C., and reaction was terminated when production water reached 7.8 ml. The reaction mixture was dissolved in 40 g of toluene, neutralized with a 25% sodium hydroxide aqueous solution, and then washed with 20 g of 15% brine three times. The solvent was distilled under reduced pressure to obtain hardening polybranched polymer (RHB-17). The OH value of the hardening polybranched polymer (RHB-17) was 68 mg KOH/g, and the conversion rate of hydroxyl groups of the reactive group to the hardening reactive groups was 87 mol %.

Manufacture of Optical Film (101):

The above-prepared hard coat layer coating solution (HCL-1) was coated on a triacetyl cellulose film (TAC-TD80U, manufactured by Fuji Photo Film Co., Ltd.) having a thickness of 80 μm and a width of 1,340 mm by micro gravure coating on the condition of a traveling speed of 30 m/min, and then the coated layer was dried at 60° C. for 150 seconds. After drying, the coated layer was hardened under nitrogen purge (concentration of oxygen: 0.05% or less) with an air-cooled metal halide lamp of 160 W/cm (manufactured by EYEGRAPHICS, CO., LTD.) by irradiation with ultraviolet ray at irradiance of 400 mW/cm² and irradiation dose of 20 mJ/cm², whereby a hard coat layer having a thickness of 5.0 μm was manufactured.

Subsequently, the above-prepared overcoat layer coating solution (OCL-1) was coated on the obtained hard coat layer by die coating in a thickness after hardening of 3.0 μm on the condition of a traveling speed of 30 m/min, and then the coated layer was dried at 60° C. for 150 seconds. After drying, the coated layer was hardened under nitrogen purge (concentration of oxygen: 0.05% or less) with the air-cooled metal halide lamp of 160 W/cm (manufactured by EYEGRAPHICS, CO., LTD.) by irradiation with ultraviolet ray at irradiance of 400 mW/cm² and irradiation dose of 240 mJ/cm², whereby Sample 101 was obtained.

Samples 102 to 117 were manufactured in the same manner as in the manufacture of Sample 101 except for changing the compositions of the hard coat layers and the overcoat layers as shown in the following table.

Evaluation of Optical Film:

The obtained films were evaluated on the following items.

Evaluation 1: Degree of Curling:

Each of the optical film samples was cut out in a size of 20 cm×20 cm, and put on a horizontal desk at 25° C. 60% RH with the side of the film the four corners are lifting upward. After 24 hours, the distances of lifting of the four corners from the plane of the desk were measured with a scale and averaged. The average value was classified by the following criteria and evaluated.

⊚: Less than 5 mm
○: Less than 5 to 10 mm
○Δ: Less than 10 to 20 mm
Δ: Less than 20 to 40 mm
X: 40 mm or more Evaluation 2: Evaluation of Scratch Resistance Against Steel Wool (SW):

Rubbing test was performed with a rubbing tester on the following conditions. Atmospheric condition of evaluation: 25° C., 60% RH Material for rubbing: Steel wool (No. 0000, manufactured by Nippon Steel Wool) was wound around the rubbing tip of a tester (1 cm×1 cm) that is brought into contact with a sample and fixed with a band so as not to move. Rubbing movement of reciprocation was applied on the following conditions.

Moving distance (one way): 13 cm, rubbing speed: 13 cm/sec
Load: 500 g/cm³, contact area of the tip: 1 cm×1 cm
Number of times of rubbing: 10 times of going and returning The reverse face of a sample finished rubbing was coated with black ink and visually observed with reflected light, and the scratch on the rubbed part was evaluated according to the following criteria.

○: Scratch cannot be seen at all even with very careful observation.
○Δ: A weak scratch is slightly seen with very careful observation.
Δ: A weak scratch is seen.
ΔX: A medium scratch is seen.
X: A scratch is seen at a glance.
⊚: A sample graded ○ was additionally rubbed on the same conditions, but scratch cannot be seen at all.

Evaluation 3: Evaluation of Pencil Hardness:

Pencil hardness evaluation described in JIS K 5400 was carried out as the index of scratch resistance. After an antireflection film was subjected to humidity conditioning at 25° C. 60% RH for 2 hours, evaluation was performed with a pencil for test prescribed in JIS S 6006 and a load of 1 kg.

The results of evaluation obtained are shown in the table below.

TABLE 4

| | Hard Coat Layer | | | | Overcoat Layer | | | | |
|---|---|---|---|---|---|---|---|---|---|
| Sample No. | Kind | Layer Thickness (μm) | Polymerizable Compound | (MHC) | Kind | Layer Thickness (μm) | Polymerizable Compound | Fine Particles | (MOC) |
| 101 (Comp.) | HCL-1 | 5.0 | MANDA | 312 | OCL-1 | 3.0 | MANDA | — | 312 |
| 102 (Inv.) | HCL-1 | 5.0 | MANDA | 312 | OCL-2 | 3.0 | DPHA | — | 540 |
| 103 (Inv.) | HCL-2 | 5.0 | PETA | 300 | OCL-3 | 3.0 | PETA/DPHA | — | 420 |
| 104 (Comp.) | HCL-3 | 8.0 | MANDA/DPHA | 306 | — | — | — | — | — |
| 105 (Comp.) | HCL-4 | 8.0 | DPHA | 540 | — | — | — | — | — |
| 106 (Inv.) | HCL-5 | 7.2 | PETA/DPHA | 348 | OCL-4 | 0.8 | PETA/DPHA | — | 493 |
| 107 (Inv.) | HCL-5 | 7.2 | PETA/DPHA | 348 | OCL-2 | 0.8 | DPHA | — | 540 |
| 108 (Inv.) | HCL-5 | 7.2 | PETA/DPHA | 348 | OCL-5 | 0.8 | PETA/DPHA/RHB-10 | — | 2,756 |
| 109 (Inv.) | HCL-5 | 7.2 | PETA/DPHA | 348 | OCL-6 | 0.8 | PETA/DPHA/RHB-17 | — | 1,918 |
| 110 (Inv.) | HCL-6 | 7.2 | PETA/DPHA/M-215 | 389 | OCL-2 | 0.8 | DPHA | — | 540 |
| 111 (Inv.) | HCL-7 | 7.2 | PETA/DPHA/urethane hexaacrylate | 461 | OCL-2 | 0.8 | DPHA | — | 540 |

TABLE 4-continued

| | | | | | | | | | |
|---|---|---|---|---|---|---|---|---|---|
| 112 (Inv.) | HCL-5 | 7.2 | PETA/DPHA | 348 | OCL-7 | 0.8 | PETA/DPHA | MIBK-ST | 493 |
| 113 (Inv.) | HCL-5 | 7.2 | PETA/DPHA | 348 | OCL-8 | 0.8 | PETA/DPHA | IPA-ST-L | 493 |
| 114 (Inv.) | HCL-5 | 7.2 | PETA/DPHA | 348 | OCL-9 | 0.8 | PETA/DPHA | IPA-ST-L | 493 |
| 115 (Inv.) | HCL-5 | 7.2 | PETA/DPHA | 348 | OCL-10 | 0.8 | PETA/DPHA | IPA-ST-ZL | 493 |
| 116 (Inv.) | HCL-5 | 7.2 | PETA/DPHA | 348 | OCL-11 | 0.8 | PETA/DPHA | Low refractive index silica | 493 |
| 117 (Inv.) | HCL-5 | 7.2 | PETA/DPHA | 348 | OCL-12 | 0.8 | PETA/DPHA/RHB-17 | IPA-ST-L | 1,546 |

| Sample No. | (MOC/MHC) | Curling | Scratch Resistance against Steel Wool | Pencil Hardness |
|---|---|---|---|---|
| 101 (Comparison) | 1.00 | ○ | X | HB |
| 102 (Invention) | 1.73 | ○Δ | ○ | 2H |
| 103 (Invention) | 1.40 | ○ | ○Δ | 2H |
| 104 (Comparison) | — | ○ | ΔX | H |
| 105 (Comparison) | — | X | ◎ | 3H |
| 106 (Invention) | 1.42 | ○ | ○ | 3H |
| 107 (Invention) | 1.55 | ○Δ | ○ | 3H |
| 108 (Invention) | 7.92 | ○ | ◎ | 4H |
| 109 (Invention) | 5.51 | ○ | ◎ | 4H |
| 110 (Invention) | 1.39 | ◎ | ○ | 4H |
| 111 (Invention) | 1.17 | ◎ | ○ | 4H |
| 112 (Invention) | 1.42 | ○ | ○ | 3H |
| 113 (Invention) | 1.42 | ○ | ◎ | 4H |
| 114 (Invention) | 1.42 | ◎ | ○ | 3H |
| 115 (Invention) | 1.42 | ○ | ○ | 4H |
| 116 (Invention) | 1.42 | ○ | ○ | 3H |
| 117 (Invention) | 4.44 | ◎ | ◎ | 4H |

From the above table it can be seen that the optical film according to the invention in which the overcoat layer contains a compound having three or more polymerizable functional groups in one molecule are excellent in curling, scratch resistance and hardness. In particular, the improvement of scratch resistance is conspicuous in the case of using hardening polybranched polymer (RHB) and inorganic fine particles.

Example 2

Overcoat layer coating solutions (OCL-13) to (OCL-24) shown in Table 5 were prepared.

The constituents in the above table are shown as solids content in mass %. The details of the compounds shown are shown below.

FM-0421:

Hydroxyl group-modified dimethylsiloxane, average molecular weight: about 5,000, manufactured by Chisso Corporation

X22-164C:

Both terminal methacryl-modified dimethylsiloxane, average molecular weight: about 5,000, manufactured by Shin-Etsu Chemical Co., Ltd.

RMS-033:

Acryl-modified dimethylsiloxane, average molecular weight: about 25,000, manufactured by Gelest Exemplified Compound (a-10):

TABLE 5

| | | OCL-13 | OCL-14 | OCL-15 | OCL-16 | OCL-17 | OCL-18 | OCL-19 | OCL-20 | OCL-21 | OCL-22 | OCL-23 | OCL-24 |
|---|---|---|---|---|---|---|---|---|---|---|---|---|---|
| Polymerizable compound | MANDA (%) | | | | | | | 93.0 | | | | | |
| | PETA (%) | 18.0 | 18.0 | 18.0 | 18.0 | 18.0 | 18.0 | | 18.0 | 18.0 | 14.0 | 14.0 | 14.0 |
| | DPHA (%) | 75.0 | 75.0 | 75.0 | 75.0 | 75.0 | 75.0 | | 18.0 | 18.0 | 54.0 | 54.0 | 54.0 |
| | RHB-17 (%) | | | | | | | | 39.0 | 39.0 | | | |
| Polymerization initiator | IRG-184 (%) | 1.0 | 1.0 | 1.0 | 1.0 | 1.0 | 1.0 | 1.0 | 1.0 | 1.0 | 1.0 | 1.0 | 1.0 |
| | IRG-369 (%) | 3.0 | 3.0 | 3.0 | 3.0 | 3.0 | 3.0 | 3.0 | 3.0 | 3.0 | 3.0 | 3.0 | 3.0 |
| Antifouling agent | FM-0421 (%) | 3.0 | | | | | | | | | | | |
| | X22-164C (%) | | 3.0 | | | | | | | | | | |
| | RMS-033 (%) | | | 3.0 | | | | 3.0 | 3.0 | | 3.0 | | |
| | Exemplified Cpd. (a-10) (%) | | | | 3.0 | | | | | | | | |
| | FAA (%) | | | | | 3.0 | | | | | | | |
| | FC-3 (%) | | | | | | 3.0 | | | 3.0 | | 3.0 | 3.0 |
| Fine particles | IPA-ST-L (%) | | | | | | | | | | 25.0 | 25.0 | |
| | Conductive particles (%) | | | | | | | | | | | | 25.0 |
| Concentration of solids content (%) | | 25.0 | 25.0 | 25.0 | 25.0 | 25.0 | 25.0 | 25.0 | 25.0 | 25.0 | 25.0 | 25.0 | 25.0 |
| Composition of solvent (MIBK/IPA/MEK) (%) | | (80/15/5) | (80/15/5) | (80/15/5) | (80/15/5) | (80/15/5) | (80/15/5) | (80/15/5) | (80/15/5) | (80/15/5) | (80/15/5) | (80/15/5) | (80/15/5) |

Fluorine-containing telomer type acrylate, exemplified above
FAA:
Fluorine-containing compound represented by formula (T-2): 1-acryloyloxy-2-hydroxy-4,4,5,5,6,6,7,7,8,8,9,9,10,10,11,11,12,12,13,13,13-heneicosafluorotridecane
FC-1:
Acrylate having a perfluoropolyether group in the specification
FC-3:
Acrylate having a perfluoropolyether group in the specification
Conductive Particles:
Silica fine particles covered with antimony oxide prepared according to Example 1 in JP-A-2005-119909, 20% isopropyl alcohol dispersion, average particle size: 60 nm, refractive index: 1.41, volume resistivity: 1,500 Ω·cm, surface-treated with a 4% methacrylic silane coupling agent (KBM-503, manufactured by Shin-Etsu Chemical Co., Ltd.) per solids content of the inorganic particles The following optical film was manufactured with the obtained coating solutions for hard coat layer and overcoat layer.

Manufacture of Optical Film (201):

The above-prepared hard coat layer coating solution (HCL-5) was coated on a triacetyl cellulose film (TAC-TD80U, manufactured by Fuji Photo Film Co., Ltd.) having a thickness of 80 μm and a width of 1,340 mm by micro gravure coating on the condition of a traveling speed of 30 m/min, and then the coated layer was dried at 60° C. for 150 seconds. After drying, the coated layer was hardened under nitrogen purge (concentration of oxygen: 0.05% or less) with an air-cooled metal halide lamp of 160 W/cm (manufactured by EYEGRAPHICS, CO., LTD.) by irradiation with ultraviolet ray at irradiance of 400 mW/cm$^2$ and irradiation dose of 20 mJ/cm$^2$, whereby a hard coat layer having a thickness of 4.6 μm was manufactured.

Subsequently, the above-prepared overcoat layer coating solution (OCL-4) was coated on the obtained hard coat layer by die coating in a thickness after hardening of 0.4 μm on the condition of a traveling speed of 30 m/min, and then the coated layer was dried at 60° C. for 150 seconds. After drying, the coated layer was hardened under nitrogen purge (concentration of oxygen: 0.05% or less) with the air-cooled metal halide lamp of 160 W/cm (manufactured by EYEGRAPHICS, CO., LTD.) by irradiation with ultraviolet ray at irradiance of 400 mW/cm$^2$ and irradiation dose of 240 mJ/cm$^2$, whereby Sample 201 was obtained.

Samples 201 to 210 were manufactured in the same manner as in the manufacture of Sample 201 except for changing the compositions of the hard coat layers and the overcoat layers as shown in the following table.

TABLE 6

| | Hard Coat Layer | | | | Overcoat Layer | | | | | | |
|---|---|---|---|---|---|---|---|---|---|---|---|
| Sample No. | Kind | Layer Thickness (μm) | Polymerizable Compound | (MHC) | Kind | Layer Thickness (μm) | Polymerizable Compound | Fine Particles | Antifouling Agent | (MOC) | (MOC/MHC) |
| 201 | HCL-5 | 4.6 | PETA/DPHA | 348 | OCL-4 | 0.4 | PETA/DPHA | — | — | 493 | 1.42 |
| 202 | HCL-5 | 4.6 | PETA/DPHA | 348 | OCL-13 | 0.4 | PETA/DPHA | — | FM-0421 | 493 | 1.42 |
| 203 | HCL-5 | 4.6 | PETA/DPHA | 348 | OCL-14 | 0.4 | PETA/DPHA | — | X22-164C | 493 | 1.42 |
| 204 | HCL-5 | 4.6 | PETA/DPHA | 348 | OCL-15 | 0.4 | PETA/DPHA | — | RMS-033 | 493 | 1.42 |
| 205 | HCL-5 | 4.6 | PETA/DPHA | 348 | OCL-16 | 0.4 | PETA/DPHA | — | (a-10) | 493 | 1.42 |
| 206 | HCL-5 | 4.6 | PETA/DPHA | 348 | OCL-17 | 0.4 | PETA/DPHA | — | FAA | 493 | 1.42 |
| 207 | HCL-5 | 4.6 | PETA/DPHA | 348 | OCL-18 | 0.4 | PETA/DPHA | — | FC-3 | 493 | 1.42 |
| 208 | HCL-5 | 4.6 | PETA/DPHA | 348 | OCL-19 | 0.4 | MANDA | — | RMS-033 | 312 | 0.90 |
| 209 | HCL-5 | 4.6 | PETA/DPHA | 348 | OCL-20 | 0.4 | PETA/DPHA/RHB-17 | — | RMS-033 | 1,389 | 3.99 |
| 210 | HCL-5 | 4.6 | PETA/DPHA | 348 | OCL-21 | 0.4 | PETA/DPHA/RHB-17 | — | FC-3 | 1,389 | 3.99 |
| 211 | HCL-5 | 4.6 | PETA/DPHA | 348 | OCL-22 | 0.4 | PETA/DPHA | IPA-ST-L | RMS-033 | 493 | 1.42 |
| 212 | HCL-5 | 4.6 | PETA/DPHA | 348 | OCL-23 | 0.4 | PETA/DPHA | IPA-ST-L | FC-3 | 493 | 1.42 |
| 213 | HCL-5 | 4.6 | PETA/DPHA | 348 | OCL-24 | 0.4 | PETA/DPHA | Conductive particles | FC-3 | 493 | 1.42 |

Evaluation of Optical Film:

The obtained films were evaluated on the following items in addition to the evaluations in Example 1.

Evaluation 4: Antifouling Durability

An optical film was fixed on a glass plate with an adhesive, and three circles each having a diameter of 5 mm were written on the film at 25° 60% RH with the tip (fine) of a black felt pen "McKee extra fine" (trade name, manufactured by ZEBRA CO., LTD.) and, 5 seconds after, the circles were wiped 20 times of going and returning with BEMCOT (trade name, manufactured by Asahi Kasei Corporation) folded in ten by applying a load of the degree of caving BEMCOT. Writing and wiping were repeated on the above conditions until the time when the trace of ink could not be erased by wiping. Antifouling property was evaluated by the times until erasing became impossible. The time until erasing impossible is preferably 10 times or more, and more preferably 30 times or more.

Evaluation 5: Surface Free Energy

Contact angle was measured with pure water and methylene iodide on the condition of 25° 60% RH, and the surface free energy was computed according to the method described in the specification above.

The results of evaluation are shown in table below.

TABLE 7

| Sample No. | Curling | Scratch Resistance against Steel Wool | Pencil Hardness | Antifouling Durability | Surface Free Energy | Remarks |
|---|---|---|---|---|---|---|
| 201 | ○ | ○ | 2H | 0 | 42 | Invention |
| 202 | ○ | ○ | 2H | 1 | 26 | Invention |
| 203 | ○ | ⊚ | 3H | 8 | 24 | Invention |
| 204 | ○ | ⊚ | 3H | 12 | 24 | Invention |
| 205 | ○ | ⊚ | 3H | 25 | 21 | Invention |
| 206 | ○ | ⊚ | 3H | 30 | 20 | Invention |
| 207 | ○ | ⊚ | 3H | 35 | 18 | Invention |
| 208 | ○ | X | HB | 0 | 26 | Comparison |
| 209 | ○ | ⊚ | 3H | 18 | 23 | Invention |
| 210 | ○ | ⊚ | 3H | 40 | 18 | Invention |
| 211 | ○ | ⊚ | 3H | 18 | 24 | Invention |
| 212 | ○ | ⊚ | 3H | 40 | 18 | Invention |
| 213 | ○ | ⊚ | 3H | 40 | 18 | Invention |

From the above table it can be seen that the optical film according to the invention in which the overcoat layer contains a compound having three or more polymerizable functional groups in one molecule and further containing the antifouling agent are excellent in curling, scratch resistance, hardness and antifouling property. In particular, when the antifouling agent has a group polymerizable with the binder of the overcoat layer, antifouling property, scratch resistance, and pencil hardness are improved. Further, when hardening polybranched polymer (RHB) is used in combination, antifouling durability is improved. Further, as a result of the following dust removing evaluation of Sample 213 in which conductive particles are added to the overcoat layer, the sample shows excellent dust removal of three or more times.

Evaluation 6: Dust Removing Property

Dust removing property was evaluated by attaching the film of the invention to a monitor, shaking dust and dirt on the monitor surface, and wiping out the dust and dirt with cleaning cloth. It is preferred that dust and dirt can be completely wiped out by wiping of six times, and more preferably not more than three times.

Example 3

Overcoat layer coating solutions (OCL-25) to (OCL-32) shown in Table 8 below were prepared.

The constituents in the above table are shown as solids content in mass %. The details of the compounds shown are shown below.

Organosilane:

3-Acryloyloxypropyltrimethoxysilane, KBM-5103, hydrolyzed condensed products of hexamer to nonamer, manufactured by Shin-Etsu Chemical Co., Ltd.

IRG651:

A photopolymerization initiator, Irgacure 651, manufactured by Ciba Geigy Japan Limited F-Containing Polymer:

Fluorine-containing silicone-containing type methacryloyloxy group-containing polymer, synthesized according to Compound A-3 in Example 3 in JP-A-2003-183322, molecular weight: about 32,000

The following optical films (301 to 308) were manufactured with the obtained coating solutions for hard coat layer and overcoat layer.

TABLE 8

| | | OCL-25 | OCL-26 | OCL-27 | OCL-28 | OCL-29 | OCL-30 | OCL-31 | OCL-32 |
|---|---|---|---|---|---|---|---|---|---|
| Polymerizable compound | PETA (%) | 8.0 | | | | | | | |
| | DPHA (%) | 85.0 | 28.0 | 39.0 | 39.0 | 39.0 | 39.0 | 10.0 | 10.0 |
| | RHB-17 (%) | | 65.0 | 17.0 | 17.0 | 17.0 | 17.0 | 6.0 | |
| | Organosilane (%) | | | 3.0 | 3.0 | | | 3.0 | 9.0 |
| | F-Containing polymerizable polymer (%) | | | | | | | 40.0 | 40.0 |
| Polymerization initiator | IRG-184 (%) | 1.0 | 1.0 | 0.7 | 0.7 | 0.7 | 0.7 | 0.7 | 0.7 |
| | IRG-651 (%) | 3.0 | 3.0 | 2.3 | 2.3 | 2.3 | 2.3 | 2.3 | 2.3 |
| Antifouling agent | RMS-033 (%) | 3.0 | 3.0 | 3.0 | | 3.0 | | | 3.0 |
| | FC-3 (%) | | | | 3.0 | | 3.0 | 3.0 | |
| Fine particles | MEK-ST-L (%) | | | 35.0 | | 3.0 | 3.0 | | |
| | Low refractive index silica (%) | | | | | 35.0 | 35.0 | | |
| | Conductive particles (%) | | | | 35.0 | | | 35.0 | 35.0 |
| Concentration of solids content (%) | | 15.0 | 15.0 | 15.0 | 15.0 | 15.0 | 15.0 | 15.0 | 15.0 |
| Composition of solvent (MIBK/IPA/MEK) (%) | | (80/0/20) | (80/0/20) | (80/0/20) | (85/15/5) | (85/15/5) | (85/15/5) | (85/15/5) | (85/15/5) |

TABLE 9

| | Hard Coat Layer | | | | Overcoat Layer | | | | | | |
|---|---|---|---|---|---|---|---|---|---|---|---|
| Sample No. | Kind | Layer Thickness (μm) | Polymerizable Compound | (MHC) | Kind | Layer Thickness (μm) | Polymerizable Compound | Fine Particles | Antifouling Agent | (MOC) | (MOC/MHC) |
| 301 | HCL-5 | 5.5 | PETA/DPHA | 348 | OCL-25 | 0.5 | PETA/DPHA | — | RMS-033 | 528 | 1.52 |
| 302 | HCL-5 | 5.5 | PETA/DPHA | 348 | OCL-26 | 0.5 | DPHA/RHB-17 | — | RMS-033 | 1,759 | 5.05 |
| 303 | HCL-5 | 5.5 | PETA/DPHA | 348 | OCL-27 | 0.5 | DPHA/RHB-17/ organosilane | MEK-ST-L | RMS-033 | 1,071 | 3.08 |
| 304 | HCL-5 | 5.5 | PETA/DPHA | 348 | OCL-28 | 0.5 | DPHA/RHB-17/ organosilane | Conductive particles | FC-3 | 1,071 | 3.08 |
| 305 | HCL-5 | 5.5 | PETA/DPHA | 348 | OCL-29 | 0.5 | DPHA/RHB-17/ organosilane | MEK-ST-L/ low refractive index silica | RMS-033 | 1,075 | 3.09 |
| 306 | HCL-5 | 5.5 | PETA/DPHA | 348 | OCL-30 | 0.5 | DPHA/RHB-17/ organosilane | MEK-ST-L/ low refractive index silica | FC-3 | 1,075 | 3.09 |
| 307 | HCL-5 | 5.5 | PETA/DPHA | 348 | OCL-31 | 0.5 | DPHA/RHB-17/ organosilane/ F-containing polymerizable polymer | Conductive particles | FC-3 | 22,000 | 63.2 |
| 308 | HCL-5 | 5.5 | PETA/DPHA | 348 | OCL-32 | 0.5 | DPHA/RHB-17/ organosilane/ F-containing polymerizable polymer | Conductive particles | RMS-033 | 22,000 | 63.2 |

Manufacture of Optical Film (301A):

The above-prepared hard coat layer coating solution (HCL-5) was coated on a triacetyl cellulose film (TAC-TD80U, manufactured by Fuji Photo Film Co., Ltd.) having a thickness of 80 μm and a width of 1,340 mm by die coating on the condition of a traveling speed of 30 m/min, and then the coated layer was dried at 60° C. for 150 seconds. After drying, the coated layer was hardened under nitrogen purge (concentration of oxygen: 0.05% or less) with an air-cooled metal halide lamp of 160 W/cm (manufactured by EYEGRAPHICS, CO., LTD.) by irradiation with ultraviolet ray at irradiance of 400 mW/cm² and irradiation dose of 80 mJ/cm², whereby a hard coat layer having a thickness of 5.5 μm was manufactured. The rate of polymerization of the hard coat layer measured according to the method described in the specification above was 75%.

Subsequently, the above-prepared overcoat layer coating solution (OCL-25) was coated on the obtained hard coat layer by die coating in a thickness after hardening of 0.5 μm on the condition of a traveling speed of 30 m/min, and then the coated layer was dried at 60° C. for 150 seconds. After drying, the coated layer was hardened under nitrogen purge (concentration of oxygen: 0.05% or less) with the air-cooled metal halide lamp of 160 W/cm (manufactured by EYEGRAPHICS, CO., LTD.) by irradiation with ultraviolet ray at irradiance of 400 mW/cm² and irradiation dose of 240 mJ/cm², whereby Sample 301 was obtained. The manufacturing condition of coating and hardening of this sample was taken as manufacturing process A.

Manufacture of Optical Film (301B):

A hard coat layer was manufactured in the same manner as in the manufacture of optical film 301A except for changing the irradiation dose in photopolymerization of the hard coat layer to 20 mJ/cm². The rate of polymerization of the hard coat layer measured according to the method described in the specification above was 45%.

Overcoat layer coating solution (OCL-25) was coated on the obtained hard coat layer and hardened in the same manner as in optical film 301A, thus Sample 301B was obtained. The manufacturing condition of coating and hardening of this sample was taken as manufacturing process B.

Manufacture of Optical Film (301C):

In the manufacture of the hard coat layer of optical film 301A, the hard coat layer was dried without irradiation with light. Overcoat layer coating solution (OCL-25) was coated on the obtained hard coat layer and dried in the same manner as in optical film 301A. The thus obtained optical film was designated Sample 301C. The manufacturing condition of coating and hardening of this sample was taken as manufacturing process C.

Manufacture of Optical Film (301D):

A triacetyl cellulose film (TAC-TD80U, manufactured by Fuji Photo Film Co., Ltd.) having a thickness of 80 μm and a width of 1,340 mm in roll was rewound, and hard coat layer coating solution (HCL-5) and overcoat layer coating solution (OCL-25) were simultaneously coated on the film using a simultaneous superposition coater (not shown) on the condition of a traveling speed of 30 m/min, and then the coated layer was dried at 60° C. for 150 seconds. After drying, the coated layer was hardened under nitrogen purge with an air-cooled metal halide lamp of 160 W/cm (manufactured by EYEGRAPHICS, CO., LTD.) by irradiation with ultraviolet ray at irradiance of 400 mW/cm² and irradiation dose of 240 mJ/cm² to form a functional layer, and the film was wound. The obtained sample was designated Sample 301 D. The manufacturing condition of coating and hardening of this sample was taken as manufacturing process D.

Samples 302B to 308D were manufactured in the same manner as in Samples 301A to 301D except for changing the compositions of the hard coat layers and the overcoat layers as shown in the following table according to corresponding manufacturing conditions B to D.

TABLE 10

| Sample No. | Curling | Scratch Resistance against Steel Wool | Pencil Hardness | Antifouling Durability | Interface between Layers (TEM) | Remarks |
|---|---|---|---|---|---|---|
| 301A | ○ | ◎ | 3H | 15 | — | Invention |
| 301B | ○ | ◎ | 3H | 15 | — | Invention |
| 301C | ○ | ◎ | 3H | 15 | — | Invention |
| 301D | ○ | ◎ | 3H | 15 | — | Invention |
| 302B | ○ | ◎ | 3H | 18 | — | Invention |
| 302C | ○ | ◎ | 4H | 18 | — | Invention |
| 302D | ◎ | ◎ | 4H | 18 | — | Invention |
| 303B | ○ | ◎ | 3H | 20 | Clear | Invention |
| 303C | ◎ | ◎ | 4H | 20 | Gradient was present | Invention |
| 303D | ◎ | ◎ | 4H | 20 | Gradient was present | Invention |
| 304B | ○ | ◎ | 4H | 45 | Clear | Invention |
| 304C | ◎ | ◎ | 4H | 45 | Gradient was present | Invention |
| 304D | ◎ | ◎ | 4H | 45 | Gradient was present | Invention |
| 305B | ○ | ◎ | 3H | 20 | Clear | Invention |
| 305C | ◎ | ◎ | 4H | 20 | Gradient was present | Invention |
| 305D | ◎ | ◎ | 4H | 20 | Gradient was present | Invention |
| 306B | ○ | ◎ | 4H | 45 | Clear | Invention |
| 306C | ◎ | ◎ | 4H | 45 | Gradient was present | Invention |
| 306D | ◎ | ◎ | 4H | 45 | Gradient was present | Invention |
| 307B | ○ | ◎ | 3H | 20 | Clear | Invention |
| 307C | ◎ | ◎ | 4H | 20 | Gradient was present | Invention |
| 307D | ◎ | ◎ | 4H | 20 | Gradient was present | Invention |
| 308B | ○ | ◎ | 4H | 45 | Clear | Invention |
| 308C | ◎ | ◎ | 4H | 45 | Gradient was present | Invention |
| 308D | ◎ | ◎ | 4H | 45 | Mixed layer was present | Invention |

Evaluation of Optical Film:

The obtained films were evaluated on the following items in addition to the evaluations in Example 2.

Evaluation 7: Observation of Interface of Hard Coat Layer and Overcoat Layer

"Interface between layers" in the above table expresses the state of mixture at the interface. Each optical film was sliced in a thickness of 50 nm and the cross section was photographed with a transmission electron microscope by 150,000 magnifications and the state of the mixture at the interface was observed.

From the above table it can be seen that the optical film according to the invention is excellent in curling prevention, scratch resistance, hardness and antifouling property. In particular, samples in which the polymerization rate of the hard coat layer is made low and the overcoat layer is coated thereon have a tendency to the improvement of curling. In samples manufactured according to manufacturing processes C and D, the composition in the interface between layers is changing with gradient or forming a mixed layer, and curling is reduced. Since the overcoat layer is coated while the polymerizable compound of the hard coat layer is unhardened in manufacturing processes C and D, it is presumed that the component of the overcoat layer partially diffuses into the unhardened hard coat layer to form the gradient of particle density at the interface, or a mixed layer is formed.

In Samples 305C, 305D, 306C, 306D, 307C, 307D, 308C and 308D, interference unevenness is not observed and the reflectance is in the range of from 3.0 to 3.3%, which value is lowered by a little over 1% from 4.3% of Sample 301A, so that these samples are excellent in antireflection property. Fingerprints are inconspicuous in these samples, and also excellent in wiping off property of fingerprints. The reason for this is that the refractive index of the surface of the optical film is close to the refractive index of the grease of fingerprints (1.45 to 1.48), so that fingerprints are inconspicuous, in addition to the fact that the overcoat layers of these samples contain an antifouling agent and easily repel the grease of fingerprints. Further, the antifouling agent makes it easy to remove fingerprints. Samples 307B to 308D containing conductive particles are also excellent in removing property of dust and dirt. (The measurement of reflectance was performed as follows. After surface roughening treatment of the reverse face of an optical film, light absorbing treatment was performed (transmittance at 380 to 780 nm of less than 10%) with black ink. Spectral reflectance at incident angle of 50 in the wavelength region of from 380 to 780 nm was measured with a spectrophotometer (manufactured by JASCO Corporation). The average reflectance at 450 to 650 nm was used as the result.)

Example 4

Hard coat layer coating solutions (HCL-8) to (HCL-10) shown in Table 11 below were prepared.

TABLE 11

| | | HCL-8 | HCL-9 | HCL-10 |
|---|---|---|---|---|
| Polymerizable compound | PETA (%) | 65.0 | 67.0 | 70.0 |
| | DPHA (%) | 16.0 | 17.0 | 17.0 |
| Polymerization initiator | IRG-184 (%) | 2.1 | 2.1 | 2.1 |
| | IRG-369 (%) | 0.9 | 0.9 | 0.9 |
| Fine particles | Crosslinking styrene particles (%) | 3.0 | | |
| | Crosslinking acryl-styrene particles (%) | 20.0 | | |
| | Crosslinking acryl particles (%) | | 20.0 | |
| | Silica particles (%) | | | 10.0 |
| | PMMA (%) | 3.0 | 3.0 | |
| | FM-0421 (%) | 0.03 | 0.03 | |
| Concentration of solids content (%) | | 35.0 | 35.0 | 35.0 |
| Composition of solvent (toluene/cyclohexanone) (%) | | (90/10) | (90/10) | (90/10) |

Compounds used are shown below.
Crosslinking Styrene Particles:
SX-350, crosslinking polystyrene particles having an average particle size of 3.5 μm, refractive index: 1.60, manufactured by Soken Chemical & Engineering Co., Ltd.
Crosslinking Acryl-Styrene Particles:

Average particle size: 3.5 μm, refractive index: 1.55, manufactured by Soken Chemical & Engineering Co., Ltd.
Crosslinking Acryl Particles:
MX-300, crosslinking acryl particles having an average particle size of 3.0 μm, refractive index: 1.49, manufactured by Soken Chemical & Engineering Co., Ltd.
Silica Particles:
Sylysia 430, silica particles having an average particle size of 2.5 μm, manufactured by Fuji Silysia
PMMA:
Polymethyl methacrylate, molecular weight: 80,000
Manufacture of Optical Film (401):

The above-prepared hard coat layer coating solution (HCL-8) was coated on a triacetyl cellulose film (TAC-TD80U, manufactured by Fuji Photo Film Co., Ltd.) having a thickness of 80 μm and a width of 1,340 mm by die coating on the condition of a traveling speed of 30 m/min, and then the coated layer was dried at 60° C. for 150 seconds. After drying, the coated layer was hardened under nitrogen purge (concentration of oxygen: 0.05% or less) with an air-cooled metal halide lamp of 160 W/cm (manufactured by EYEGRAPHICS, CO., LTD.) by irradiation with ultraviolet ray at irradiance of 400 mW/cm$^2$ and irradiation dose of 20 mJ/cm$^2$, whereby a hard coat layer having a thickness of 7.2 μm was manufactured.

Subsequently, overcoat layer coating solution (OCL-5) used in Example 1 was coated on the obtained hard coat layer by die coating in a thickness after hardening of 0.4 μm on the condition of a traveling speed of 30 m/min, and then the coated layer was dried at 60° C. for 150 seconds. After drying, the coated layer was hardened under nitrogen purge (concentration of oxygen: 0.05% or less) with the air-cooled metal halide lamp of 160 W/cm (manufactured by EYEGRAPHICS, CO., LTD.) by irradiation with ultraviolet ray at irradiance of 400 mW/cm$^2$ and irradiation dose of 240 mJ/cm$^2$, whereby Sample 201 was obtained.

Samples 402 to 436 were manufactured in the same manner as in the manufacture of Sample 401 except for changing the compositions of the hard coat layers and the overcoat layers as shown in Table 12 below.

TABLE 12

| Sample No. | Hard Coat Layer | | Overcoat Layer | | Remarks |
|---|---|---|---|---|---|
| | Kind | Layer Thickness (μm) | Kind | Layer Thickness (μm) | |
| 401 | HCL-8 | 7.2 | OCL-5 | 0.4 | Invention |
| 402 | HCL-8 | 7.2 | OCL-6 | 0.4 | Invention |
| 403 | HCL-8 | 7.2 | OCL-7 | 0.4 | Invention |
| 404 | HCL-8 | 7.2 | OCL-8 | 0.4 | Invention |
| 405 | HCL-8 | 7.2 | OCL-15 | 0.4 | Invention |
| 406 | HCL-8 | 7.2 | OCL-18 | 0.4 | Invention |
| 407 | HCL-8 | 7.2 | OCL-20 | 0.4 | Invention |
| 408 | HCL-8 | 7.2 | OCL-21 | 0.4 | Invention |
| 409 | HCL-8 | 7.2 | OCL-29 | 0.4 | Invention |
| 410 | HCL-8 | 7.2 | OCL-30 | 0.4 | Invention |
| 411 | HCL-8 | 7.2 | OCL-31 | 0.4 | Invention |
| 412 | HCL-8 | 7.2 | OCL-32 | 0.4 | Invention |
| 413 | HCL-9 | 7.2 | OCL-5 | 0.4 | Invention |
| 414 | HCL-9 | 7.2 | OCL-6 | 0.4 | Invention |
| 415 | HCL-9 | 7.2 | OCL-7 | 0.4 | Invention |
| 416 | HCL-9 | 7.2 | OCL-8 | 0.4 | Invention |
| 417 | HCL-9 | 7.2 | OCL-15 | 0.4 | Invention |
| 418 | HCL-9 | 7.2 | OCL-18 | 0.4 | Invention |
| 419 | HCL-9 | 7.2 | OCL-20 | 0.4 | Invention |
| 420 | HCL-9 | 7.2 | OCL-21 | 0.4 | Invention |
| 421 | HCL-9 | 7.2 | OCL-29 | 0.4 | Invention |
| 422 | HCL-9 | 7.2 | OCL-30 | 0.4 | Invention |
| 423 | HCL-9 | 7.2 | OCL-31 | 0.4 | Invention |
| 424 | HCL-9 | 7.2 | OCL-32 | 0.4 | Invention |
| 425 | HCL-10 | 7.2 | OCL-5 | 0.4 | Invention |
| 426 | HCL-10 | 7.2 | OCL-6 | 0.4 | Invention |
| 427 | HCL-10 | 7.2 | OCL-7 | 0.4 | Invention |
| 428 | HCL-10 | 7.2 | OCL-8 | 0.4 | Invention |
| 429 | HCL-10 | 7.2 | OCL-15 | 0.4 | Invention |
| 430 | HCL-10 | 7.2 | OCL-18 | 0.4 | Invention |
| 431 | HCL-10 | 7.2 | OCL-20 | 0.4 | Invention |
| 432 | HCL-10 | 7.2 | OCL-21 | 0.4 | Invention |
| 433 | HCL-10 | 7.2 | OCL-29 | 0.4 | Invention |
| 434 | HCL-10 | 7.2 | OCL-30 | 0.4 | Invention |
| 435 | HCL-10 | 7.2 | OCL-31 | 0.4 | Invention |
| 436 | HCL-10 | 7.2 | OCL-32 | 0.4 | Invention |

Evaluation of Optical Film:

The obtained films were evaluated in the same manner as in Example 2. As a result, it can be seen that the optical films excellent in curling prevention and scratch resistance can be obtained according to the invention. It is also seen that samples containing an antifouling agent in the overcoat layer coating solutions are extremely excellent in antifouling durability. Further, optical films having antiglare property excellent in black tone and black density can be obtained with samples using overcoat layer coating solution (OCL-15), (OCL-18), (OCL-20) or (OCL-21).

Since samples using overcoat layer coating solution (OCL-30) or (OCL-31) have antiglare property, fingerprints are further inconspicuous as compared with samples in Example 3, and also excellent in wiping off property of fingerprints.

Example 5

When light irradiation was performed through a sharp cut filter of 390 nm or less in polymerizing the hard coat layer in manufacturing process B in Example 3, photopolymerization initiator IRG-369 having absorption in the long wave region mainly reacted, so that it was easy to control the rate of polymerization of the hard coat layer to a specific value of 50% or less.

Example 6

Overcoat layer coating solutions (OCL-33) and (OCL-34), and low refractive index layer coating solutions (LnL-1) to (lNL-4) shown below were prepared.
Preparation of Overcoat Layer Coating Solution (OCL-33):
DPHA (a mixture of dipentaerythritol pentaacrylate and dipentaerythritol hexaacrylate, manufactured by Nippon Kayaku Co., Ltd.) (38.0 g), 10.0 g of PETA (a mixture of penta-erythritol triacrylate and pentaerythritol tetraacrylate, manufactured by Nippon Kayaku Co., Ltd.), and 2.0 g of a photopolymerization initiator (Irgacure 369, trade name, manufactured by Ciba Specialty Chemicals Inc., molecular weight: 367) were dissolved in 110 g of methyl isobutyl ketone and 7.0 g of cyclohexanone. After that, 250.0 g of $ZrO_2$ dispersion (average particle size: from 5 to 20 nm, 20% dispersion of methyl isobutyl ketone, manufactured by Sumitomo Osaka Cement) was added thereto and the mixture was stirred to prepare overcoat layer coating solution (OCL-33). MOC of the overcoat layer coating solution was 492, and the refractive index of hardened substance was 1.62.
Preparation of Overcoat Layer Coating Solution (OCL-34):
DPHA (a mixture of dipentaerythritol pentaacrylate and dipentaerythritol hexaacrylate, manufactured by Nippon Kayaku Co., Ltd.) (18.0 g), 10.0 g of PETA (a mixture of penta-erythritol triacrylate and pentaerythritol tetraacrylate, manufactured by Nippon Kayaku Co., Ltd.), 20.0 g of RHB-17 (dendrimer type tetradecafunctional acrylate, the compound in Example 1), and 2.0 g of a photopolymerization initiator (Irgacure 369, trade name, manufactured by Ciba Specialty Chemicals Inc., molecular weight: 367) were dissolved in 110 g of methyl isobutyl ketone and 7.0 g of cyclohexanone. After that, 250.0 g of $ZrO_2$ dispersion (average particle size: from 5 to 20 nm, 20% dispersion of methyl isobutyl ketone, manufactured by Sumitomo Osaka Cement Co., Ltd.) was added thereto and the mixture was stirred to prepare overcoat layer coating solution (OCL-34). MOC of the overcoat layer coating solution was 1,215, and the refractive index of hardened substance was 1.62.

Preparation of Low Refractive Index Layer Coating Solution (LnL-1):

Fluorine-containing thermo-crosslinking polymer (fluorine-containing silicone-containing thermosetting polymer disclosed in Example 1 in JP-A-11-189621) (4.52 g), 1.13 g of a hardening agent (Cymel 303, trade name, manufactured by Nippon Cytec Industries Inc.), 0.11 g of a curing catalyst (Catalyst 4050, trade name, manufactured by Nippon Cytec Industries Inc.), 1.5 g of colloidal silica dispersion (MEK-ST-L, trade name, concentration of solids content: 30%, average particle size: about 50 nm, manufactured by Nissan Chemical Industries, Ltd.), 15.0 g of silica dispersion B (cyclohexanone dispersion of hollow silica particles, 15% of polymerizable functional group-containing surface treating agent was used for the silica, concentration of solids content: 23%), 2.5 g of sol solution A, 0.60 g of photopolymerization initiator (PM980M, molecular weight: 527, manufactured by Wako Pure Chemical Industries), and 114 g of methyl ethyl ketone were stirred in a reaction vessel, and the reaction solution was filtered through a polypropylene filter having a pore size of 1 μm to prepare a low refractive index layer coating solution (LnL-1).

Preparation of Low Refractive Index Layer Coating Solution (LnL-2):

A mixture of dipentaerythritol pentaacrylate and dipentaerythritol hexaacrylate (DPHA, manufactured by Nippon Kayaku Co., Ltd.) (2.65 g), 30.0 g of silica dispersion B (dispersion of hollow silica particles, 15% of polymerizable functional group-containing surface treating agent was used for the silica, concentration of solids content: 23%), 2.93 g of sol solution A, 0.15 g of reactive silicone X-22-164C (trade name, manufactured by Shin-Etsu Chemical Co., Ltd.), 0.15 g of fluorine-containing compound F3035 (trade name, concentration of solids content: 30%, manufactured by Nippon Oils and Fats Co., Ltd.), 0.20 g of a photopolymerization initiator (Irgacure 369, trade name, molecular weight: 367, manufactured by Ciba Specialty Chemicals Inc.), 103 g of methyl ethyl ketone, and 3.5 g of cyclohexanone were stirred in a reaction vessel, and the reaction solution was filtered through a polypropylene filter having a pore size of 1 μm to prepare a low refractive index layer coating solution (LnL-2).

Preparation of Low Refractive Index Layer Coating Solution (LnL-3):

Radical polymerizable fluorine-containing polymer (fluorine-containing silicone-containing radical polymerizable polymer P9 disclosed in JP-A-2003-222702) (5.22 g), 0.50 g of a mixture of dipentaerythritol pentaacrylate and dipentaerythritol hexaacrylate (DPHA, manufactured by Nippon Kayaku Co., Ltd.), 15.0 g of silica dispersion B (dispersion of hollow silica particles, concentration of solids content: 23%), 4.4 g of sol solution A, 0.15 g of reactive silicone RMS-033 (trade name, manufactured by Gelest), 0.17 g of a photopolymerization initiator (Irgacure 369, molecular weight: 367, manufactured by Ciba Specialty Chemicals Inc.), 114 g of methyl ethyl ketone, and 3.5 g of cyclohexanone were stirred in a reaction vessel, and the reaction solution was filtered through a polypropylene filter having a pore size of 1 μm to prepare a low refractive index layer coating solution (LnL-3).

Preparation of Low Refractive Index Layer Coating Solution (LnL-4):

COLCOAT N103 (organosiloxane oligomer (average molecular weight: 950, manufactured by COLCOAT CO., LTD.) (2%) (245 mass parts), 100 mass parts of Opstar JTA105 (fluorine-containing organosiloxane oligomer (5%), containing polyethylene glycol, hexamethylolmelamine, and an acid generator, manufactured by JSR Corporation), 1 mass part of Opstar JTA105A (a hardening agent (5%), manufactured by JSR Corporation), 23 mass parts of hollow silica dispersion A (30%), and 365 mass parts of butyl acetate were mixed to prepare a low refractive index layer coating solution (LnL-4).

(Preparation of Sol Solution A)

In a reaction vessel equipped with a stirrer and a reflux condenser, 120 parts of methyl ethyl ketone, 100 parts of acryloyloxypropyltrimethoxysilane (KBM5103, produced by Shin-Etsu Chemical Co., Ltd.) and 3 parts of diisopropoxyaluminum ethyl acetate were added and mixed and after adding 30 parts of ion-exchanged water, the reaction was allowed to proceed at 60° C. for 4 hours. The reaction solution was cooled to room temperature. The mass average molecular weight of Sol Solution A was 1,600 and out of the oligomer or higher components, the proportion of the components having a molecular weight of 1,000 to 20,000 was 100%. Also, the gas chromatography analysis revealed that the raw material acryloxypropyltrimethoxysilane was not remaining at all. The solid content of Sol Solution A was controlled by methylethyl ketone to 29 mass %.

The dispersions used are shown below.

Hollow Silica Dispersion A:

Hollow silica fine particle sol, average particle size: 65 nm, shell thickness: 8 nm, the refractive index of the silica particles: 1.28, manufactured according to Preparation Example 4 in JP-A-2002-79616 by changing the particle size, IPA dispersion, solids content: 30%

Hollow Silica Dispersion B: Silica in hollow silica dispersion A was surface modified with 15 mass parts of 3-acryloyloxypropyltrimethoxysilane as the surface treating agent, and after modification, solvent-substituted with cyclohexanone and the concentration of solids content was made 23%.

Subsequently, a hard coat layer, an overcoat layer and a low refractive index layer were coated in the constitution shown in Table 13 below. The coating condition of the hard coat layer was UV irradiation dose of 20 mJ/cm$^2$, and the coating condition of the overcoat layer was UV irradiation dose of 20 mJ/cm$^2$, and the low refractive index layer was hardened by the following condition.

Hardening Condition of Optical Film Using LnL-1 or LnL-4:

After drying at 90° C. for 150 seconds, the layer was subjected to thermo-hardening at 110° C. for 10 minutes. After that, the layer was hardened under nitrogen purge (concentration of oxygen: 0.05% or less) with an air-cooled metal halide lamp of 160 W/cm (manufactured by EYEGRAPHICS, CO., LTD.) by irradiation with ultraviolet ray at irradiance of 400 mW/cm$^2$ and irradiation dose of 240 mJ/cm$^2$.

Hardening Condition of Optical Film Using LnL-2 or LnL-3:

After drying at 90° C. for 150 seconds, the layer was hardened under nitrogen purge (concentration of oxygen: 0.05% or less) with an air-cooled metal halide lamp of 160 W/cm (manufactured by EYEGRAPHICS, CO., LTD.) by irradiation with ultraviolet ray at irradiance of 400 mW/cm$^2$ and irradiation dose of 240 mJ/cm$^2$.

TABLE 13

| Sample No. | Hard Coat Layer Kind | Hard Coat Layer Layer Thickness (μm) | Overcoat Layer Kind | Overcoat Layer Layer Thickness (μm) | Low Refractive Index Layer Kind | Low Refractive Index Layer Layer Thickness (μm) | Reflectance (%) | Remarks |
|---|---|---|---|---|---|---|---|---|
| 601 | HCL-5 | 7.2 | OCL-6 | 0.4 | LnL-1 | 0.1 | 1.42 | Invention |
| 602 | HCL-5 | 7.2 | OCL-6 | 0.4 | LnL-2 | 0.1 | 2.75 | Invention |
| 603 | HCL-5 | 7.2 | OCL-6 | 0.4 | LnL-3 | 0.1 | 1.42 | Invention |
| 604 | HCL-5 | 7.2 | OCL-6 | 0.4 | LnL-4 | 0.1 | 1.70 | Invention |
| 605 | HCL-8 | 7.2 | OCL-6 | 0.4 | LnL-1 | 0.1 | 1.42 | Invention |
| 606 | HCL-8 | 7.2 | OCL-6 | 0.4 | LnL-2 | 0.1 | 2.75 | Invention |
| 607 | HCL-8 | 7.2 | OCL-6 | 0.4 | LnL-3 | 0.1 | 1.42 | Invention |
| 608 | HCL-8 | 7.2 | OCL-6 | 0.4 | LnL-4 | 0.1 | 1.70 | Invention |
| 609 | HCL-9 | 7.2 | OCL-6 | 0.4 | LnL-1 | 0.1 | 1.42 | Invention |
| 610 | HCL-9 | 7.2 | OCL-6 | 0.4 | LnL-2 | 0.1 | 2.75 | Invention |
| 611 | HCL-9 | 7.2 | OCL-6 | 0.4 | LnL-3 | 0.1 | 1.42 | Invention |
| 612 | HCL-9 | 7.2 | OCL-6 | 0.4 | LnL-4 | 0.1 | 1.70 | Invention |
| 613 | HCL-10 | 7.2 | OCL-6 | 0.4 | LnL-1 | 0.1 | 1.42 | Invention |
| 614 | HCL-10 | 7.2 | OCL-6 | 0.4 | LnL-2 | 0.1 | 2.75 | Invention |
| 615 | HCL-10 | 7.2 | OCL-6 | 0.4 | LnL-3 | 0.1 | 1.42 | Invention |
| 616 | HCL-10 | 7.2 | OCL-6 | 0.4 | LnL-4 | 0.1 | 1.70 | Invention |
| 617 | HCL-8 | 6.0 | OCL-34 | 1.6 | LnL-1 | 0.1 | 0.95 | Invention |
| 618 | HCL-8 | 6.0 | OCL-34 | 1.6 | LnL-2 | 0.1 | 1.93 | Invention |
| 619 | HCL-8 | 6.0 | OCL-34 | 1.6 | LnL-3 | 0.1 | 0.95 | Invention |
| 620 | HCL-8 | 6.0 | OCL-34 | 1.6 | LnL-4 | 0.1 | 1.18 | Invention |
| 621 | HCL-9 | 7.2 | OCL-33 | 1.6 | LnL-1 | 0.1 | 0.95 | Invention |
| 622 | HCL-9 | 7.2 | OCL-33 | 1.6 | LnL-2 | 0.1 | 1.93 | Invention |
| 623 | HCL-9 | 7.2 | OCL-33 | 1.6 | LnL-3 | 0.1 | 0.95 | Invention |
| 624 | HCL-9 | 7.2 | OCL-33 | 1.6 | LnL-4 | 0.1 | 1.18 | Invention |
| 625 | HCL-10 | 6.0 | OCL-34 | 1.6 | LnL-1 | 0.1 | 0.95 | Invention |
| 626 | HCL-10 | 6.0 | OCL-34 | 1.6 | LnL-2 | 0.1 | 1.93 | Invention |
| 627 | HCL-10 | 6.0 | OCL-34 | 1.6 | LnL-3 | 0.1 | 0.95 | Invention |
| 628 | HCL-10 | 6.0 | OCL-34 | 1.6 | LnL-4 | 0.1 | 1.18 | Invention |

The obtained films were evaluated in the same manner as in Example 2. As a result, it is confirmed that the samples in the invention are low in curling and excellent in scratch resistance, further the samples coated with a low refractive index layer are low in reflectance.

Example 7

A sample was manufactured in the same manner as in Example 1 except for changing the thickness of the support to 40 μm. The results of the same evaluations as in Example 1 are shown in the table below.

TABLE 14

| Sample No. | Hard Coat Layer Kind | Hard Coat Layer Layer Thickness (μm) | Hard Coat Layer Polymerizable Compound | (MHC) | Overcoat Layer Kind | Overcoat Layer Layer Thickness (μm) | Overcoat Layer Polymerizable Compound | Fine Particles | (MOC) |
|---|---|---|---|---|---|---|---|---|---|
| 701 (Comp.) | HCL-1 | 5.0 | MANDA | 312 | OCL-1 | 3.0 | MANDA | — | 312 |
| 702 (Inv.) | HCL-1 | 5.0 | MANDA | 312 | OCL-2 | 3.0 | DPHA | — | 540 |
| 703 (Inv.) | HCL-2 | 5.0 | PETA | 300 | OCL-3 | 3.0 | PETA/DPHA | — | 420 |
| 704 (Comp.) | HCL-3 | 8.0 | MANDA/DPHA | 306 | — | — | — | — | — |
| 705 (Comp.) | HCL-4 | 8.0 | DPHA | 540 | — | — | — | — | — |
| 706 (Inv.) | HCL-5 | 7.2 | PETA/DPHA | 348 | OCL-4 | 0.8 | PETA/DPHA | — | 493 |
| 707 (Inv.) | HCL-5 | 7.2 | PETA/DPHA | 348 | OCL-2 | 0.8 | DPHA | — | 540 |
| 708 (Inv.) | HCL-5 | 7.2 | PETA/DPHA | 348 | OCL-5 | 0.8 | PETA/DPHA/RHB-10 | — | 2,756 |
| 709 (Inv.) | HCL-5 | 7.2 | PETA/DPHA | 348 | OCL-6 | 0.8 | PETA/DPHA/RHB-17 | — | 1,918 |
| 710 (Inv.) | HCL-6 | 7.2 | PETA/DPHA/M-215 | 389 | OCL-2 | 0.8 | DPHA | — | 540 |
| 711 (Inv.) | HCL-7 | 7.2 | PETA/DPHA/urethane hexaacrylate | 461 | OCL-2 | 0.8 | DPHA | — | 540 |
| 712 (Inv.) | HCL-5 | 7.2 | PETA/DPHA | 348 | OCL-7 | 0.8 | PETA/DPHA | MIBK-ST | 493 |
| 713 (Inv.) | HCL-5 | 7.2 | PETA/DPHA | 348 | OCL-8 | 0.8 | PETA/DPHA | IPA-ST-L | 493 |
| 714 (Inv.) | HCL-5 | 7.2 | PETA/DPHA | 348 | OCL-9 | 0.8 | PETA/DPHA | IPA-ST-L | 493 |
| 715 (Inv.) | HCL-5 | 7.2 | PETA/DPHA | 348 | OCL-10 | 0.8 | PETA/DPHA | IPA-ST-ZL | 493 |
| 716 (Inv.) | HCL-5 | 7.2 | PETA/DPHA | 348 | OCL-11 | 0.8 | PETA/DPHA | Low refractive index silica | 493 |
| 717 (Inv.) | HCL-5 | 7.2 | PETA/DPHA | 348 | OCL-12 | 0.8 | PETA/DPHA/RHB-17 | IPA-ST-L | 1,546 |

| Sample No. | (MOC/MHC) | Curling | Scratch Resistance against Steel Wool | Pencil Hardness |
|---|---|---|---|---|
| 701 (Comparison) | 1.00 | ○ | X | HB |
| 702 (Invention) | 1.73 | ○△ | ○ | 2H |

TABLE 14-continued

| | | | | |
|---|---|---|---|---|
| 703 (Invention) | 1.40 | ○△ | ○△ | 2H |
| 704 (Comparison) | — | ○△ | △X | H |
| 705 (Comparison) | — | X | ◎ | 3H |
| 706 (Invention) | 1.42 | ○△ | ○ | 3H |
| 707 (Invention) | 1.55 | ○△ | ○ | 3H |
| 708 (Invention) | 7.92 | ○ | ◎ | 4H |
| 709 (Invention) | 5.51 | ○ | ◎ | 4H |
| 710 (Invention) | 1.39 | ◎ | ○ | 4H |
| 711 (Invention) | 1.17 | ◎ | ○ | 4H |
| 712 (Invention) | 4.42 | ○ | ○ | 3H |
| 713 (Invention) | 1.42 | ○ | ◎ | 4H |
| 714 (Invention) | 1.42 | ◎ | ○ | 3H |
| 715 (Invention) | 1.42 | ○ | ○ | 4H |
| 716 (Invention) | 1.42 | ○ | ○ | 3H |
| 717 (Invention) | 4.44 | ◎ | ◎ | 4H |

From the above table it can be confirmed that an optical film little in generation of curling, and excellent in scratch resistance and antifouling property can be obtained by combining the hard coat layer and the overcoat layer in the invention. The degree of curling tends to worsen by reducing the thickness of the support lower than that in Example 1, but when the overcoat layer containing a dendrimer and inorganic fine particles is used, generation of curling is suppressed.

As a result of the evaluation of combination of the layer constitution in Example 1 by using COSMOSHINE A4100 and A4300 (manufactured by TOYOBO CO., LTD.), which are commercially available PET films with an easy adhesive layer for optical use, the same results are obtained.

Example 8

Saponification Treatment of Optical Film

The reverse face of each sample in Examples 1 to 7 was subjected to saponification treatment on the following conditions.
Alkali bath: 1.5 mol/dm$^3$ sodium hydroxide aqueous solution, 55° C., 120 seconds
First water washing bath: city water, 60 seconds
A neutralizing bath: 0.05 mol/dm$^3$ sulfuric acid, 30° C., 20 seconds
Second water washing bath: city water, 60 seconds
Drying: 120° C., 60 seconds
Manufacture of Polarizing Plate with Optical Film:

A polarizer was manufactured by the adsorption of iodine onto a stretched polyvinyl alcohol film. The antireflection film having been subjected to saponification treatment in Example 1 was stuck on one side of the above polarizer with a polyvinyl alcohol adhesive so that the support side (triacetyl cellulose) of the antireflection film facing the polarizer side. Angle of visibility-widening film "Wide View Film SA12B" (manufactured by Fuji Photo Film Co., Ltd.) having an optical compensatory layer was subjected to saponification treatment, and stuck on another side of the polarizer with a polyvinyl alcohol adhesive. Thus, a polarizing plate was manufactured.

As a result of evaluation of the transmission type liquid crystal display of TN mode mounting the manufactured polarizing plate of the invention, it is confirmed that a display excellent in visibility, dustproof property and scratch resistance can be manufactured.

Example 9

When each of the optical films prepared in Example 3 (Samples 305C, 305D, 306C, 306D, 307C, 307D, 308C and 308D) was stuck on a glass plate of the surface of an organic electroluminescence display with an adhesive, the reflectance on the glass surface was suppressed and a display of high visibility was obtained.

Example 10

Optical films were manufactured in the same manner as in the optical films prepared in Example 3 (Samples 305C, 305D, 306C, 306D, 307C, 307D, 308C and 308D) except for using PET with an easy adhesive layer (COSMOSHINE A4100 having a thickness of 188 μm, manufactured by TOYOBO CO., LTD.) as the transparent film. A surface film was peeled of a 42 inches plasma display free of a front panel (a direct color filter system PDU-42H6A1, manufactured by Pioneer Corporation), and the optical film of the invention was stuck with an adhesive. It was confirmed that the display was low in reflection, excellent in scratch resistance and antifouling property.

Example 11

The optical films prepared in Example 3 (Samples 305C, 305D, 306C, 306D, 307C, 307D, 308C and 308D) each was stuck on the surface of the organic electroluminescence display with an adhesive. It was confirmed that the display was low in reflection, excellent in scratch resistance and antifouling property.

Example 12

The optical films prepared in Example 3 was used as the surface films of the surfaces of a reflection type liquid crystal display and a semipermeable type liquid crystal display so that the low refractive index layer is outside. It was confirmed that display was low in reflection, excellent in scratch resistance and antifouling property.

It will be apparent to those skilled in the art that various modifications and variations can be made to the described embodiments of the invention without departing from the spirit or scope of the invention. Thus, it is intended that the invention cover all modifications and variations of this invention consistent with the scope of the appended claims and their equivalents.

The present application claims foreign priority based on Japanese Patent Application No. JP2006-092156 filed Mar. 29 of 2006, the contents of which are incorporated herein by reference.

What is claimed is:

1. An optical film comprising: a support; a hard coat layer formed by hardening a hard coat layer-coating composition; and an overcoat layer having a thickness of 0.15 to 10 μm formed by hardening an overcoat layer-coating composition, in this order, wherein each of the hard coat layer-coating composition and the overcoat layer-coating composition comprises a compound having a plurality of polymerizable functional groups in one molecule, wherein the compound in the overcoat layer-coating composition comprises a compound having at least three polymerizable functional groups, wherein the optical film further comprises a compositional varying layer having a thickness of from 0.05 to 5 μm between the hard coat layer and the overcoat layer, and a constitutional ratio of at least one of a polymerizable compound and fine particles in the compositional varying layer is same at a surface of (of the compositional varying layer) contacting with the overcoat layer and in the overcoat layer, is same at a surface (of the compositional varying layer) contacting with the hard coat layer and in the hard coat layer, and gradually varies from the surface (of the compositional varying layer) contacting with the overcoat layer to the surface (of the compositional varying layer) contacting with the hard coat layer, wherein a ratio MOC/MHC is from 1.1 to 6.0, wherein MOC is a weight average molecular weight of the compound having the plurality of polymerizable functional groups in one molecule in the overcoat layer-coating composition, and MHC is a weight average molecular weight of the compound having the plurality of polymerizable functional groups in one molecule in the hard coat layer-coating composition, and wherein at least one of the hard coat layer-coating composition and the overcoat layer-coating composition comprises inorganic fine particles.

2. The optical film of claim 1, wherein the compound having the plurality of polymerizable functional groups in one molecule comprises a monomer having a hydrogen bonding group.

3. The optical film of claim 1, wherein the compound having the plurality of polymerizable functional groups in one molecule comprises ethoxy isocyanurate-modified diacrylate.

4. The optical film of claim 1, wherein the compound having the plurality of polymerizable functional groups in one molecule comprises a hardening polybranched polymer RHB comprising a polybranched polymer HB as a core and at least one of a photo-curable group and a thermosetting reactive group, bonded to a terminal of a branch of the polybranched polymer.

5. The optical film of claim 1, wherein the overcoat layer comprises inorganic fine particles, the inorganic fine particles comprising silica as a main component thereof, the silica having an average particle size of 1 nm to 1 μm as the main component.

6. The optical film of claim 1, wherein the inorganic fine particles have holes at least one of on surfaces of the inorganic fine particles and inside the inorganic fine particles.

7. The optical film of claim 1, wherein the inorganic fine particles are electrically conductive particles.

8. The optical film of claim 1, wherein one of the hard coat layer-coating composition and the overcoat layer-coating composition comprises at least one of an organosilane compound, a hydrolyzed product thereof and a condensed product thereof.

9. The optical film of claim 1, wherein the overcoat layer-coating composition comprises at least one of a reactive silicone compound and a reactive fluorine compound.

10. The optical film of claim 1, wherein the overcoat layer has a surface free energy of 30 mN/m or less.

11. The optical film of claim 1, further comprising an interfacial mixing layer at an interface between the overcoat layer and the hard coat layer.

12. The optical film of claim 1, wherein the overcoat layer has a refractive index of 1.25 to 1.49.

13. The optical film of claim 1, wherein an average refractive index from a surface to a depth of 100 nm of the overcoat layer is from 1.25 to 1.49.

14. The optical film of claim 1, wherein the hard coat layer comprises light diffusible particles.

15. The optical film of claim 1, having an antiglare property.

16. The optical film of claim 1, wherein the support has a thickness of 15 to 60 μm.

17. The optical film of claim 1, further comprising a low refractive index layer over the overcoat layer.

18. A polarizing plate comprising: a polarizer; and protective films, the polarizer being between the protective films, wherein at least one of the protective films is an optical film of claim 1.

19. An image display comprising an optical film of claim 1.

20. A method for manufacturing the optical film of claim 1, comprising:

coating the hard coat layer-coating composition over the support, the hard coat layer-coating composition comprising the compound having a plurality of polymerizable functional groups in one molecule;

drying the hard coat layer-coating composition without ultraviolet irradiation;

coating the overcoat-layer coating composition comprising the compound having at least three polymerizable functional groups in one molecule; and hardening the overcoat-layer coating composition.

21. A method for manufacturing the optical film of claim 1, comprising the support and at least two layers formed by the coating compositions, comprising:

coating simultaneously the hard coat layer coating composition comprising the compound having a plurality of polymerizable functional groups in one molecule; and the overcoat-layer coating composition comprising the compound having at least three polymerizable functional groups in one molecule.

* * * * *